United States Patent
Tamura et al.

(10) Patent No.: US 8,489,993 B2
(45) Date of Patent: Jul. 16, 2013

(54) STORAGE MEDIUM STORING INFORMATION PROCESSING PROGRAM, INFORMATION PROCESSING APPARATUS AND INFORMATION PROCESSING METHOD

(75) Inventors: Hiroaki Tamura, Kyoto (JP); Nobuhito Koganezawa, Kyoto (JP); Fumihiko Tamiya, Kyoto (JP); Koichi Nakao, Kyoto (JP); Ryota Oiwa, Kyoto (JP); Yosuke Fujino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 844 days.

(21) Appl. No.: 12/557,091

(22) Filed: Sep. 10, 2009

(65) Prior Publication Data

US 2010/0289739 A1    Nov. 18, 2010

(30) Foreign Application Priority Data

May 18, 2009  (JP) ................................ 2009-119473

(51) Int. Cl.
    *G06F 3/00*         (2006.01)
(52) U.S. Cl.
    USPC .......................................... 715/730; 345/156
(58) Field of Classification Search
    USPC .......................................... 715/730; 345/156
    See application file for complete search history.

(56) References Cited

U.S. PATENT DOCUMENTS

| | | | | |
|---|---|---|---|---|
| 4,760,851 A | * | 8/1988 | Fraser et al. | 600/587 |
| 4,876,550 A | * | 10/1989 | Kelly | 342/451 |
| 5,067,081 A | * | 11/1991 | Person | 701/533 |
| 5,191,532 A | * | 3/1993 | Moroto et al. | 701/533 |
| 5,278,756 A | * | 1/1994 | Lemchen et al. | 600/587 |
| 5,381,791 A | * | 1/1995 | Qian | 600/436 |
| 5,429,135 A | * | 7/1995 | Hawman et al. | 600/436 |
| 5,438,518 A | * | 8/1995 | Bianco et al. | 473/407 |
| 5,581,259 A | * | 12/1996 | Schipper | 342/451 |
| 5,685,786 A | * | 11/1997 | Dudley | 473/407 |
| 7,925,243 B2 | * | 4/2011 | McGary | 455/414.1 |
| 8,001,124 B2 | * | 8/2011 | Svendsen | 707/736 |
| 2004/0204821 A1 | * | 10/2004 | Tu | 701/200 |
| 2007/0237318 A1 | * | 10/2007 | McGary | 379/114.15 |
| 2007/0288161 A1 | * | 12/2007 | Neef et al. | 701/208 |
| 2009/0005987 A1 | * | 1/2009 | Vengroff et al. | 701/300 |
| 2010/0281052 A1 | * | 11/2010 | Geelen | 707/770 |
| 2010/0289739 A1 | * | 11/2010 | Tamura et al. | 345/156 |
| 2011/0044512 A1 | * | 2/2011 | Bambha et al. | 382/118 |
| 2012/0003998 A1 | * | 1/2012 | McGary | 455/466 |

FOREIGN PATENT DOCUMENTS

JP    2005-6125    1/2005

* cited by examiner

*Primary Examiner* — Doon Chow
*Assistant Examiner* — David Choi
(74) *Attorney, Agent, or Firm* — Nixon & Vanderhye PC

(57) ABSTRACT

A game apparatus saves, in accordance with an instruction of a user, a photographing image taken by an inward camera or an outward camera, or a handwriting image of a handwritten note inputted using a touch panel. Moreover, in accordance with an instruction of the user, position information is saved together with the photographing image or the handwriting image. That is, a photographing place or a creation place of the handwritten note is registered on a map. When the photographing image or the handwriting image is reproduced, an image of a landmark set near a position on the map indicated by the position information is reproduced before the photographing image or the handwritten image.

19 Claims, 35 Drawing Sheets

REPRODUCTION LIST

| INDEX | IDENTIFICATION INFORMATION (ID) | |
|---|---|---|
| 1 | TITLE PAGE (2) | |
| 2 | LANDMARK (2) | |
| 3 | JOURNEY NOTE (1) | GROUP (1) |
| 4 | JOURNEY NOTE (3) | |
| 5 | LANDMARK (3) | |
| 6 | JOURNEY NOTE (2) | |
| 7 | TITLE PAGE (1) | |
| 8 | LANDMARK (1) | GROUP (2) |
| 9 | JOURNEY NOTE (4) | |
| 10 | JOURNEY NOTE (5) | |
| 11 | TITLE PAGE (3) | |
| ⋮ | ⋮ | |
| N | JOURNEY NOTE (n) | |

FIG. 2
(A) TOP VIEW (FOLDED MANNER)
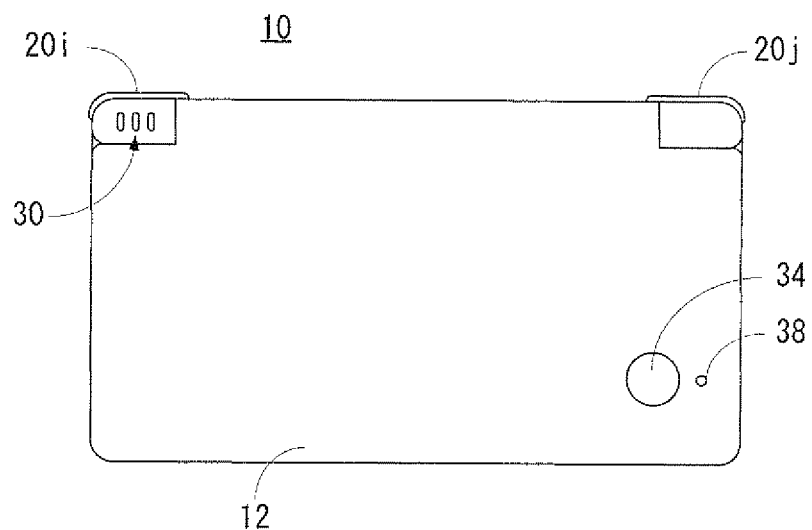
(B) LEFT SIDE VIEW (FOLDED MANNER)
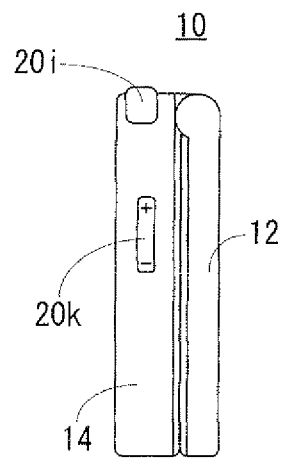

FIG. 7  REGION SELECTION SCREEN 200

FIG. 12   JOURNEY NOTE ATTACHING SCREEN 450

FIG. 14 JOURNEY NOTE BROWSING SCREEN (PHOTOGRAPHING IMAGE) 550

FIG. 17

REPRODUCTION LIST

| INDEX | IDENTIFICATION INFORMATION (ID) |
|---|---|
| 1 | TITLE PAGE (2) |
| 2 | LANDMARK (2) |
| 3 | JOURNEY NOTE (1) |
| 4 | JOURNEY NOTE (3) |
| 5 | LANDMARK (3) |
| 6 | JOURNEY NOTE (2) |
| 7 | TITLE PAGE (1) |
| 8 | LANDMARK (1) |
| 9 | JOURNEY NOTE (4) |
| 10 | JOURNEY NOTE (5) |
| 11 | TITLE PAGE (3) |
| ⋮ | ⋮ |
| N | JOURNEY NOTE (n) |

Indices 1–6: GROUP (1)
Indices 7–10: GROUP (2)

FIG. 19
(A) LANDMARK DATA  92d
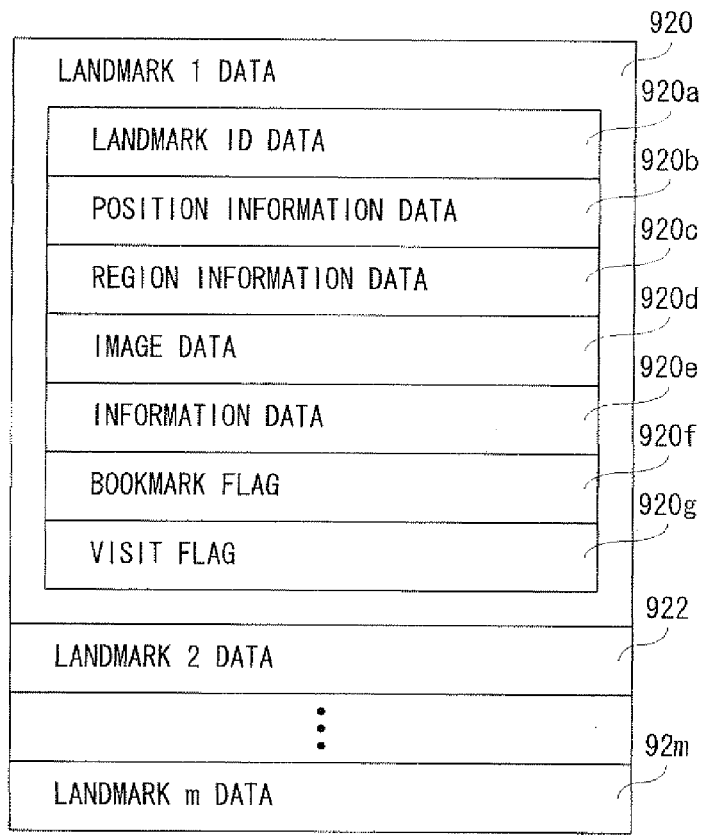
(B) JOURNEY NOTE DATA  92e
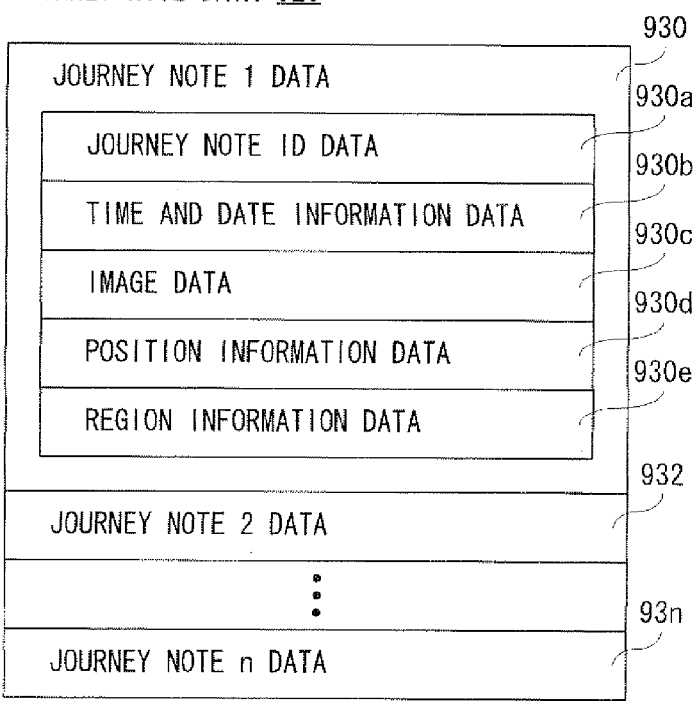

STORAGE MEDIUM STORING INFORMATION PROCESSING PROGRAM, INFORMATION PROCESSING APPARATUS AND INFORMATION PROCESSING METHOD

CROSS REFERENCE OF RELATED APPLICATION

The disclosure of Japanese Patent Application No. 2009-119473 is incorporated herein by reference.

FIELD

The technology herein relates to a storage medium storing an information processing program, an information processing apparatus, and an information processing method, and particularly to a storage medium storing an information processing program, an image processing apparatus, and an information processing method, for example, for outputting an image and information relating to the same.

BACKGROUND AND SUMMARY

One example of the related art is disclosed in Japanese Patent Application Laid-Open No. 2005-6125 [H04 5/91, G01C 21/00, G08G 1/137, H04N 5/225, H04N 5/765] (Document 1) laid-open on Jan. 6, 2005. In a still-image processing apparatus of Document 1, a user arranges digital photographs on a map and registers position information for the photographs to thereby perform a slide show with the photograph data disposed in order based on the position information.

Moreover, another example of this kind of related art is disclosed on an Internet site (http://www.microsoft.com/japan/mactopia/column/234.mspx (Experience report of Apple's Eye No. 234-iLife '09×Tips (first part), Strengthen a bond with your family and friend—iPhoto '09 is great as I expected!)) (Document 2). In software of Document 2, only registering positions on a map as photographing locations of photographs allows a slide show by the registered photograph location.

However, in the still-image processing apparatus disclosed in Document 1 and the software disclosed in Document 2, since the photographs arranged on the map are displayed in the slide show based on the positions associated with the photographs, and at this time, only the photographs are sequentially reproduced, where the relevant photograph was taken may not be recalled. Particularly, when the photograph is taken without any background or when the background is too small, it is difficult to recall it.

Therefore, certain example embodiments provide a novel storage medium storing an information processing program, information processing apparatus, and information processing method.

Moreover, certain example embodiments provide a storage medium storing an information processing program, an information processing apparatus, and an information processing method, capable of easily reminding a user of where image data was acquired at the time of reproduction of a slide show.

Certain example embodiments employ the following features in order to solve the above-described problems. It should be noted that reference numerals and the supplements inside the parentheses show one example of a corresponding relationship with the embodiments described later for easy understanding of the embodiments, and do not limit the present invention.

A first aspect of certain example embodiments is a storage medium storing an information processing program of an information processing apparatus having a display means, an operation means, and a storage means storing a plurality of pieces of landmark information and position information of the respective plurality of pieces of landmark information. The information processing program causes a computer of the information processing apparatus to function as an image data taking-in means for taking in image data in accordance with an operation of the operation means, a position information setting means for setting position information of the image data taken in by the image data taking-in means, a landmark information selecting means for selecting the landmark information relating to the relevant image data based on the position information of the image data and the position information of the respective pieces of landmark information, and a display control means for sequentially displaying the image data and the landmark information selected by the landmark information selecting means in a predetermined order on the display means.

In the first aspect, the information processing apparatus (10) has the display means (16, 18), the operation means (20a to 20k, 22), and the storage means (28, 52, 56) for storing the plurality of pieces of landmark information and the position information of the respective plurality of pieces of landmark information. The information processing program causes the computer of this information processing apparatus to function as the image data taking-in means (50, S107, S143), the position information setting means (50, S121, S151), the landmark information selecting means (50, S241, S243, S247, S269, S271), and the display control means (50, S281).

The image data taking-means takes in the image data in accordance with the operation of the operation means. The position information setting means sets the position information of the image data taken in by the image data taking-in means. The landmark information selecting means selects the landmark information relating to the relevant image data, based on the position information of the image data and the position information of the respective pieces of landmark information. The display control means sequentially displays the image data and the landmark information selected by the landmark information selecting means in the predetermined order on the display means.

According to the first aspect, since the landmark information relating to the image data is selected based on the position information, and the image data and the selected landmark information are sequentially displayed, the landmark information relating to the image data can be easily grasped. Accordingly, where the image data was acquired can be easily recalled.

A second aspect of certain example embodiments depends from the first aspect, wherein the landmark information selecting means selects the relevant landmark information when a first position indicated by the position information of the image data and a second position indicated by the position information of the landmark information are within a predetermined range.

In the second aspect, the landmark information selecting means selects the relevant landmark information when the first position indicated by the position information of the image data and the second position indicated by the position information of the landmark information are within a predetermined range. For example, the landmark information of a landmark within the predetermined range of the first position indicated by the position information of the image data is selected.

According to the second aspect, since the landmark information of the landmark within the predetermined range of the position indicated by the position information of the image data is selected, the landmark can be easily selected.

A third aspect of certain example embodiments depends from the second aspect, wherein the landmark information selecting means selects the landmark information having the position information in which a distance between the first position and the second position is the shortest.

In the third aspect, the landmark information selecting means selects, for example, the landmark information having the position information in which the distance between the first position and the second position is the shortest. That is, the landmark information of the closest landmark to the first position indicated by the position information of the image data is selected.

According to the third aspect, since when there are a plurality of landmarks within the predetermined range of the position indicated by the position information of the image data, the landmark information of the landmark whose distance from the position is the shortest is selected, one landmark can be associated corresponding to the image data. Moreover, the landmark existing closest to the image data can be grasped.

A fourth aspect of certain example embodiments depends from any one of the first to third aspects, wherein the display control means displays an image corresponding to the image data after displaying the landmark information.

In the fourth aspect, the display control means displays the image corresponding to the image data after displaying the landmark information, for example, an image indicating the landmark.

According to the fourth aspect, since the image corresponding to the image data is displayed after the landmark information is displayed, a place where the relevant image was acquired can be easily recalled.

A fifth aspect of certain example embodiments depends from the fourth aspect, wherein when it has already been determined that a first position indicated by position information of another image data and a second position indicated by the position information of the landmark information are within a predetermined range, the display control means displays the image corresponding to the image data after displaying the relevant landmark information.

In the fifth aspect, when the landmark selected based on the position information of the taken-in image data has already been selected based on the position information of the other image data, the display control means displays the image corresponding to the taken-in image data after displaying the landmark information of the landmark.

According to the fifth aspect, since when the landmark already selected based on the position information of the other image data is selected, the image corresponding to the taken-in image data is displayed after the landmark information of the landmark is displayed, the landmark and all the image data existing in the vicinity thereof can be grasped in a short time.

A sixth aspect of certain example embodiments depends from the fourth aspect, wherein when it has already been determined that a first position indicated by position information of another image data and a second position indicated by the position information of the landmark information are within a predetermined range, the display control means displays the image corresponding to the image data after displaying an image corresponding to the relevant another image data.

In the sixth aspect, when the landmark selected based on the position information of the taken-in image data has already been selected based on the position information of the other image data, the display control means displays the image corresponding to the taken-in image data after displaying the image corresponding to the other image data.

According to the sixth aspect, similar to the fifth aspect, the landmark and all the image data existing in the vicinity thereof can be grasped in a short time.

A seventh aspect of certain example embodiments depends from the first aspect, wherein the landmark information selecting means includes a first selection means for selecting the relevant landmark information when a first position indicated by the position information of the image data and a second position indicated by the position information of the landmark information are within a predetermined range, and a second selection means for selecting the relevant landmark information when the first position indicated by the position information of the image data and the second position indicated by the position information of the landmark information are out of the predetermined range, and the display control means displays the landmark information selected by the first selection means before the image data, and the landmark information selected by the second selection means after the image data.

In the seventh aspect, the landmark information selecting means includes the first selection means (50, S241, S243), and the second selection means (50, S241, S269, S271). The first selection means selects the relevant landmark information when the first position indicated by the position information of the image data and the second position indicated by the position information of the landmark information are within the predetermined range ("YES" in S241), that is, when the distance between the first position and the second position is equal to or less than a length of a radius defining the predetermined range. The second selection means selects the relevant landmark information when the first position indicated by the position information of the image data and the second position indicated by the position information of the landmark information are out of the predetermined range ("NO" in S241), that is, when the distance between the first position and the second position exceeds the length of the above-described radius. The display control means displays the landmark information selected by the first selection means before the image data, and the landmark information selected by the second selection means after the image data.

According to the seventh aspect, since the landmark information is reproduced before or after the image data depending on whether or not the position with respect to the image data is within the predetermined range, the landmark existing near this image data and the landmark existing far from this image data can be distinguished to be grasped.

An eighth aspect of certain example embodiments depends from the first aspect, wherein the computer is further caused to function as a visit setting means for setting whether or not each landmark was visited in accordance with an operation of the operation means, and the landmark information selecting means selects the landmark information of the landmark with the visit to the relevant landmark set by the visit setting means.

In the eighth aspect, the information processing program further causes the computer to function as the visit setting means (50, S181, S185, S187, S189). The landmark information selecting means selects the landmark information of the landmark with the visit to the relevant landmark set by the visit setting means (S269, S271).

According to the eighth aspect, since the landmark with the visit to the relevant landmark set is reproduced, the image can be displayed while reflecting an actual behavior of the user.

A ninth aspect of certain example embodiments depends from the first aspect, wherein the computer is further caused to function as a time-and-date information setting means for setting time and date information for the image data taken in by the image data taking-in means, and the display control means displays an image corresponding to the image data and the landmark information in an order following the time and date information.

In the ninth aspect, the information processing program causes the computer to function as the time-and-date information setting means (50, S109, S145). The time-and-date information setting means sets the time and date information for the image data taken in by the image data taking-in means. The display control means displays the image corresponding to the image data and the landmark information in the order following the time and date information. For example, the image corresponding to the image data and the selected landmark information are displayed in order of older time and date or newer time and date.

According to the ninth aspect, since the image corresponding to the image data and the selected landmark information are displayed in accordance with the time and date information, the images can be displayed in chronological order.

A tenth aspect of certain example embodiments depends from the first aspect, wherein the computer is further caused to function as a map display control means for causing the display means to display a map, and the position information setting means sets a position on the map instructed in accordance with an operation of the operation means, as the position information of the image data.

In the tenth aspect, the information processing program further causes the computer to function as the map display control means (50, S113, S117, S147). Accordingly, the position information setting means sets the position on the map instructed in accordance with the operation of the operation means as the position information of the image data.

According to the tenth aspect, since the position on the displayed map is simply instructed, the position information can be set easily.

An eleventh aspect of certain example embodiments depends from the first aspect, wherein the information processing apparatus further includes an imaging means, and the image data taking-in means takes in image data imaged by the imaging means.

In the eleventh aspect, the information processing apparatus further includes the imaging means (32, 34, 50, S99). Accordingly, the image data taking-in means takes in the image data imaged by the imaging means (S107).

According to the eleventh aspect, the position information can be set in association with the image data of the photographed image, which enables the photographing place to be set.

A twelfth aspect of certain example embodiments depends from the first aspect, wherein the computer is further caused to function as a creation means for creating a letter, graphic, or symbol in accordance with an operation of the operation means, and the image data taking-in means takes in image data of the letter, graphic or symbol created by the creation means.

In the twelfth aspect, the information processing program causes the computer to function as the creation means (22, 50, S133, S135). This creation means creates the letter, graphic or symbol in accordance with the operation of the operation means. For example, a handwritten note of the letter, graphic, or symbol or the like is created by the operation of the user. Accordingly, the image data taking-in means takes in the image data of the letter, graphic or symbol, that is, the handwritten note created by the creation means (S143).

According to the twelfth aspect, the handwritten note created by the operation of the user can be taken in as the image data and the position information can be set, which enables a place where the handwritten note was created to be set.

A thirteenth aspect of certain example embodiments is an information processing apparatus having a display means, an operation means, and a storage means storing a plurality of pieces of landmark information and position information of the respective plurality of pieces of landmark information, the information processing apparatus including an image data taking-in means for taking in image data in accordance with an operation of the operation means, a position information setting means for setting position information of the image data taken in by the image data taking-in means, a landmark information selecting means for selecting the landmark information relating to the relevant image data based on the position information of the image data and the position information of the respective pieces of landmark information, and a display control means for sequentially displaying the image data and the landmark information selected by the landmark information selecting means in a predetermined order on the display means.

In the thirteenth aspect, similar to the first aspect, where the image data was acquired can be easily recalled.

A fourteenth aspect of certain example embodiments is an information processing method of an information processing apparatus having a display means, an operation means, and a storage means storing a plurality of pieces of landmark information and position information of the respective plurality of pieces of landmark information, the method including the steps of: (a) taking in image data in accordance with an operation of the operation means, (b) setting position information of the image data taken in by the step (a), (c) selecting the landmark information relating to the relevant image data based on the position information of the image data and the position information of the respective pieces of landmark information, and (d) sequentially displaying the image data and the landmark information selected by the step (c) in a predetermined order on the display means.

In the fourteenth aspect, similar to the first aspect, where the image data was acquired can be easily recalled.

The above described objects and other objects, features, and advantages of certain example embodiments will become more apparent from the following detailed description of preferred embodiments when taken in conjunction with the accompanying drawings.

BRIEF DESCRIPTION OF THE DRAWINGS

FIG. 2 is an illustrative view showing a top view and a left side view in a state where the game apparatus shown in FIG. 1 is folded;

FIG. 17 is an illustrative view showing an example of a reproduction list created at the time of slide reproduction;

FIG. 19 is an illustrative view showing detailed contents of landmark data and journey note data shown in FIG. 18;

DETAILED DESCRIPTION OF THE PREFERRED EMBODIMENTS

Figure 1:
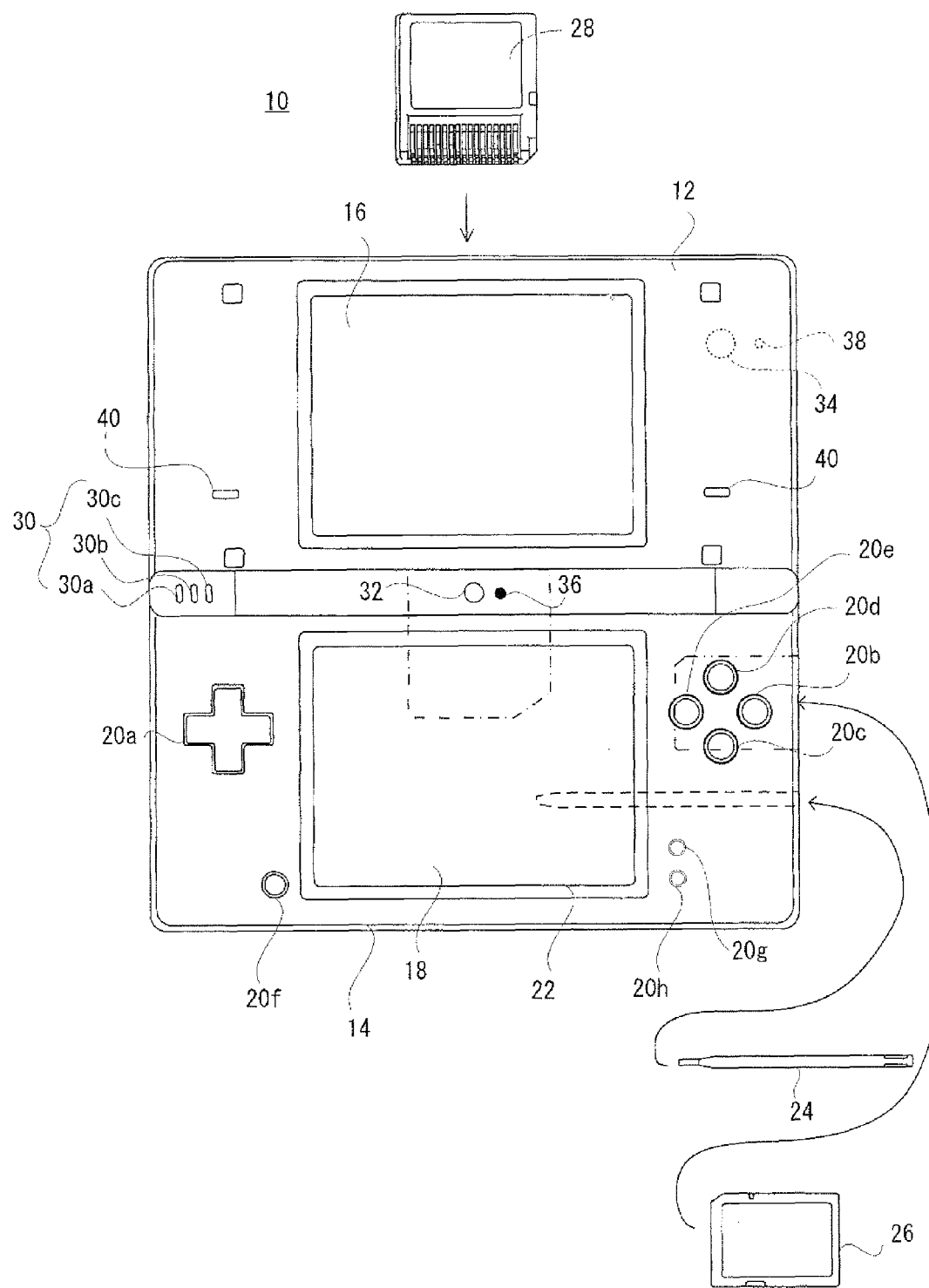
FIG. 1 is an illustrative view showing one embodiment of an appearance configuration of a game apparatus.

Referring to FIG. 1, a game apparatus 10 of one embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both of the hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at an arbitrary angle.

Additionally, the game apparatus 10 is mounted with a camera (32, 34) described later, functioning as an imaging device, such as imaging(photographing) an image with the camera (32, 34), displaying the photographing image on the screen, and saving the photographing image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

As shown in FIG. 1 and FIG. 2, the lower housing 14 is provided with respective operation buttons 20a-20k as an input device. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can be also used for an operation of a photographing instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot for the touch pen 24 and the housing portion need not to be provided.

Moreover, on the right side surface of the lower housing 14, a loading slot for housing a memory card 26 (represented by a chain double-dashed line in FIG. 1) is provided. At the inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. The inside of the loading slot, a connector (not illustrated) for electrically connecting the game apparatus 10 and the memory card 28 is provided. The memory card 28 is a recording medium of recording a information processing program and necessary data, and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the photographing image of the inward camera 32, that is, can image a direction to which the outer surface of the upper housing 12 is turned. Thus, in this embodiment, the two cameras 32, 34 are provided such that the photographing images of the inward camera 32 and the outward camera 34 are the opposite direction with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position of housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image and the first LCD 16 as a display means for mainly displaying the photographing image and a game screen. On the other hand, the lower housing 14 is provided with the input device (operation button 20 (20a-20k) and the touch panel 22) for performing an operation input to the game apparatus 10 and the second LCD 18 as a display means for displaying an operation explanatory screen and a game screen. Accordingly, the game apparatus 10 has two screens (16, 18) and two kinds of operating portions (20, 22).

Figure 3:
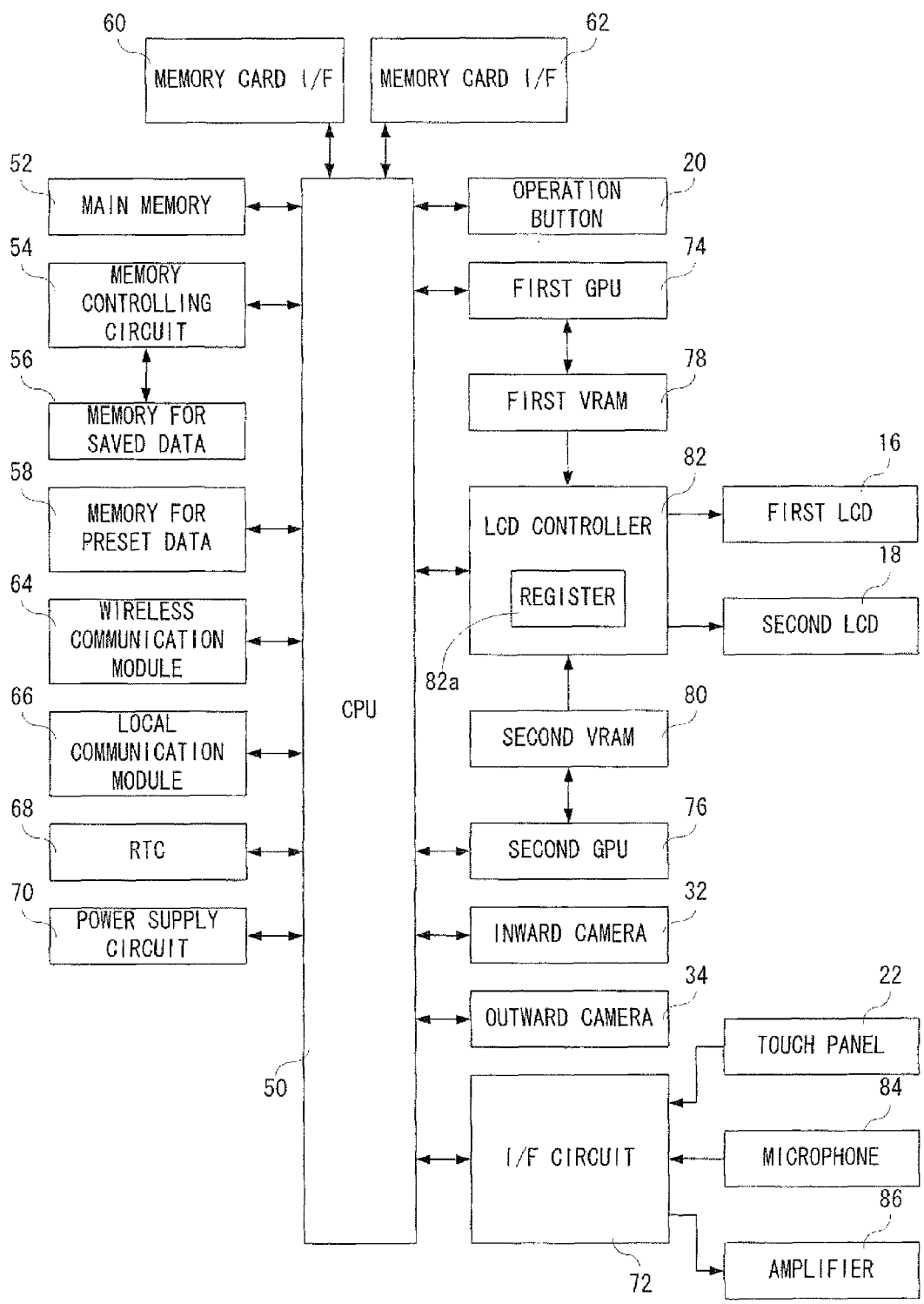
FIG. 3 is a block diagram showing an electric configuration of the game apparatus shown in FIGS. 1 and 2.

FIG. 3 is a block diagram showing an electric configuration of the game apparatus 10 of this embodiment. As shown in FIG. 3, the game apparatus 10 includes a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, and an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a storage means to be utilized as a work area and a buffer area of the CPU 50. That is, the main memory 52 stores (temporarily stores) various data to be utilized in the aforementioned game processing, and stores a program from the outside (memory cards 26 and 28, and another appliance). In this embodiment, as main memory 52, a PSRAM (Pseudo-SRAM) is used, for example. The memory for saved data 56 is a storage means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a storage means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 is read by the CPU 50 so as to be executed.

Here, the information processing program such as a game program or the like is not only supplied to the game apparatus 10 through the external storage medium, such as a memory card 28, etc. but also is supplied to the game apparatus 10 through a wired or a wireless communication line. In addition, the game program may be recorded in advance in a nonvolatile storage device inside the game apparatus 10. Additionally, as an information storage medium of storing the game program, an optical disk storage medium, such as a CD-ROM, a DVD, or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the RTC 68 and the power supply circuit 70. The RTC 68 counts a time to output the same to the CPU 50. For example, the CPU 50 can calculate a current time (date), etc. on the basis of the time counted by the RTC 68. The power supply circuit 70 controls power supplied from the power supply (typically, a battery accommodated in the lower housing 14) included in the game apparatus 10, and supplies the power to the respective circuit components within the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where the input is made.

The operation button 20 is made up of the aforementioned respective operation buttons 20a-20k, and connected to the CPU 50. The operation data indicating a input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 take images according to an instruction from the CPU 50, and output image data corresponding to the photographing images to the CPU 50. In this embodiment, the CPU 50 issues an photographing instruction to any one of the inward camera 32 and the outward camera 34 while the camera (32, 34) which has received the photographing instruction takes an image and sends the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and renders the same in the first VRAM 78. The second GPU 76 similarly generates a second display image according to an instruction form the CPU 50, and renders the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image rendered in the first VRAM 78 to the second LCD 18, and outputs the second display image rendered in the second VRAM 80 to the first LCD 16. Furthermore, in a case that the value of the register 82a is "1", the LCD controller 82 outputs the first display image rendered in the first VRAM 78 to the first LCD 16, and outputs the second display image rendered in the second VRAM 80 to the second LCD 18.

Figure 4:
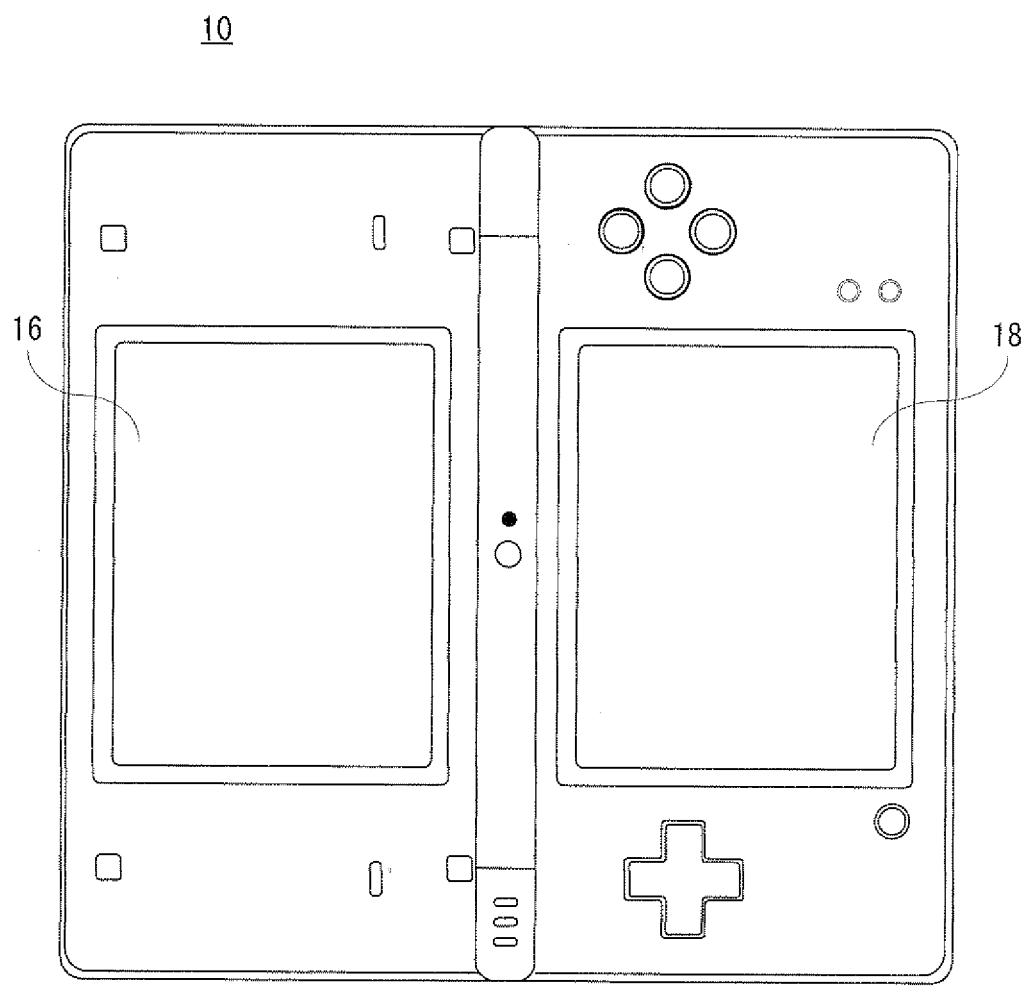
FIG. 4 is an illustrative view showing a use example of the game apparatus shown in FIGS. 1 and 2.

In FIG. 4, a use example of the game apparatus 10 shown in FIGS. 1 and 2 when the information processing of this embodiment is executed is illustrated. As shown in FIG. 4, the game apparatus 10 is grasped by a user or a player (hereinafter, simply referred to as a "user") in a state where it is rotated at about 90° counterclockwise from the state shown in FIG. 1. Accordingly, the first LCD 16 and the second LCD 18 are arranged side by side.

In the information processing of this embodiment, a part of range (hereinafter, referred to as a "region") such as a city, town or village, shopping area, or a date area is selected from a relatively large range such as a prefecture (hereinafter, referred to as a "whole range"), and a map of the selected region is displayed on the first LCD 16 and the second LCD 18.

In the map of the selected region, landmarks are set (displayed) in advance. The user looks up information of the landmarks and the like to plan a trip, shopping, date or the like. In this embodiment, the "landmark" means a building construction (store, shopping mall, building, tower, amusement park (theme park), museum, aquarium, temple, castle, house, station, bridge or the like), stock farm, mountain, river, lake or pond, hill, road (intersection) or the like, which is registered in advance.

For example, the user goes on a trip, goes shopping or goes on a date in accordance with the landmarks, and takes a photograph if desired. The taken photograph (photographing image) can be stored. Also, a handwritten note is created by an instruction of the user, and an image of the created handwritten note (handwriting image) can be stored. Time and date information is added to the photographing image and the handwriting image. The photographing image and the handwriting image are attached to the map by an instruction of the user.

Moreover, the photographing image and the handwriting image can be viewed in a slide show. In this embodiment, the slide show is reproduced, using position information and the time and date information. In simple terms, the photographing images and the handwriting images are displayed in an order following the photographed or created time and date. At this time, an image of the landmark existing around a position on the map where the photographing image and the handwriting image are attached is also displayed.

It is simply because where the photograph was taken or where the handwritten note was created cannot be readily recalled if only the photographing image and handwriting image are displayed that the image of the landmark is displayed together with the photographing image and the handwriting image in this manner.

Figure 5:
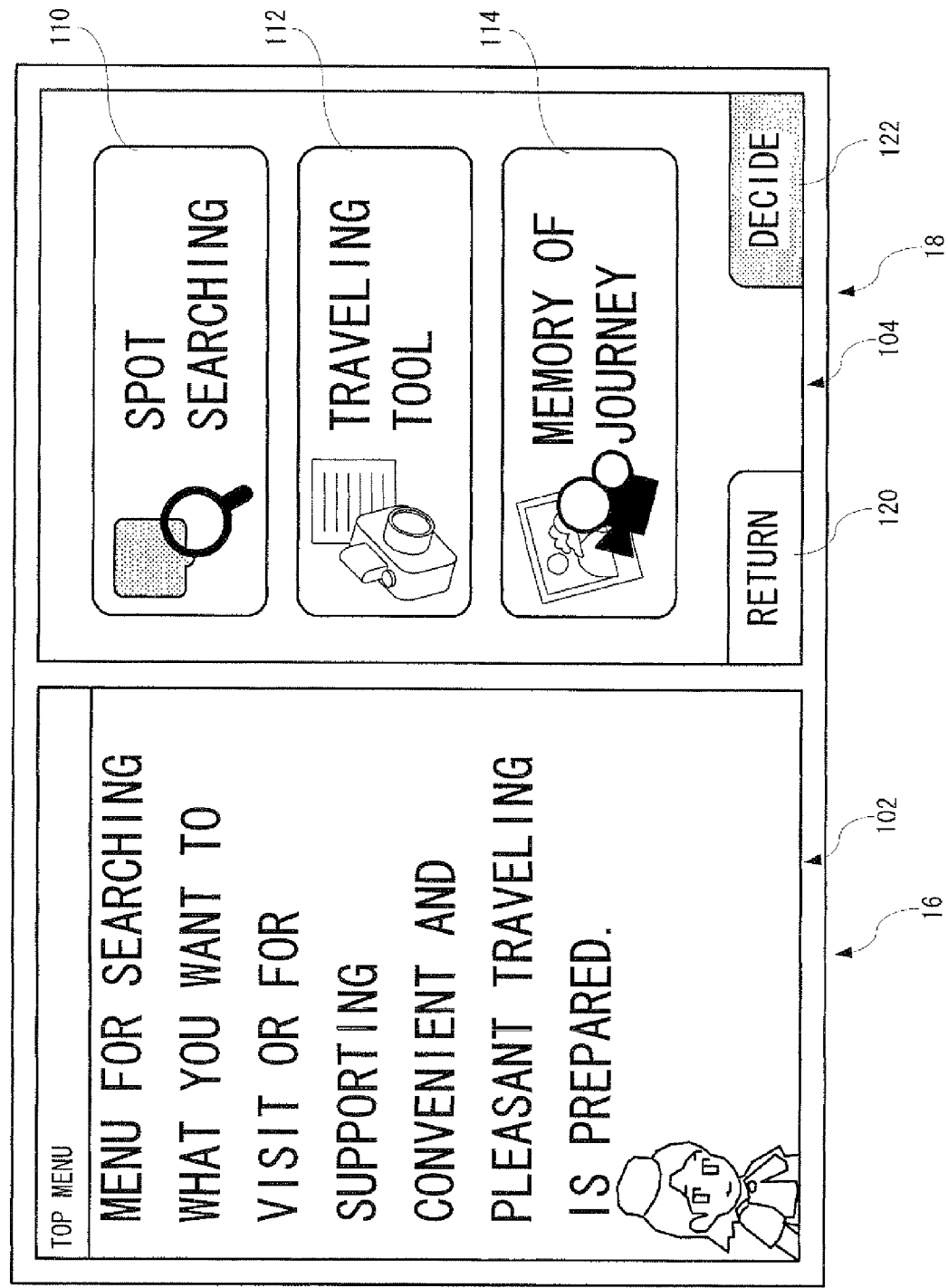
FIG. 5 is an illustrative view showing an example of a top menu screen displayed on a first LCD and a second LCD shown in FIG. 4.

FIG. 5 is an illustrative view showing a top menu screen 100 displayed on the first LCD 16 and the second LCD 18 when the information processing of this embodiment is started. In the top menu screen 100, a left screen 102 is displayed on the first LCD 16, and a right screen 104 is displayed on the second LCD 18. On the left screen 102, the effect that the relevant screen is a top menu, and a brief description of the relevant screen are displayed. On the right screen 104, a button image 110, a button image 112, and a button image 114 of functions selectable on the top menu are displayed in tandem in a screen center, and a button image 120 and a button image 122 are displayed below the button image 114.

The button image 110 is provided to select a function of "spot searching". Although an illustration is omitted, when the function of "spot searching" is executed, a searching screen for searching a spot, that is, landmark is displayed, and a desired landmark of the user is searched on this searching screen. An introduction screen for introducing a recommended route (landmarks considered to be good to visit and on order of visit) in a certain region is displayed. The button image 112 is provided to select a function of "traveling tool" of displaying a map and the like as described later. The button image 114 is provided to select a function of "memory of journey" of reproducing a slide show and the like as described later.

Although an illustration is omitted, on the right screen 104, when any one of the button images 110 to 114 is turned on (selected), a brief description of the function of the selected button image (110, 112, 114) is displayed on the left screen 102. Moreover, when in a state where any one of the button images 110 to 114 is selected, the button image 122 is turned on, the function set in the selected button image (110, 112, 114) is executed. Although an illustration is omitted, when any one of the button images 110 to 114 is selected, a cursor (not shown) is displayed on the selected button image (110, 112, 114), and the selection of that button image (110, 112, 114) is visibly displayed. However, the embodiment is not limited to this, but the button images not selected (110, 112, 114) may be subjected to color reversal or grayout, a color of a frame of the selected button image (110, 112, 114) may be changed or luminance of the frame may be increased. Hereinafter, when any of the button images are turned on (selected), the foregoing is similar.

Although a detained description is omitted, when turning on the button image (110 to 114, 120, 122) displayed on the top menu screen 100, the user directly touches (turns on) any one of the button images displayed on the second LCD 18 using the touch pen 24, or operates the operation buttons (20a to 20k) to move the cursor (not shown) displayed on the second LCD 18 and to turn on the button image instructed by the cursor. When the touch pen 24 is used, a display position on the second LCD 18 indicated by touch position data corresponding to a touch position is detected, and the button image (110 to 114, 120, 122) displayed in the relevant displayed position is turned on. Hereinafter, when any of the button images is turned on (selected) or when an icon is touched (turned on), the foregoing is similar.

For example, in a state where none of the button images 110 to 114 is touched, the button image 122 is displayed in a state where it is disabled to be turned on (displayed in a grayout state, or displayed at low luminance), while in a state where any one of the button images 110 to 114 is touched, it is displayed in a state where it is enabled to be turned on (displayed in a colored state, or displayed at high luminance). With button images 172, 622 of "decision" (see FIGS. 6 and 15) described later, the foregoing is similar. Moreover, although an illustration is omitted, turning on the button image 120 returns the screen to a menu screen of the game apparatus 10 itself.

Figure 6:
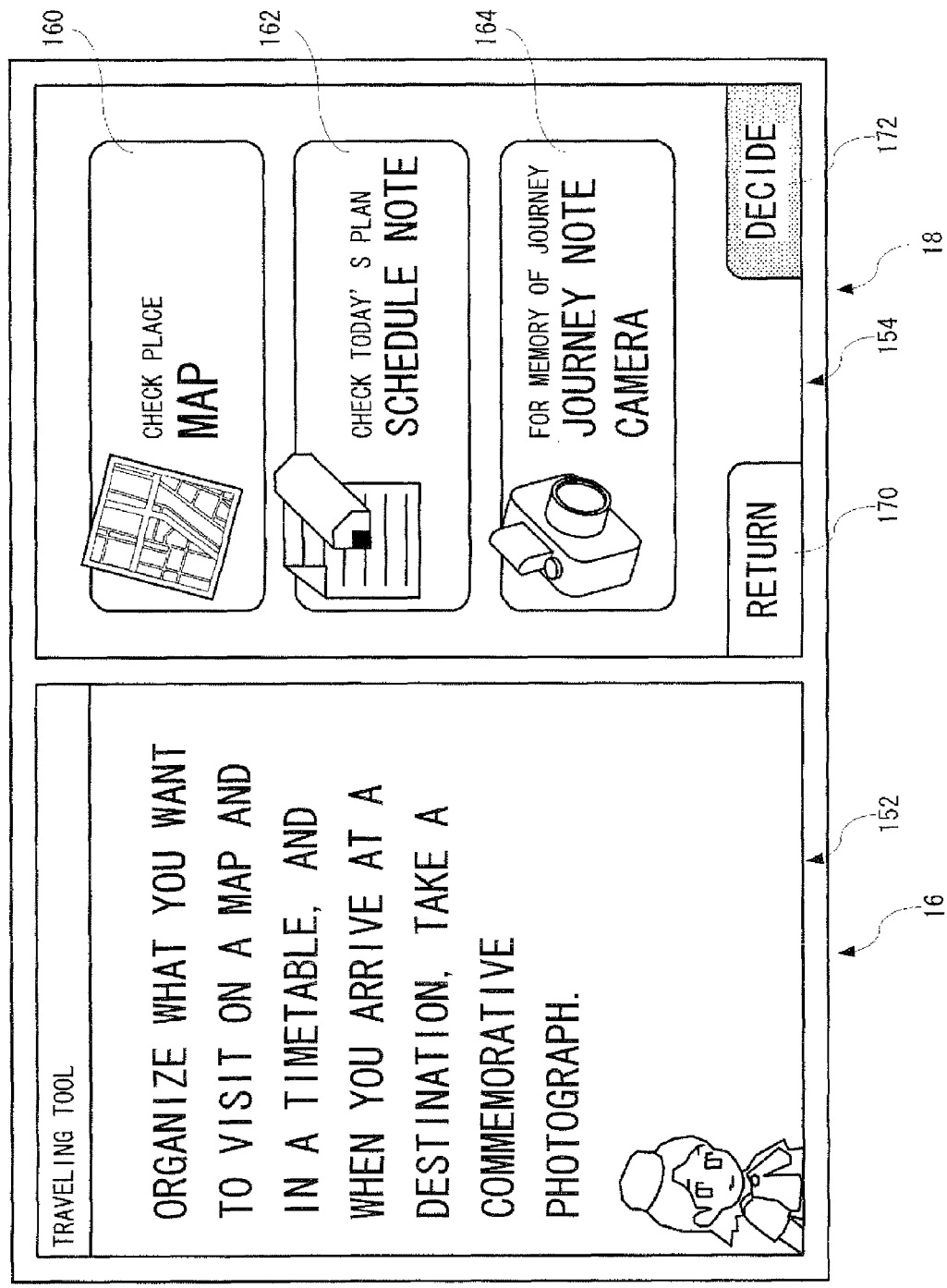
FIG. 6 is an illustrative view showing an example of a traveling tool screen displayed on the first LCD and the second LCD shown in FIG. 4.

In the top menu screen 100, when the button image 122 is turned on with the button image 112 turned on, the function of "traveling tool" is executed, and a traveling tool screen 150 as shown in FIG. 6 is displayed. As shown in FIG. 6, in the traveling tool screen 150, a left screen 152 is displayed on the first LCD 16, and a right screen 154 is displayed on the second LCD 18. On the left screen 152, the effect that the relevant screen is the traveling tool screen 150 and a brief description of the relevant screen are displayed. On the right screen 154, a button image 160, a button image 162 and a button image 164 of functions selectable on this traveling tool screen 150 are displayed in tandem in a screen center, and a button image 170 and a button image 172 are displayed below the button image 164.

The button image 160 is provided to select a function of "map" as described later. The button image 162 is provided to select a function of "schedule note". Although an illustration is omitted, for example, when the function of "schedule note" is executed, a screen for inputting a schedule (plan) of traveling or the like is displayed, so that the schedule can be inputted. The button image 164 is provided to select a function of "journey note camera" as described later.

Although an illustration is omitted, as in the top menu screen 100, when any one of the button images 160 to 164 is turned on (selected), a brief description of the function assigned to the selected button image (160, 162, 164) is displayed on the left screen 152. Moreover, when the button image 172 is turned on in a state where any one of the button images 160 to 164 is selected, the function assigned to the selected button image (160, 162, 164) is executed. When the button image 170 is turned on, the screen returns to the top menu screen 100 shown in FIG. 5.

Figure 7:
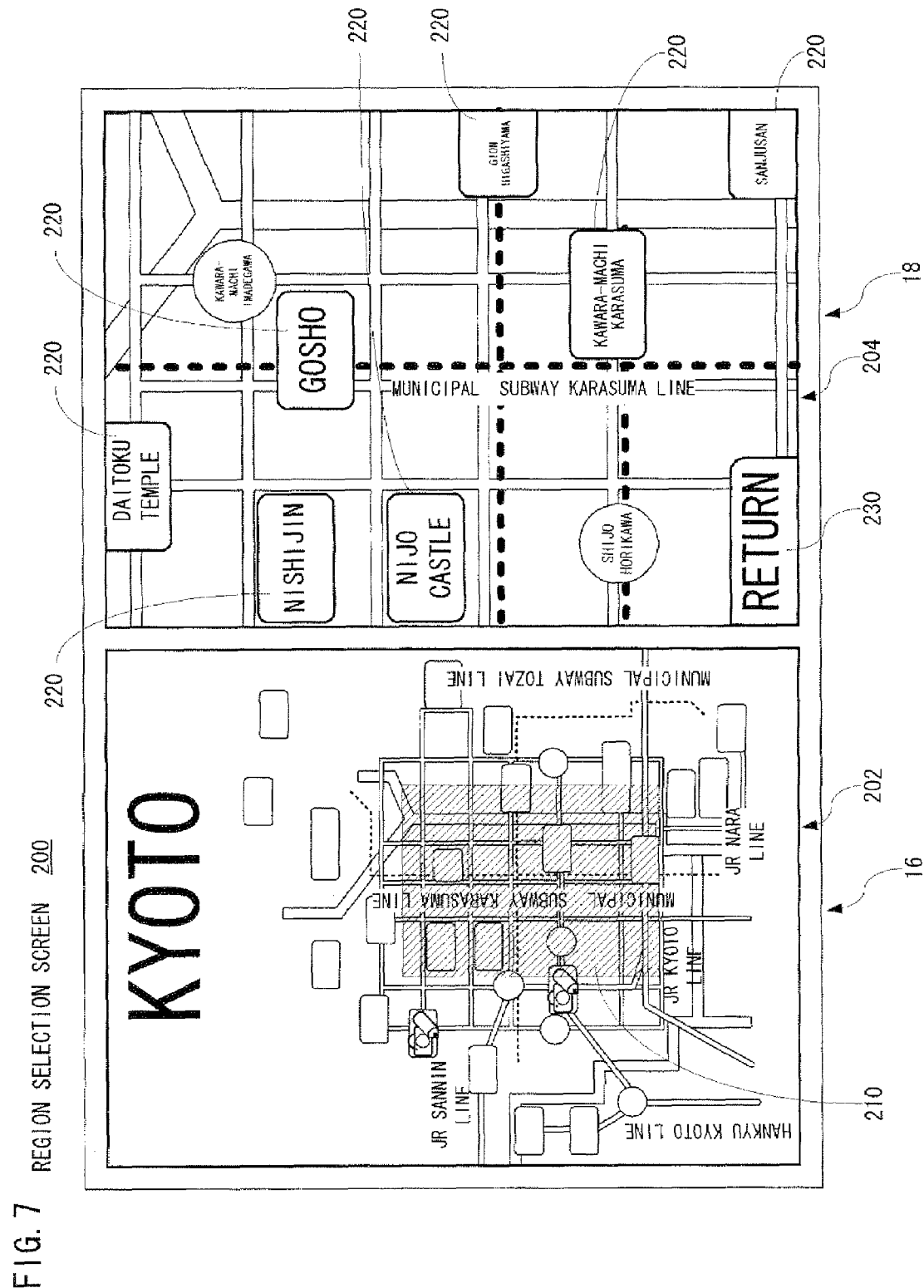
FIG. 7 is an illustrative view showing an example of a region selection screen displayed on the first LCD and the second LCD shown in FIG. 4.

In the traveling tool screen 150, when the button image 172 is turned on in a state where the button image 160 is tuned on, the function of "map" is executed, and a region selection screen 200 is displayed as shown in FIG. 7. This region selection screen 200 is a screen for selecting a region, on which a detailed map is displayed. As shown in FIG. 7, in the region selection screen 200, a left screen 202 is displayed on the first LCD 16, and a right screen 204 is displayed on the second LCD 18. On the left screen 202, a brief map of a whole range is displayed. In an example shown in FIG. 7, a brief map of Kyoto prefecture as the whole range is displayed on the left screen 202. On the other hand, on the right screen 204, an enlarged map of a range indicated by a rectangular frame 210, which is shaded on the left screen 202, is displayed. That is, the map for selecting the region is displayed on the right screen 204. On this right screen 204, one or more button images 220 with names of selectable regions described are displayed on the map. Here, the selectable regions mean regions whose detailed maps can be displayed. Moreover, in a lower-left portion of the right screen 204, a button image 230 is displayed. Turning on this button image 230 returns the screen to the traveling tool screen 150 shown in FIG. 6. Further, although an illustration is omitted, when the right screen 204 is scrolled (moved) vertically and horizontally by the cross key 20a or the touch pen 24, the frame 210 of the left screen 202 is also moved in accordance with this (in accordance with the display range).

While in this embodiment, the frame 210 is shaded, alternatively only the frame 210 not daubed may be displayed, or the frame 210 may be translucently displayed.

Figure 8:
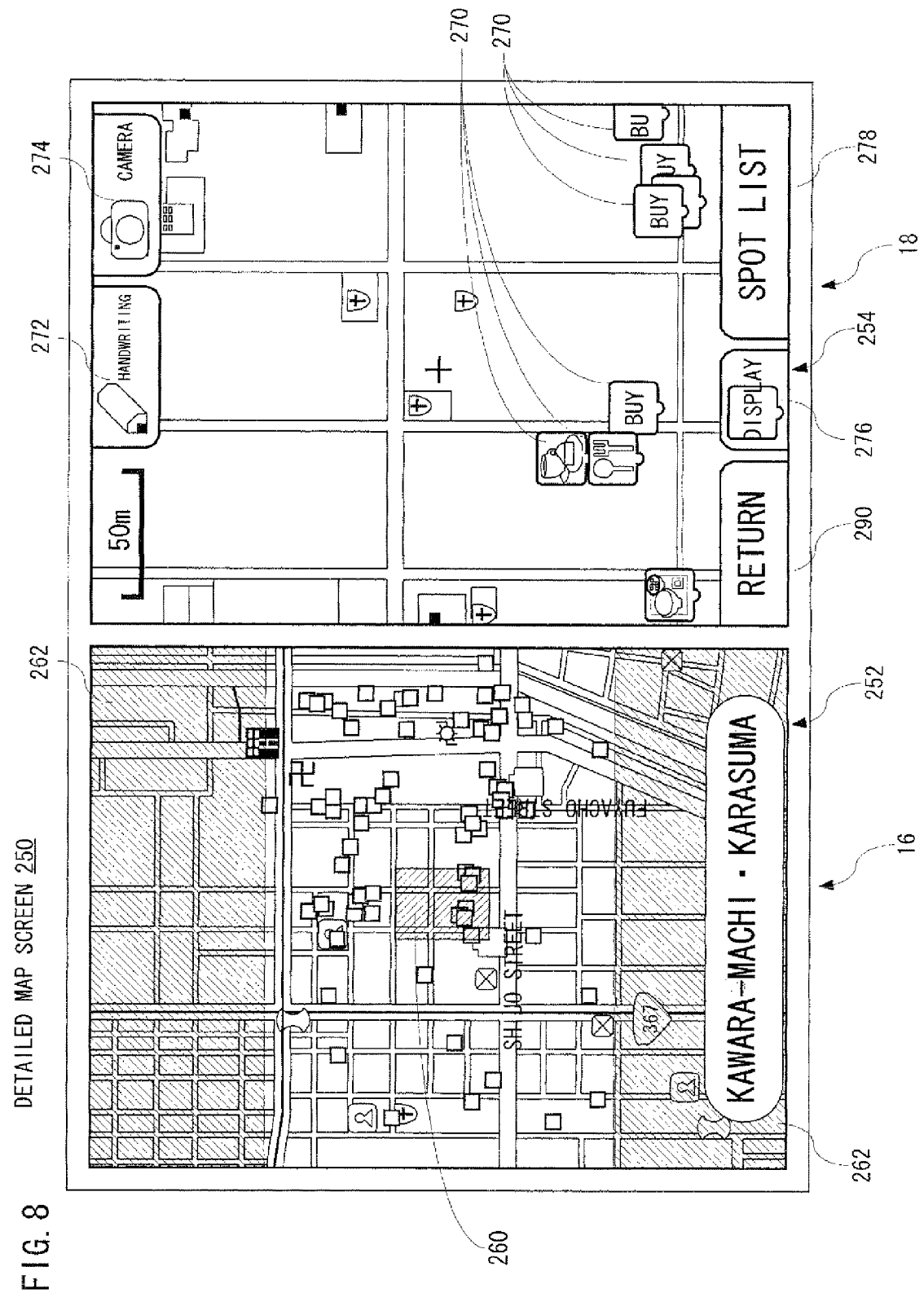
FIG. 8 is an illustrative view showing an example of a detailed map screen displayed on the first LCD and the second LCD shown in FIG. 4.

For example, in the region selection screen 200 shown in FIG. 7, when the button image 220 of a certain region (in this case, "Kawaramachi Karasuma") is turned on, a detailed map screen 250 of the region is displayed as shown in FIG. 8. In the detailed map screen 250, a left screen 252 is displayed on the first LCD 16, and a right screen 254 is displayed on the second LCD 18. On the left screen 252, a map including the whole of the region selected in the region selection screen 200 is displayed. As shown in FIG. 8, in this embodiment, the map of the whole of the region selected on the region selection screen 200, and regions adjacent to the same in a vertical (north and south) direction is displayed. A detailed map of a range indicated by a quadrangular frame 260, which is shaded on the left screen 252, is displayed on the right screen 254. However, by displaying quadrangular frames 262 in a shaded manner, it is indicated that the regions adjacent to the region selected on the region selection screen 200 are out of the range whose detailed map can be displayed (are ranges beyond the selected region) in this detailed map screen 250.

Figure 10:
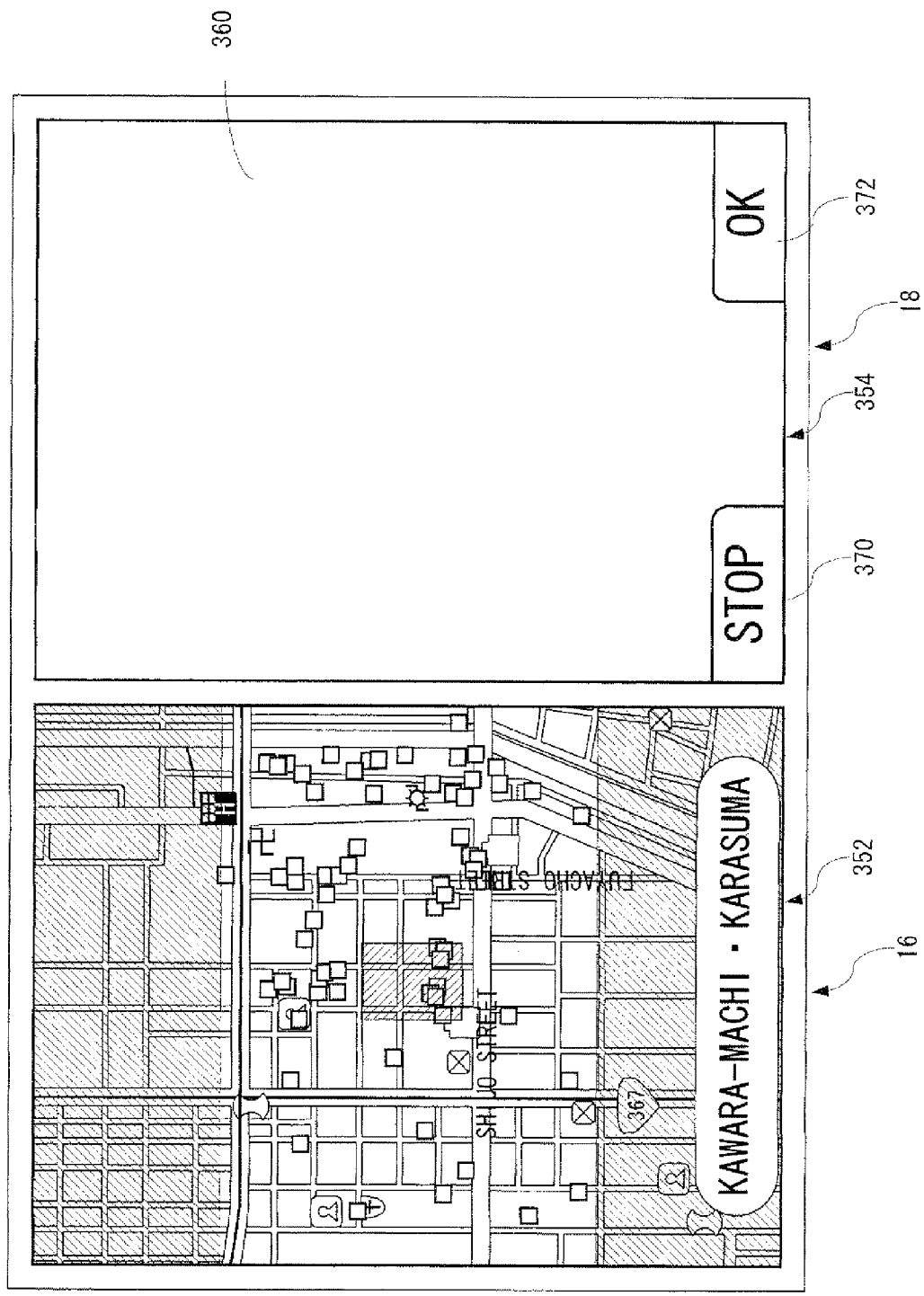
FIG. 10 is an illustrative view showing an example of a handwriting screen displayed on the first LCD and the second LCD shown in FIG. 4.
Figure 12:
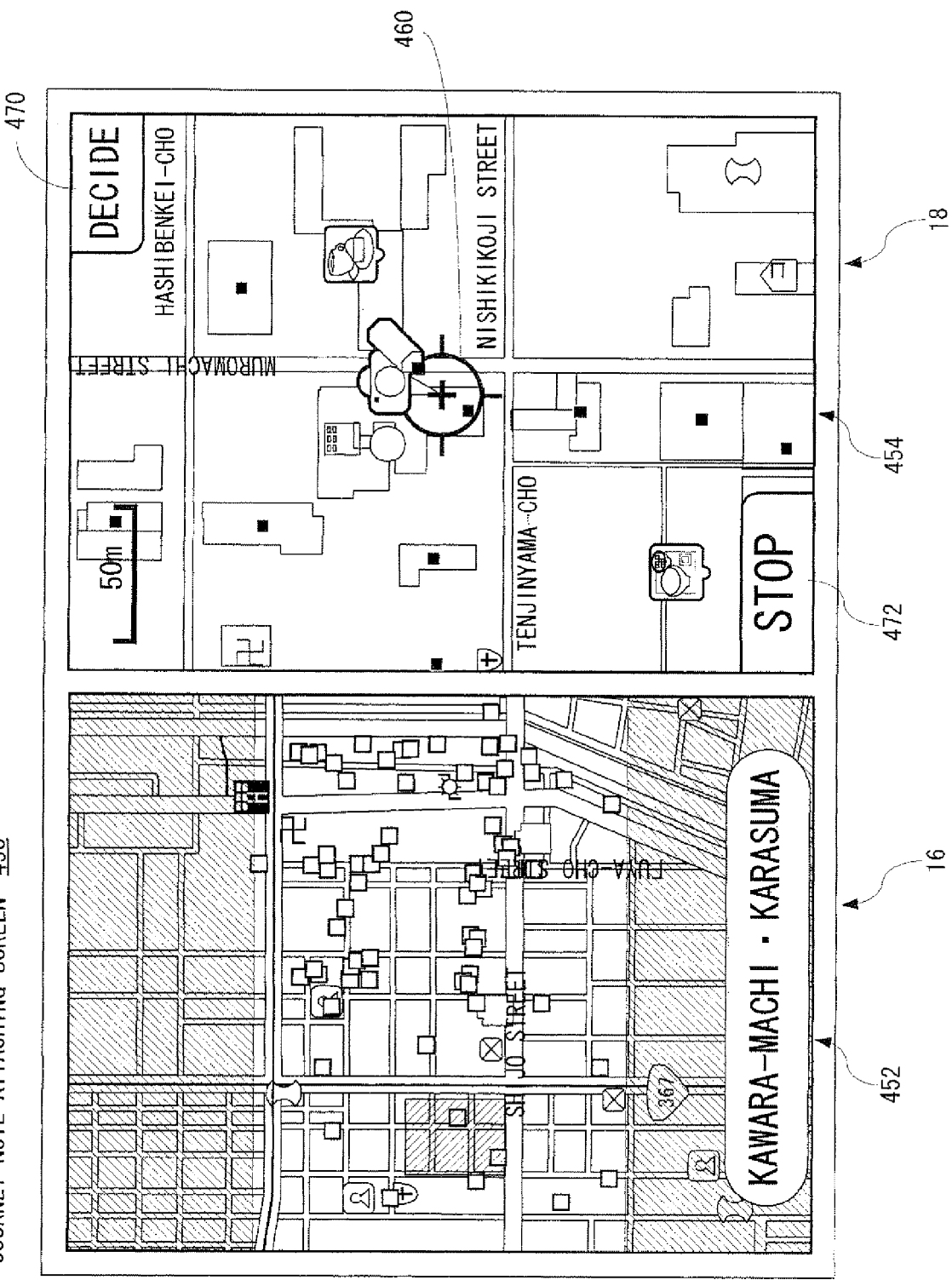
FIG. 12 is an illustrative view showing an example of a journey note attaching screen displayed on the first LCD and the second LCD shown in FIG. 4.

While in FIG. 8, the frame 260 and the frames 262 are shaded similarly, these are not necessarily similar. Moreover, with the frame 260, the range may be translucently displayed, or may be displayed only by a frame not daubed with color or the like instead of being shaded. In FIGS. 10 and 12 described later, the foregoing is similar.

As described above, the detailed map of the frame 260 is displayed on the right screen 254. Moreover, on the map, icons 270 of the landmarks are displayed. These icons 270 are set in advance to display detailed information of the corresponding landmarks. The icons 270 are displayed in positions on the map where the corresponding landmarks exist. Although a detailed description is omitted, the respective landmarks are displayed in the positions when information of real positions (latitude and longitude) is converted to information of the positions (position information) on the map displayed on the second LCD 18 of the game apparatus 10.

A design displayed by each of the icons 270 indicates a type of the landmark or contents, which may be hard to understand in the drawing.

Moreover, on the right screen 254, an icon 272 and an icon 274 are provided side by side in an upper portion of the screen, and an icon 276 and an icon 278 are provided side by side in a lower portion of the screen. Furthermore, to the left of the icon 276, a button image 290 is provided. The icon 272 is provided to draw (create) a handwritten note. The icon 274 is provided to take a photograph by the imaging apparatus (the inward camera 32 and the outward camera 34). The icon 276 is provided to display or undisplay the icons 270. That is, when the icons 270 are displayed, clicking on the icon 276 vanishes (undisplays) the icons 270 displayed on the map of the right screen 254. On the other hand, when the icons 270 are not displayed, clicking on the icon 276 displays the icons 270 of the landmarks registered in advance on the map of the right screen 254. The icon 278 is provided to display, on the left screen 252 (or right screen 254), a list of the landmarks (spots) selectable on this detailed map screen 250. Moreover, turning on the button image 290 returns the screen to the above-described region selection screen 200.

Although a detailed description is omitted, operating the predetermined button (e.g., the select button 20h) when this detailed map screen 250 is displayed executes reproduction processing of a slide show described later. Accordingly, an icon for executing the reproduction of the slide show may be provided on the right screen 254 of the detailed map screen 250.

Figure 9:
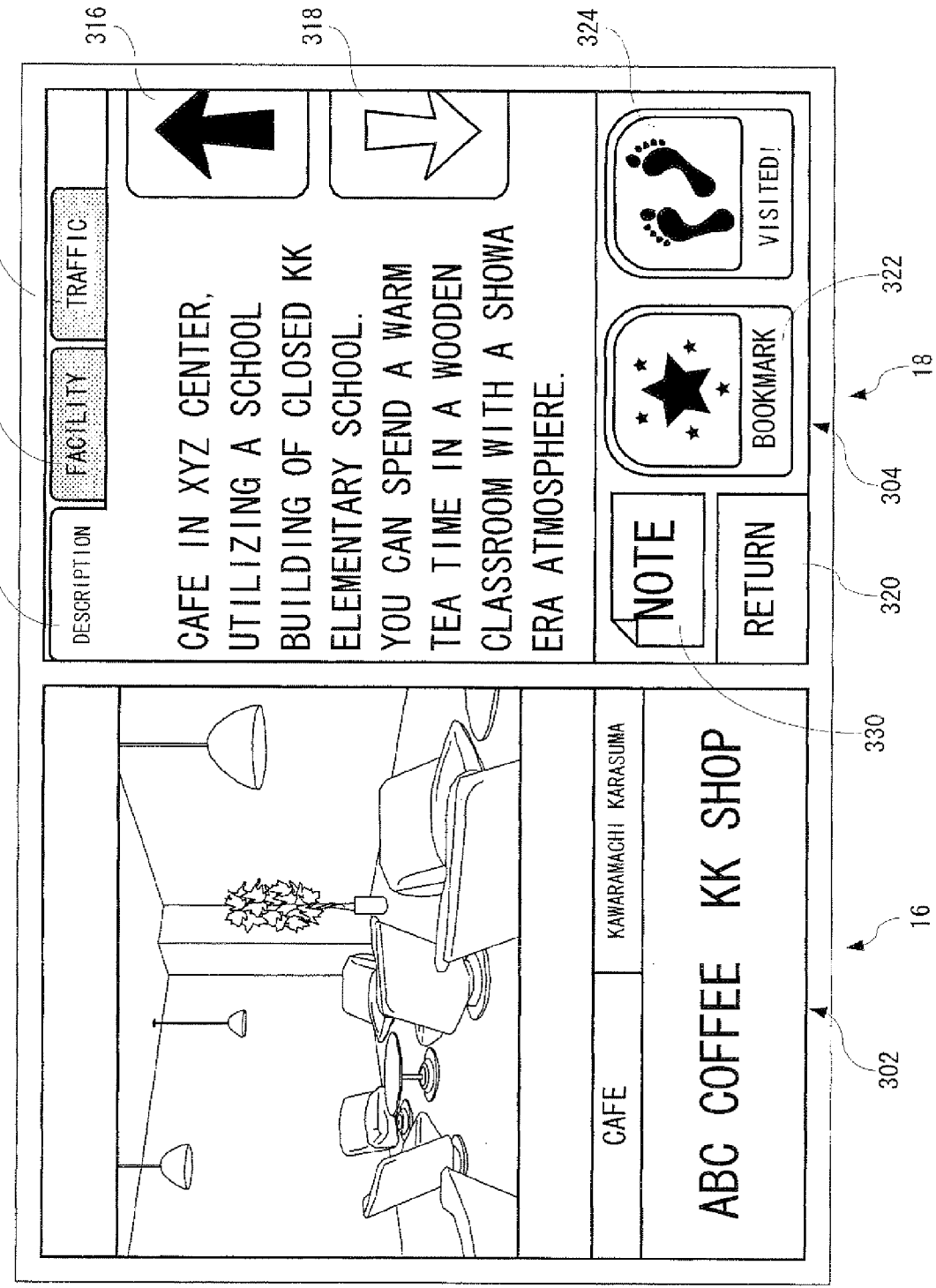
FIG. 9 is an illustrative view showing an example of a landmark detail screen displayed on the first LCD and the second LCD shown in FIG. 4.

In the detailed map screen 250 of FIG. 8, when the icon 270 is touched, as shown in FIG. 9, a screen for displaying details of the corresponding landmark, that is, a landmark detail screen 300 is displayed. As shown in FIG. 9, in the landmark detail screen 300, a left screen 302 is displayed on the first LCD 16, and a right screen 304 is displayed on the second LCD 18. On the left screen 302, a name of the landmark and an image of the landmark (image of a photograph, poster, illustration or the like) are displayed.

On the right screen 304, a button image 310, a button image 312, and a button image 314 are displayed side by side in an upper portion of the screen. Moreover, on the right screen 304, a button image 316 and a button image 318 are displayed in tandem in a right end portion of the screen. Further, on the right screen 304, a button image 320, a button image 322 and the button image 324 are displayed side by side in a lower portion of the screen. On the right screen 304, an icon 330 is provided above the button image 320.

When the button image 310 is turned on, a description of the relevant landmark is displayed (as text) almost in the center of the right screen 304. At this time, turning on the button image 316 or the button image 318 allows the display to be scrolled up and down. Hereinafter, when the button image 312 and the button image 314 are turned on, the foregoing is similar. Turning on the button image 312 displays information such as a telephone number, business hours, a regular holiday, and presence and absence of a parking space of the landmark as text almost in the center of the right screen 304. Turning on the button image 314 displays information of an address, a near station, and a near exit of the landmark as text almost in the center of the right screen 304.

Moreover, turning on the button image 320 returns the screen to the detailed map screen 250 shown in FIG. 8. Turning on the button image 322 enables the relevant landmark to be registered as a "bookmark". However, turning on the button image 322 when the landmark has already been registered as a "bookmark" allows the bookmark registration of the landmark to be cancelled. Turning on the button image 324 allows the visit to the relevant landmark to be registered. Turning on the button image 324 when the visit to the landmark is registered allows the registration of the visit to be cancelled. Accordingly, when the user registers the visit to the landmark by mistake, the user can cancel it.

The icon 330 is provided to write a note of the landmark. Although an illustration is omitted, when the icon 330 is touched, a screen of a keyboard is displayed on the right screen 304, and a note as text can be inputted. For example, the inputted note will be displayed as text in an upper portion of the left screen 302 when the landmark detail screen 300 of this landmark is displayed next time or later. Moreover, once the note has been inputted, touching the icon 330 enables the note to be edited.

Referring back to FIG. 8, turning on the button image 272 displays a handwriting screen 350 as described in FIG. 10. As shown in FIG. 10, in the handwriting screen 350, a left screen 352 is displayed on the first LCD 16, and a right screen 354 is displayed on the second LCD 18. Since the left screen 352 is the same as the left screen 252 of the detailed map screen 250 of FIG. 8, a duplicate description is omitted. On the right screen 354, a blank area 360 is provided, and a button image 370 and a button image 372 are displayed in a lower portion of the screen. The user can draw a letter, a symbol, an image and the like in the blank area 360 freely by the touch pen 24 or a finger. That is, a handwritten note is created. Turning on the button image 370 decides to stop (finish) the handwriting, and returns the screen to the detailed map screen 250 shown in FIG. 8. At this time, when some letter and the like have been drawn in the blank area 360, all of them are deleted. Turning on the button image 372 allows the handwritten note to be recorded. In this embodiment, image data corresponding to an image (handwriting image) of the handwritten note drawn in the blank area 360 is stored in the internal memory (the main memory 52 or the data memory for saving 56) of the game apparatus 10 in a predetermined format (e.g., by bitmap or by JPEG). The image data of the handwriting image may be recorded on the external memory (the memory card 26) loaded on the game apparatus 10. Moreover, when the image data of the handwriting image is stored, time and date information of a creation time and date of the handwritten note is stored in association with the relevant image data. The date and a current time are acquired from the RTC 68 incorporated in the game apparatus 10.

Although an illustration is omitted, once the image data of the handwriting image is recorded, a button image for selecting whether or not the relevant handwriting image is to be attached to the map is displayed on the second LCD 18 (the right screen 354). When it is selected that the handwriting image is to be attached to the map, a journey note attaching screen 450 (see FIG. 12) is displayed as described later. On the other hand, when it is selected that the handwriting image is not to be attached to the map, the screen returns to the detailed map screen 250 shown in FIG. 8 as it is. However, even when it is selected here that the handwriting image is not to be attached to the map, it will be able to be attached to the map later.

Figure 11:
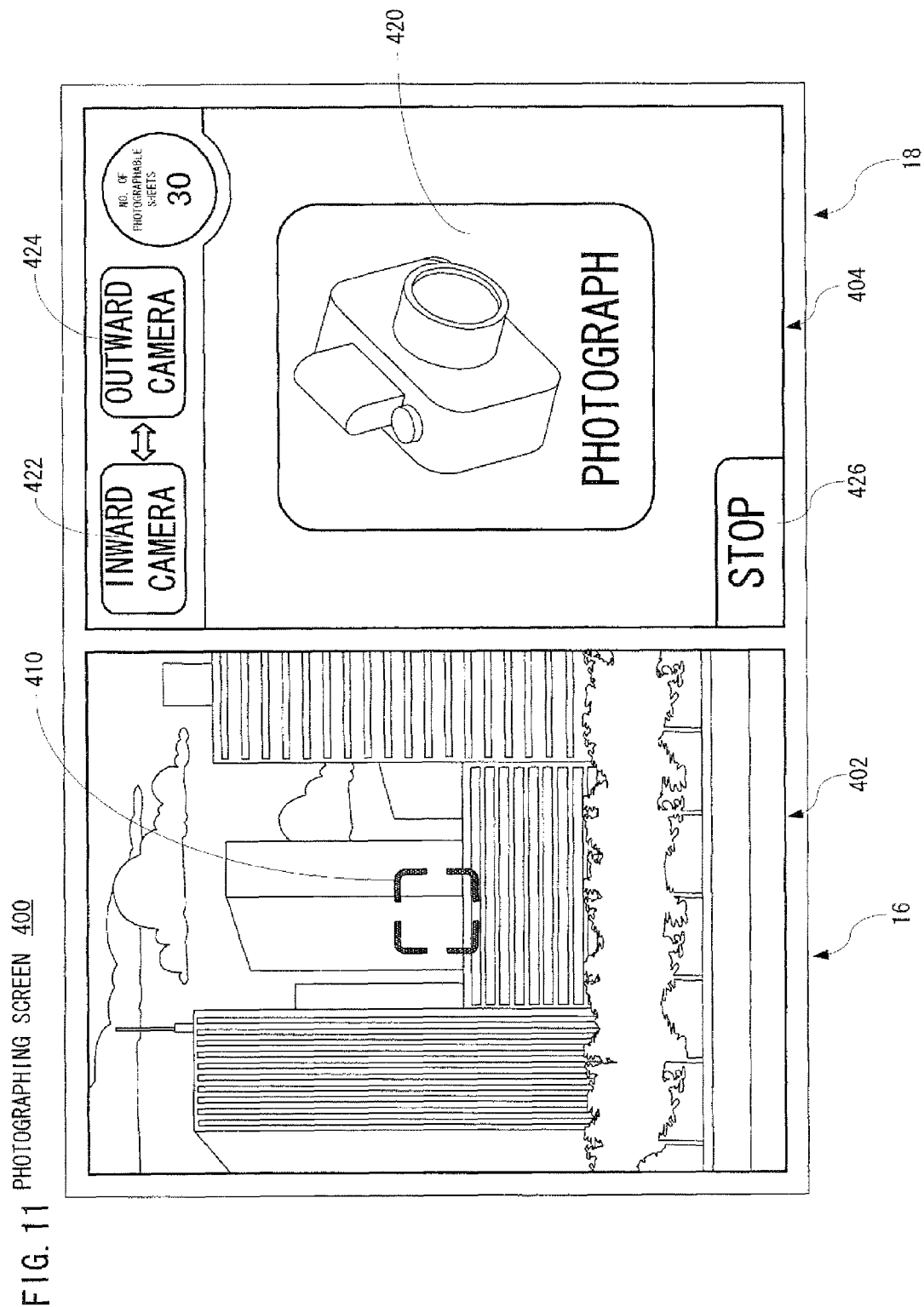
FIG. 11 is an illustrative view showing an example of a photographing screen displayed on the first LCD and the second LCD shown in FIG. 4.

Moreover, when on the traveling tool screen 150 shown in FIG. 6, the button image 172 is turned on in a state where the button image 164 is turned on, or when the icon 274 is touched on the detailed map screen 250 shown in FIG. 8, a photographing screen 400 is displayed as shown in FIG. 11. As can be seen from FIG. 11, in the photographing image 400, a left screen 402 is displayed on the first LCD 16, and a right screen 404 is displayed on the second LCD 18. On the left screen 402, an image (moving image or still image) taken in by the inward camera 32 or the outward camera 34 is displayed. That is, when a moving image (through image) is displayed on the left screen 402, the first LCD 16 functions as a viewfinder. Moreover, when the through image is displayed on the left screen 402, a square-shaped photographing guide 410 is displayed in the center. Although a detailed description is omitted, a range surrounded by the photographing guide 410 in a subject is focused on.

On the right screen 404, a button image 420 is displayed almost in the center of the screen. Moreover, on the right screen 404, button images 422 and 424 are displayed side by side in an upper portion of the screen. Further, a button image 426 is displayed below the button image 420 in a lower portion of the right screen 404. The button image 420 functions as a shutter button, and when the shutter button is turned on, at this time, an image taken by the inward camera 32 or the outward camera 34 (photographing image) is taken in. Although the detailed description is omitted, the L button 20*i* and the R button 20*j* also function as the shutter buttons. Moreover, turning on the button image 422 allows the inward camera 32 to be selected, while turning on the button image 424 allows the outward camera 34 to be selected. That is, the cameras (32, 34) are switched by the button image 422 and the button image 424. By turning on the button image 426, stopping (finishing) the photographing is selected, and the screen returns to the detailed map screen 250 shown in FIG. 8.

Although a detailed description is omitted, on the right screen 404, a number of photographable sheets is displayed to the right of the button image 424 in the upper portion of the screen.

Moreover, although an illustration is omitted, once the photographing image taken by the inward camera 32 or the outward camera 34 is acquired, the photographing image is displayed on the first LCD 16 (the left screen 402), and a button image for selecting whether or not the photograph image is to be saved is displayed on the second LCD 18 (the right screen 404). When the saving of the photographing image is selected, image data corresponding to the photographing image is stored in the internal memory (the main memory 52 or the data memory for saving 56) of the game apparatus 10 in a predetermined format (e.g., by bitmap or by JPEG). The image data of the photographing image may be recorded on the external memory (the memory card 26) loaded on the game apparatus 10. When the image data of the photographing image is stored, time and date information of a photographing time and date is stored in association with the image data of the relevant photographing image. The time and date and a current time are acquired from the RTC 68 incorporated in the game apparatus 10. On the other hand, when it is selected that the photographing image is not to be saved, the image data of the photographing image is deleted as it is, and the screen returns to the photographing screen 400 shown in FIG. 11.

Moreover, although an illustration is omitted, once the photographing image is saved, a button image for selecting whether or not this photographing image is to be attached to the map is displayed on the second LCD 18 (the right screen 404). When it is selected that the photographing image is to be attached to the map, the journey note attaching screen 450 (see FIG. 12) is displayed as described later. On the other hand, when it is selected that the photographing image is not to be attached to the map, the screen returns to the detailed map screen 250 shown in FIG. 8 as it is. However, even when it is selected that the photographing image is not to be attached to the map, it will also be able to be attached to the map later.

As described above, when it is selected that the handwriting image or photographing image are to be attached to the map, the journey note attaching screen 450 as shown in FIG. 12 is displayed. In this embodiment, in the case where simply a "journey note" is referred to, it means a handwritten note or/and a taken photograph. Moreover, in the case where an "image of journey note" is referred to, it means a handwriting image or/and a photographing image. As shown in FIG. 12, in the journey note attaching screen 450, a left screen 452 is displayed on the first LCD 16, and a right screen 454 is displayed on the second LCD 18. Since the left screen 452 is the same as the left screen 252 of the above-described detailed map screen 250 of FIG. 8, a duplicate description is omitted.

On the right screen 454, an instruction image 460 for instructing a position where the journey note is to be attached is displayed almost in the center of the screen. Moreover, on the right screen 454, a button image 470 is displayed in an upper portion of the screen, and a button image 472 is displayed in a lower portion of the screen. By turning on the button image 470, the position where the journey note is to be attached is decided in a position on the map indicated by a cross of the instruction image 460, and position information corresponding to the position on the map is recorded in association with the journey note. Moreover, by turning on the button image 472, stopping (finishing) the attachment of the journey note is selected, and the screen returns to the detailed map screen 250 shown in FIG. 8.

As described above, scrolling the map displayed on the right screen 454 allows the position where the journey note is to be attached to be selected. That is, in this embodiment, the instruction image 460 is displayed in a fixed manner almost in the center of the right screen 454, and by scrolling the map, the attachment position is selected.

The journey note is attached as described above, and then, when the detailed map screen 250 as shown in FIG. 8 is displayed, not only the icon 270 of the landmark but also an icon of the journey note is displayed on the map, whose illustration is omitted. By touching this icon of the journey note, the journey note corresponding to the icon is displayed. That is, a browsing function of the journey note is executed. For example, in FIG. 13, a journey note browsing screen 500 when a handwriting image is displayed is displayed, and in FIG. 14, a journey note browsing screen 550 when a photographing image is displayed is displayed.

Figure 13:
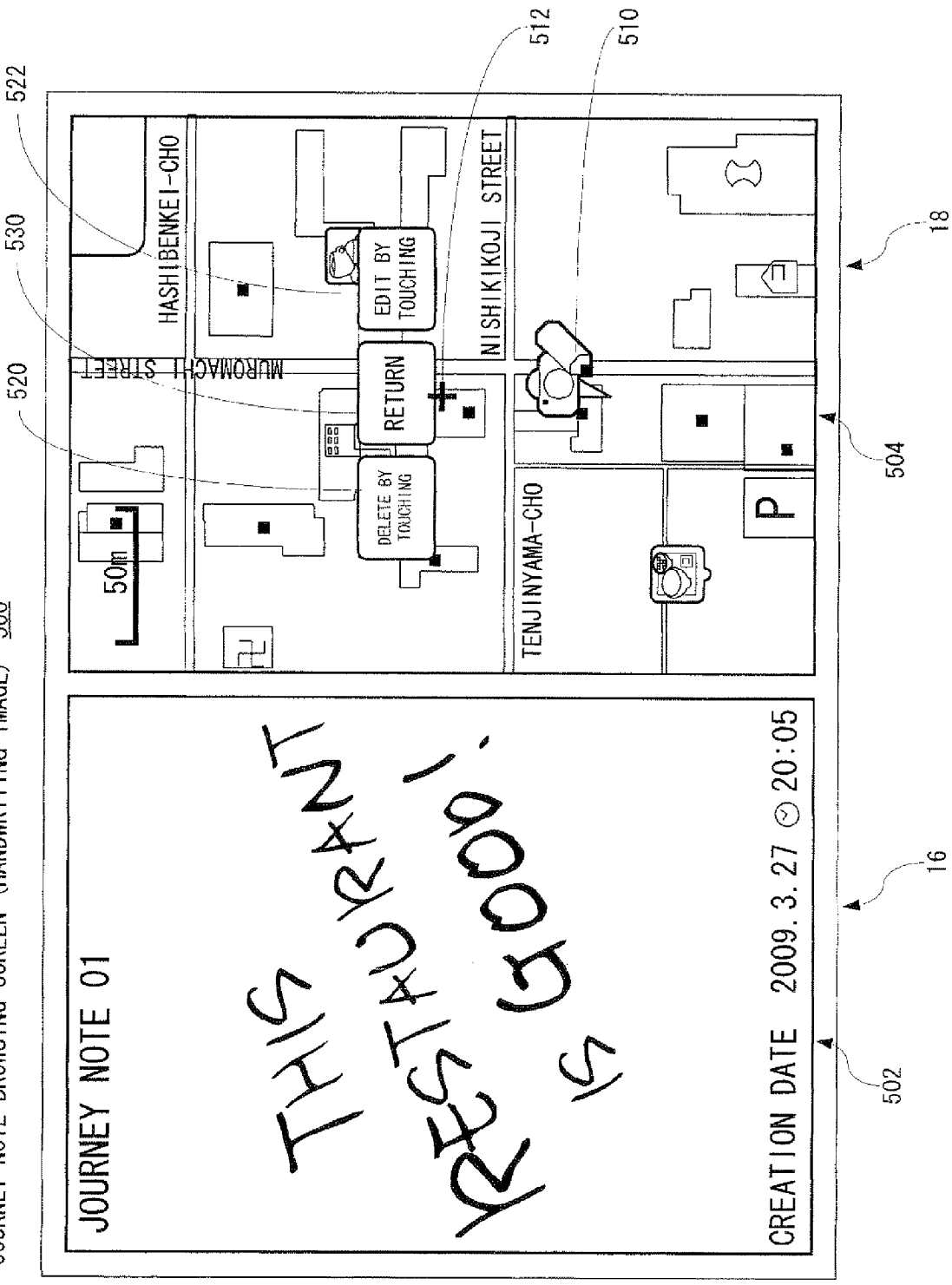
FIG. 13 is an illustrative view showing an example of a journey note browsing screen (handwriting) displayed on the first LCD and the second LCD shown in FIG. 4.

As shown in FIG. 13, in the journey note browsing screen 500, a left screen 502 is displayed on the first LCD 16, and a right screen 504 is displayed on the second LCD 18. On the left screen 502, the handwriting image stored corresponding to the touched icon of the journey note is displayed. Also, on the left screen 502, a creation time and date of the relevant handwriting image is displayed in a lower portion of the screen. On the right screen 504, an icon 510 is displayed, and an instruction image 512 is displayed. The icon 510 is provided to display the corresponding journey note (different from the journey note being currently displayed), and is displayed corresponding to the journey note attached to the map. The instruction image 512 is displayed in place of the touched icon of the journey note on the above-described detailed map screen 250 or in this journey note browsing screen 500. That is, the instruction image 512 indicates a position on the map where the journey note (in this case, handwritten note) being currently displayed on the left screen 502 is attached. Moreover, an icon 520 and an icon 522 are displayed above the instruction image 512, and a button image 530 is displayed therebetween.

The icon 520 is provided to delete the journey note. Specifically, when the icon 520 is touched, data relating to the journey note (in this case, image data of the handwriting image or the like) displayed on the left screen 502 is deleted from the internal memory or the external memory of the game apparatus 10. The icon 522 is provided to edit the journey note. Specifically, when the icon 522 is touched, an edition screen not shown is displayed, and on this edition screen, data of the position information and the region information relating to the journey note can be deleted to obtain a state where the journey note is not attached to the map, or the handwritten note can be rewritten, added or deleted.

Moreover, turning on the button image 530 allows the selection of the journey note displayed on the left screen 502 (the relevant journey note) to be cancelled, and the screen returns to the detailed map screen 250 shown in FIG. 8.

Figure 14:
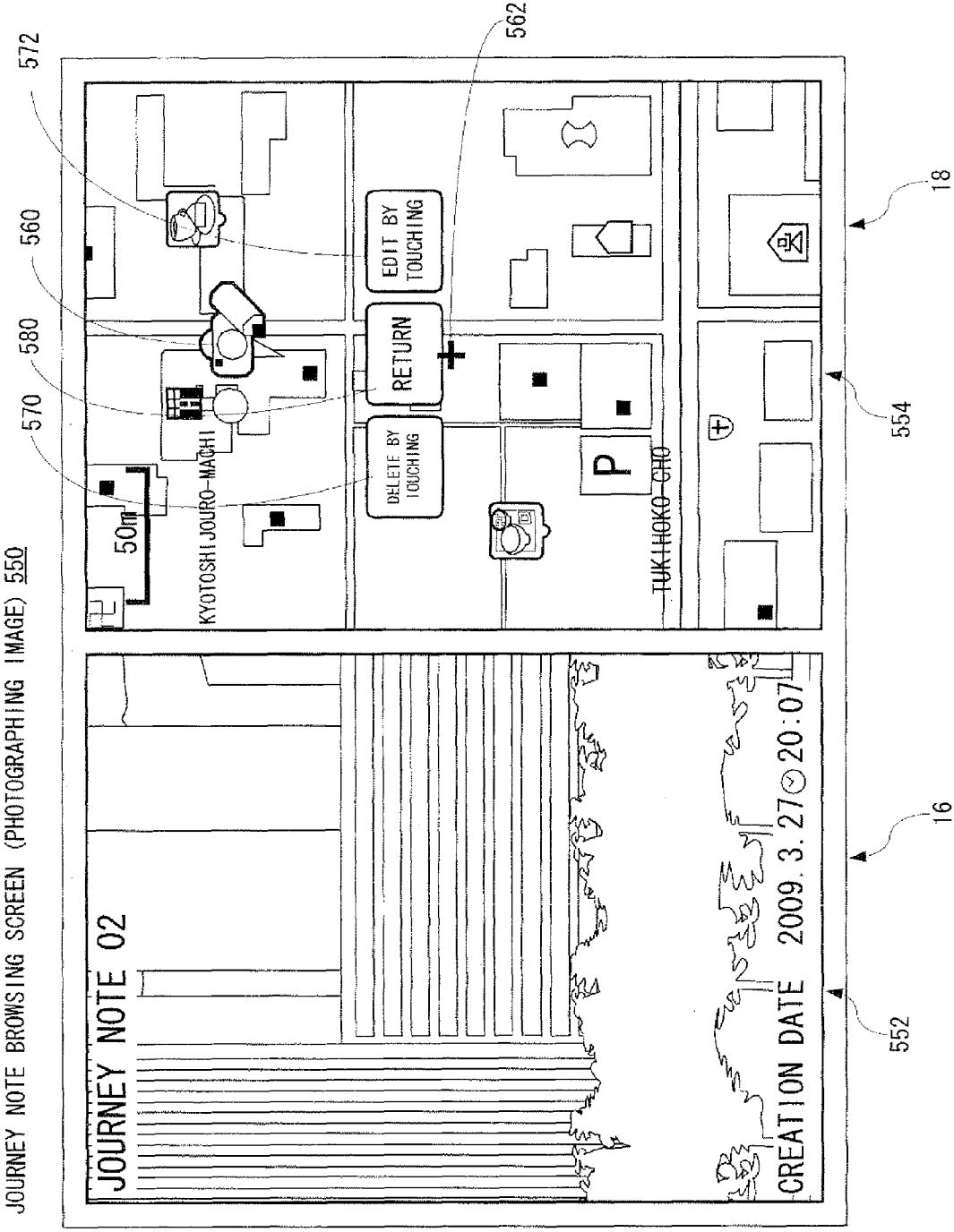
FIG. 14 is an illustrative view showing an example of a journey note browsing screen (photographing image) displayed on the first LCD and the second LCD shown in FIG. 4.

As shown in FIG. 14, in the journey note browsing screen 550 on which the photographing image is displayed, a left screen 552 is displayed on the first LCD 16, and a right screen 554 is displayed on the second LCD 18. On the left screen 552, an image (in this case, photographing image) of a journey note (in this case, a taken photograph) stored corresponding to a touched icon (560) is displayed. Moreover, on the left screen 552, a photographing time and date of the relevant photographing image is displayed in a lower portion thereof. On the right screen 554, the icon 560 and an instruction image 562 are displayed, and an icon 570 and an icon 572 are displayed above the instruction image 562. Further, a button image 580 is displayed between the icon 570 and the icon 572. Since the icon 560, the instruction image 562, the icon 570, and the button image 580 are the same as the corresponding ones in the above-described journey note browsing screen 500 of the handwritten note, duplicate descriptions are omitted. When the icon 572 is touched, an edition screen of the photographing image is displayed, whose illustration is omitted. In this edition screen, the photographing image can be retaken. Moreover, freehand scrawl to the photographing image is enabled.

Although a detailed description is omitted, in the journey note browsing screens (500, 550) shown in FIGS. 13 and 14, when the deletion or edition of the journey note is finished, or as described above, when the button images (530, 580) are turned on, when some position on the map other than the icons (510, 520, 522, 560, 570, 572) on the right screens (502, 554) is touched, the screen returns the detailed map screen 250 as shown in FIG. 8.

Figure 15:
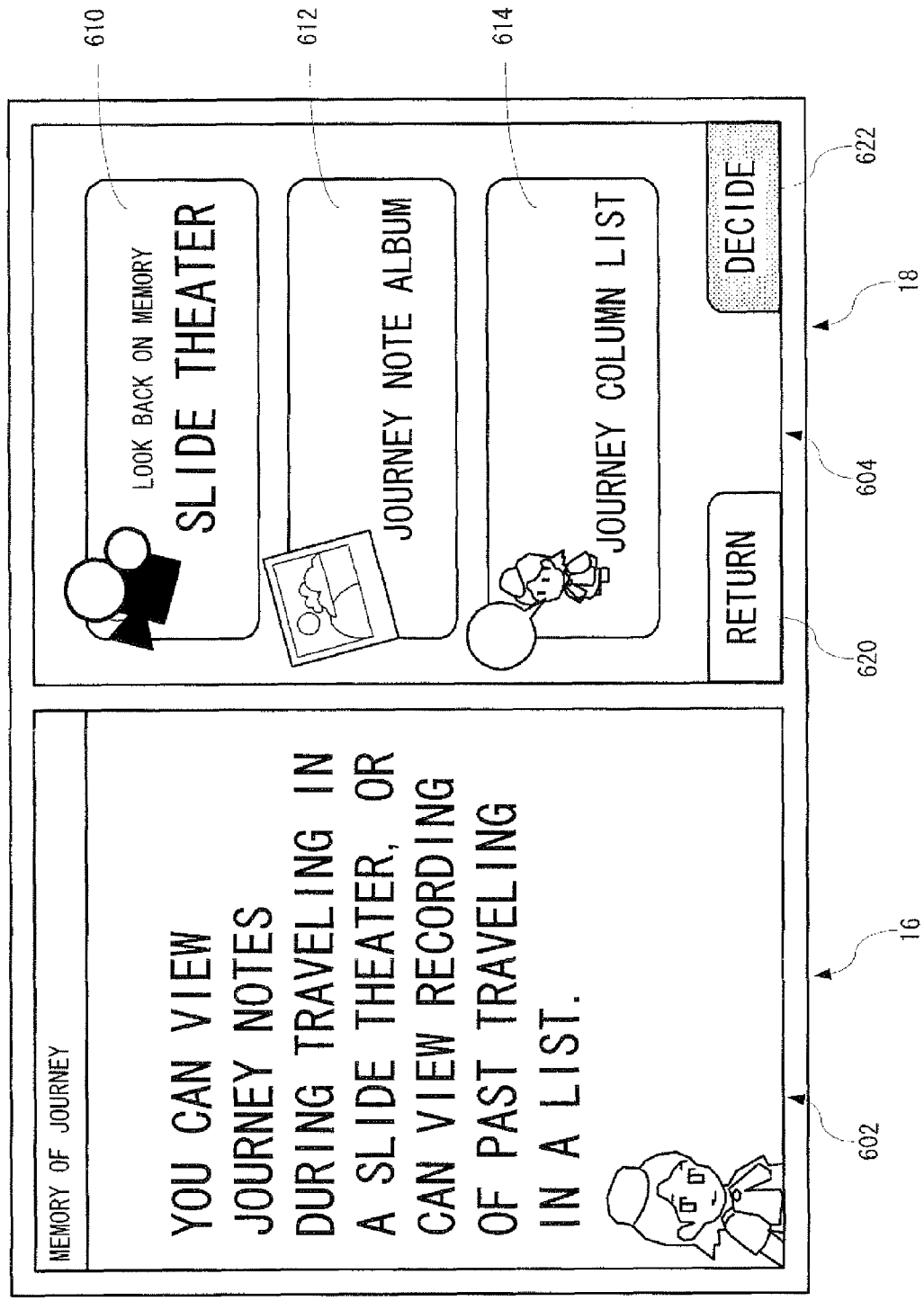
FIG. 15 is an illustrative view showing an example of a memory-of-journey screen displayed on the first LCD and the second LCD shown in FIG. 4.

Referring back to FIG. 5, on the top menu screen 100, when the button image 122 is turned on in a state where the button image 114 is turned on, a memory-of-journey screen 600 is displayed as shown in FIG. 15. As shown in FIG. 15, in the memory-of-journey screen 600, a left screen 602 is displayed on the first LCD 16, and a right screen 604 is displayed on the second LCD 18. On the left screen 602, the effect that the relevant screen is the memory-of-journey screen 600 and a brief description of the screen are displayed. On the right screen 604, a button image 610, a button image 612, and a button image 614 are provided in tandem in the center of the screen. Moreover, a button image 620 and a button image 622 are displayed below the button image 614.

This screen is the same as the top menu screen 100 shown in FIG. 5 in that a brief description of the touched icon (610, 612, 614) is displayed on the left screen 602.

The button image 610 is provided to select a function of "slide theater" as described later. Moreover, the button image 612 is provided to select a function of "journey note album". Although an illustration and a detailed description are omitted, executing the function of "journey note album" displays a list of all the journey notes. For example, reduced images (thumbnails) of all the journey notes are displayed in juxtaposition on the left screen 602 or/and the right screen 604. Moreover, although an illustration and a detailed description are omitted, for example, a desired journey note can be selected from the journey notes displayed in the list to be attached to the map. Furthermore, the button image 614 is provided to select a function of "journey column list". Although an illustration and a detailed description are omitted, executing the function of "journey column list" displays, on the left screen 602 (or on the right screen 604), a list of arbitrary characters that can be found on the map. These characters are set in advance on the map separately from the icons 270 of the landmarks by a developer or a programmer. That is, a game element of "finding the characters" is added.

Moreover, turning on the button image 620 returns the screen to the top menu screen 100 shown in FIG. 5. On the other hand, turning on the button image 622 executes the function assigned to the selected button image (610, 612, 614).

Figure 16:
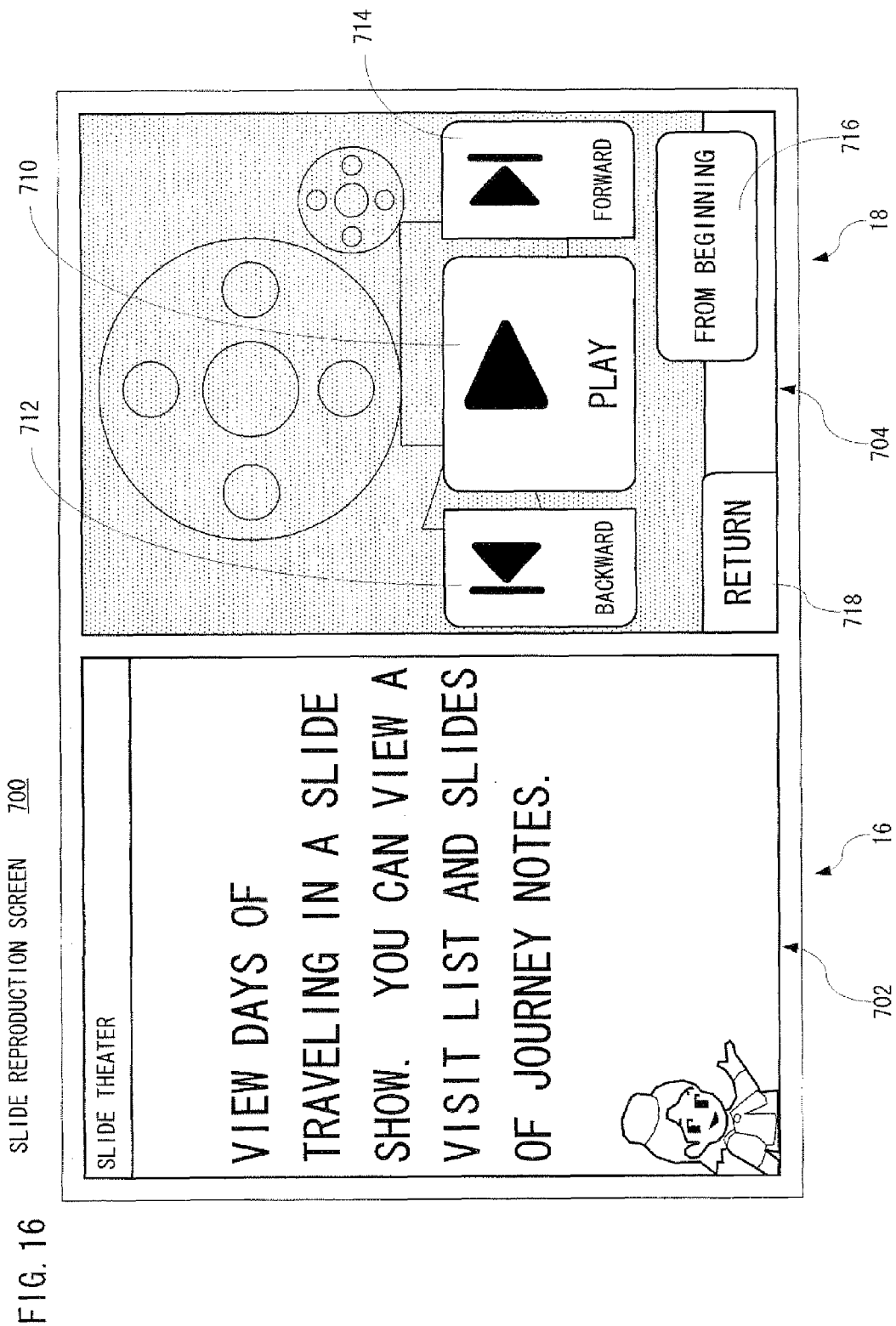
FIG. 16 is an illustrative view showing an example of a slide reproduction screen displayed on the first LCD and the second LCD shown in FIG. 4.

When the function of the above-described "slide theater" is executed, a slide reproduction screen 700 is displayed as shown in FIG. 16. As shown in FIG. 16, in the slide reproduction screen 700, a left screen 702 is displayed on the first LCD 16, and a right screen 704 is displayed on the second LCD 18. On the left screen 702, the effect that the relevant screen is the slide reproduction screen 700 and a brief description of the relevant screen are displayed. On the right screen 704, a button image 710, a button image 712, and a button image 714 are displayed side by side almost in the center of the screen, and a button image 716 and a button image 718 are displayed below them.

Turning on the button image 710 starts (restarts) or pauses the reproduction of slides. While in the slide reproduction screen 700 shown in FIG. 16, the button image 710 is displayed in a state where the reproduction can be started (restarted), during the reproduction of the slides, it is displayed in a state where the reproduction can be paused. Turning on the button image 712 displays a slide just before the slide being reproduced. On the other hand, turning on the button image 714 displays a next slide to the slide being reproduced. Moreover, turning on the button image 716 starts the reproduction from a leading slide. Furthermore, turning on the button image 718 returns the screen to the memory-of-journey screen 600 shown in FIG. 15.

In this embodiment, the slides (images of a title page, landmarks, journey notes) are reproduced in accordance with the following rules. This is intended to make photographing places and creation places of the journey notes easier to understand, and to look back on the journey notes (recording of the journey) in chronological order. (1) The journey notes are reproduced on a basis of region. (2) The journey notes are basically reproduced in order of an older (earlier) time and date. (3) The images of the landmarks that the user visited are reproduced. (4) Each of the journey notes is reproduced after the image of the landmark (image of a photograph, poster, illustration and the like) existing within a predetermined range (e.g., within a radius of 10 m in real space). (5) Each of the journey notes and the images of the landmarks is reproduced only once. (6) The journey note whose position (region) is not set is reproduced after the journey notes whose positions are set are reproduced.

As described later, an image of the title page (illustration) is an image of a photograph, poster, illustration or the like of the corresponding region, and has been created for each region in advance.

A reproduction list is created so as to satisfy all the rules as described above, and by executing reproduction processing in accordance with the created reproduction list, the slide show is executed.

FIG. 17 is an illustrative view showing one example of the reproduction list. While in FIG. 17, the title pages, the landmarks, and the journey notes are distinguished by giving parenthetic numbers to them, identification information of each of them (a title page ID, landmark ID, journey note ID) is actually described. Moreover, in FIG. 17, all the journey notes (n) are attached on the map, and as the parenthetic number is smaller, the time and date indicated by the time and date information is older (earlier). In FIG. 17, n is a positive integer. Moreover, in FIG. 17, in all of the landmarks (1), (2), (3), the effect that the user visited them is set (a visit flag described later is on).

As shown in FIG. 17, in the reproduction list, the identification information of the respective images of the title pages, the landmarks, and the journey notes is described corresponding to a number of an index indicting a reproduction order. Specifically, in an order from the index number 1, the title page (2), the landmark (2), the journey note (1), the journey note (3), the landmark (3), the journey note (2), the title page (1), the landmark (1), the journey note (4), the journey note (5), the title page (3) . . . , and the journey note (n) are described.

In the reproduction list, the index numbers 1 to 6 make up a group of slides of a certain region (group 1), the index numbers 7 to 10 make up a group of slides of another region (group 2). Moreover, in each of the groups, the title page ID of the image of the title page for indicating the pertinent region is described at the head. This is because the above-described rule (1) is followed. Moreover, in each of the groups, basically, the journey note (n) follows the image of the landmark, and is arranged in older order. This is because the rules (2) to (4) are followed. However, as shown in the group (1), the journey note (3) is arranged before the journey note (2). This is because the landmark (2) existing within the predetermined range of the journey note (3) also exists in the predetermined range of the journey note (1) and has already been registered in the reproduction list. That is, it is reproduced after the landmark (2), following the rule (5). Moreover, since the rule (2) is followed, the journey note (3) is arranged after the journey note (1).

Although not shown in FIG. 17, according to the above-described rule (6), the image of the landmark that does not exist within the predetermined range of any of the journey notes and that the user visited, and the image of the journey note whose position information is not set (not attached to the map) are also added to the reproduction list. With the image of the former landmark, when a group of a region where the relevant landmark exists is present in the reproduction list, the image of the landmark is added to the tail of the group, and on the other hand, when the group of the region where the relevant landmark exists is absent in the reproduction list, the landmark is added to the tail of the reproduction list. Moreover, the latter journey note is added to the tail of the reproduction list. In this embodiment, however, after the image of the landmark that does not exist in the predetermined range of any of the journey notes and that the user visited is added to the tail of the reproduction list, the image of the journey note whose position information is not set is added to the tail of the reproduction list. This is merely one example, and thus, after the image of the journey note whose position information is not set may be added to the tail of the reproduction list, the image of the landmark that does not exist in the predetermined range of any of the journey notes and that the user visited may be added to the tail of the reproduction list.

Figure 18:
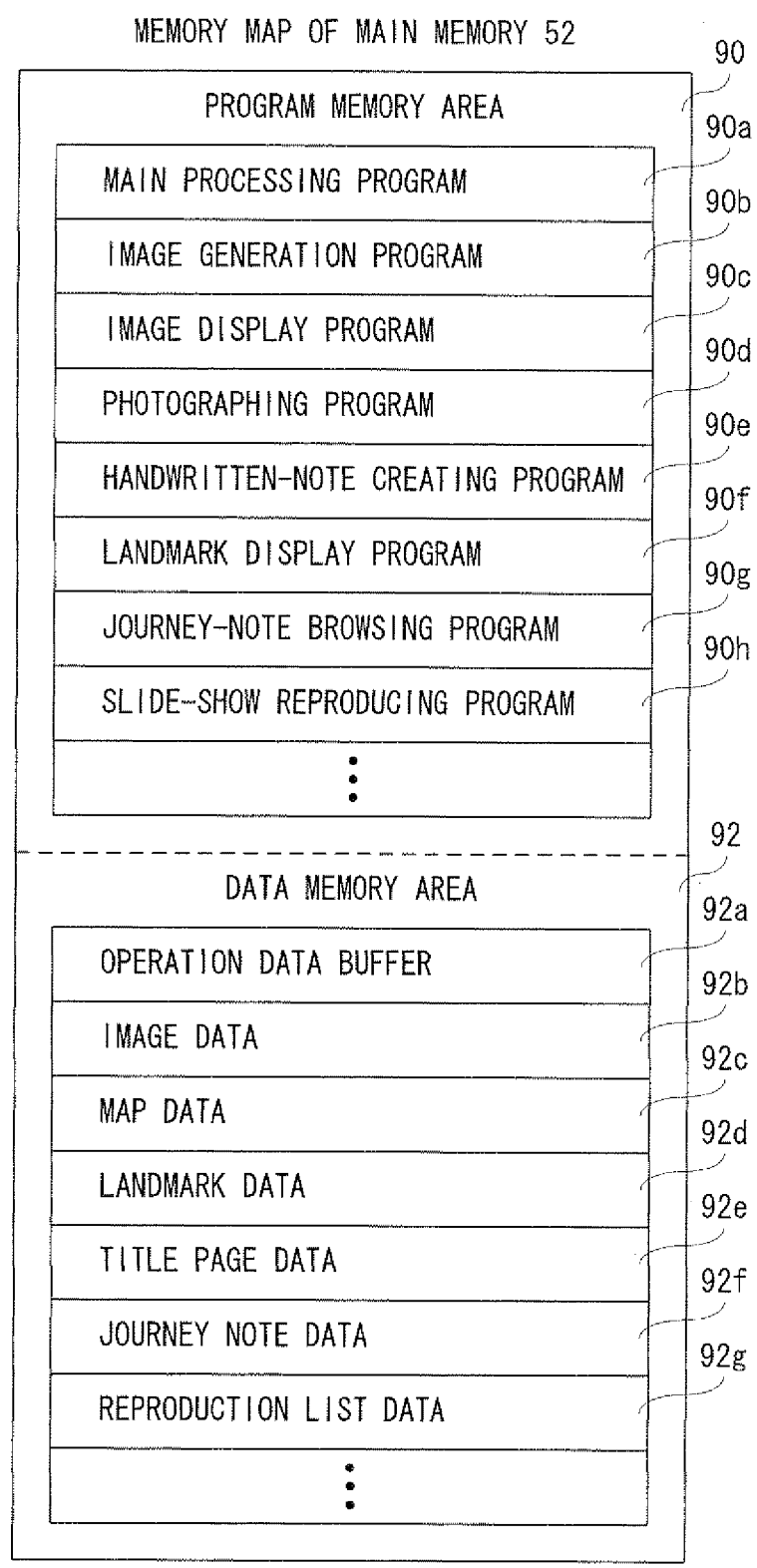
FIG. 18 is an illustrative view showing an example of a memory map of a main memory shown in FIG. 3.

FIG. 18 shows an example of a memory map of the main memory 52 shown in FIG. 2. As shown in FIG. 18, the main memory 52 includes a program memory area 90, and a data memory area 92. The program memory area 90 stores the information processing program, and this information processing program is constructed by a main processing program 90a, an image generation program 90b, an image display program 90c, a photographing program 90d, a handwritten-note creating program 90e, a landmark display program 90f, a journey-note browsing program 90g, a slide-show reproducing program 90h and the like.

The main processing program 90a is a program for processing a main routine of the information processing of this embodiment. The image generation program 90b is a program for generating screen data to display the screens (100, 150, 200, 250, 300, 350, 400, 450, 500, 550, 600, 700 and the like) on the first LCD 16 and the second LCD 18 using image data 92b described later. The image display program 90c is a program for displaying the screen data generated in accordance with the image generation program 90b on the first LCD 16 and the second LCD 18.

The photographing program 90d is a program for photographing a subject using the inward camera 32 or the outward camera 34 and acquiring a photographing image. Also, by an instruction of the user, the photographing program 90d stores the image data of the photographing image corresponding to the photographing image in the internal memory or the external memory, and at this time, associates the time and date information acquired from the RTC 68 with the image data of the photographing image to similarly store in the internal memory or the external memory. The handwritten-note creating program 90e is a program for causing the user to draw a handwritten note to acquire a handwriting image of the drawn handwritten note. Also, by an instruction of the user, the handwritten-note creating program 90e stores the handwriting image data corresponding to the image of the handwritten note in the internal memory or the external memory, and at this time, associates the time and date information from the RTC 68 with the handwriting image data to similarly store in the internal memory or external memory.

The landmark display program 90f is a program for displaying the landmark detail screen 300 of the landmark registered corresponding to the icon 270 as shown in FIG. 9, when any one of the icons 270 of the landmarks is touched in the detailed map screen 250 as shown in FIG. 8. The journey-note browsing program 90g is a program for displaying the journey note browsing screen 500, 550 shown in FIG. 13 or 14, when the icon of the journey note (510, 560) is touched in the detailed map screen 250 as shown in FIG. 8. However, when the icon of the journey note (510, 560) is touched in the journey note browsing screen 500, 550 shown in FIG. 13 or 14, the journey-note browsing screen 500, 550 of the touched icon of the journey note (510,560) is displayed.

The slide-show reproduction program 90h is a program for reproducing the images of the journey notes (photographing images, handwriting images) together with the title pages and the images of the landmarks, following the above-described rules (1) to (6). At this time, the reproduction list (reproduction list data 92g) as shown in FIG. 17 is generated.

Although an illustration is omitted, the information processing program also includes a sound output program, a backup program and the like. The sound output program generates data of sounds such as voices or imitation sounds of the characters, sound effects, and BGM to output the sounds from the speaker. The backup program is a program for storing the data generated in accordance with the execution of the information processing (in-process data and resultant data) in the memory card 26 or the memory for saving 56.

Moreover, in the data memory area 92, an operation data buffer 92a is provided, and the image data 92b, map data 92c, landmark data 92d, title page data 92e, journey note data 92f, reproduction list data 92g and the like are stored.

In the operation data buffer 92a, operation data from the respective operation buttons 20a to 20k and touch position data from the touch panel 22 are stored in chronological order. The operation data and the touch position data stored in the operation data buffer 92a are deleted after the execution of the information processing.

The image data 92b is data such as polygon data and texture data for generating the screen data of the screens (100 to 700 and the like) displayed on the first LCD 16 and the second LCD 18. Since the map data 92c, the title page data 92e, and image data 920d of the images of the landmarks are prepared in advance as described later, they are not generated using the image data 92b. Similarly, image data 930c included in the journey note data 92f described later, which is image data of the photographing images and the handwriting images, is not generated using the image data 92b.

The map data 92c is data of the maps (the map of the whole range, the whole map of each of the regions, the enlarged map of the whole range, the detailed map of each of the regions) as shown in the region selection screen 200 of FIG. 7 and the detailed map screen 250 of FIG. 8. The position on the map is managed in the position information (e.g., two-dimensional coordinate) decided based on the latitude and the longitude.

The landmark data 92d is data relating to the landmarks set in advance, and specific contents thereof are shown in FIG. 19(A). As shown in FIG. 19(A), the landmark data 92d is data of totally m landmarks, and includes landmark 1 data 920, landmark 2 data 922, ..., landmark m data 92m. The landmark 1 data 920 is made up of landmark ID data 920a, position information data 920b, region information data 920c, the image data 920d, information data 920e, a bookmark flag 920f and a visit flag 920g.

The landmark ID data 920a is data of identification information (landmark ID) such as a file name of the relevant landmark 1. The position information data 920b is data indicating the position on the map where the relevant landmark 1 exists, that is, the position information equivalent to the latitude and the longitude. The region information data 920c is data of a name or identification information (region ID) of the region on the map where the relevant landmark 1 exists. The image data 920d is data of an image of the relevant landmark 1 (image of a photograph, poster, illustration or the like). The information data 920e is text data of respective types of information of "description", "facility" and "traffic" of the relevant landmark 1.

The bookmark flag 920f is a flag for determining whether or not the relevant landmark 1 has been registered as a bookmark, and is configured by a register of one bit. When the bookmark flag 920f is turned on (established), a data value "1" is set in the register. On the other hand, when the bookmark flag 920f is turned off (unestablished), a data value "0" is set in the register. However, when the button image 322 is turned on on the landmark detail screen 300, the relevant landmark 1 is registered as a bookmark, and the bookmark flag 920f is turned on. Moreover, when the button image 322 is not turned on on the landmark detail screen 300 (including a case where it is turned on and then turned off), the relevant landmark 1 is not registered as a bookmark, or the registration as the bookmark is cancelled, so that the bookmark flag 920f is turned off.

The visit flag 920g is a flag for determining whether or not the relevant landmark 1 has been visited, and is configured by a register of one bit. When the visit flag 920g is turned on, a data value "1" is set in the register. When the visit flag 920g is turned off, a data value "0" is set in the register. When the button image 324 is turned on on the landmark detail screen 300, the visit to the relevant landmark 1 is registered and the visit flag 920g is turned on. Moreover, when the button image 324 is not turned on (including a case where it is turned on and then turned off) on the landmark detail screen 300, the visit flag 920g is turned off.

Since the landmark 2 data 922, ..., the landmark m data 92m are similar to the landmark 1 data 920, duplicate descriptions are omitted.

Referring back to FIG. 18, the title page data 92e is image data of images of the respective regions (photographs, posters, illustrations or the like). Although an illustration is omitted, the image data of the images of the respective title pages is stored corresponding to the regions or the identification information (title page IDs) for identifying the title pages. Moreover, the journey note data 92f is data relating to the above-described images of the journey notes, that is, the photographing images and the handwriting images, and specifically, is shown in FIG. 19(B). As shown in FIG. 19(B), the journey note data 92f is data of totally n journey notes, and includes journey note 1 data 930, journey note 2 data 932, ..., journey note n data 93n.

The journey note 1 data 930 is made up of journey note ID data 930a, time and date information data 930b, the image data 930c, position information data 930d and region information data 930e. The journey note ID data 930a is data of identification information (a journey note ID) such as a file name of the relevant journey note 1. The time and date information data 930b is data of a time and date (photographing time and date, creation time and date) when the relevant journey note 1 was created (recorded). The image data 930c is image data of the photographing image or handwriting image of the relevant journey note 1. The position information data 930d is data of the position information on the map to which the relevant journey note 1 is attached. The region information data 930e is data of the name or the identification information (region ID) of the region on the map to which the relevant journey note 1 is attached. When no journey note is attached to the map, NULL data is stored as the position information data 930d and the region information data 930e.

Since the journey note 2 data 932, ..., the journey note n data 93n are similar to the journey note 1 data 930, duplicate descriptions are omitted.

Referring again to FIG. 18, the reproduction list data 92g is data of the reproduction list as shown in FIG. 17, and is generated every time the slide show reproduction function is executed.

Although an illustration is omitted, in the data memory area 92, another data is also stored, and a flag, a counter (timer) and the like necessary for executing the information processing program of this embodiment are provided.

Figure 20:
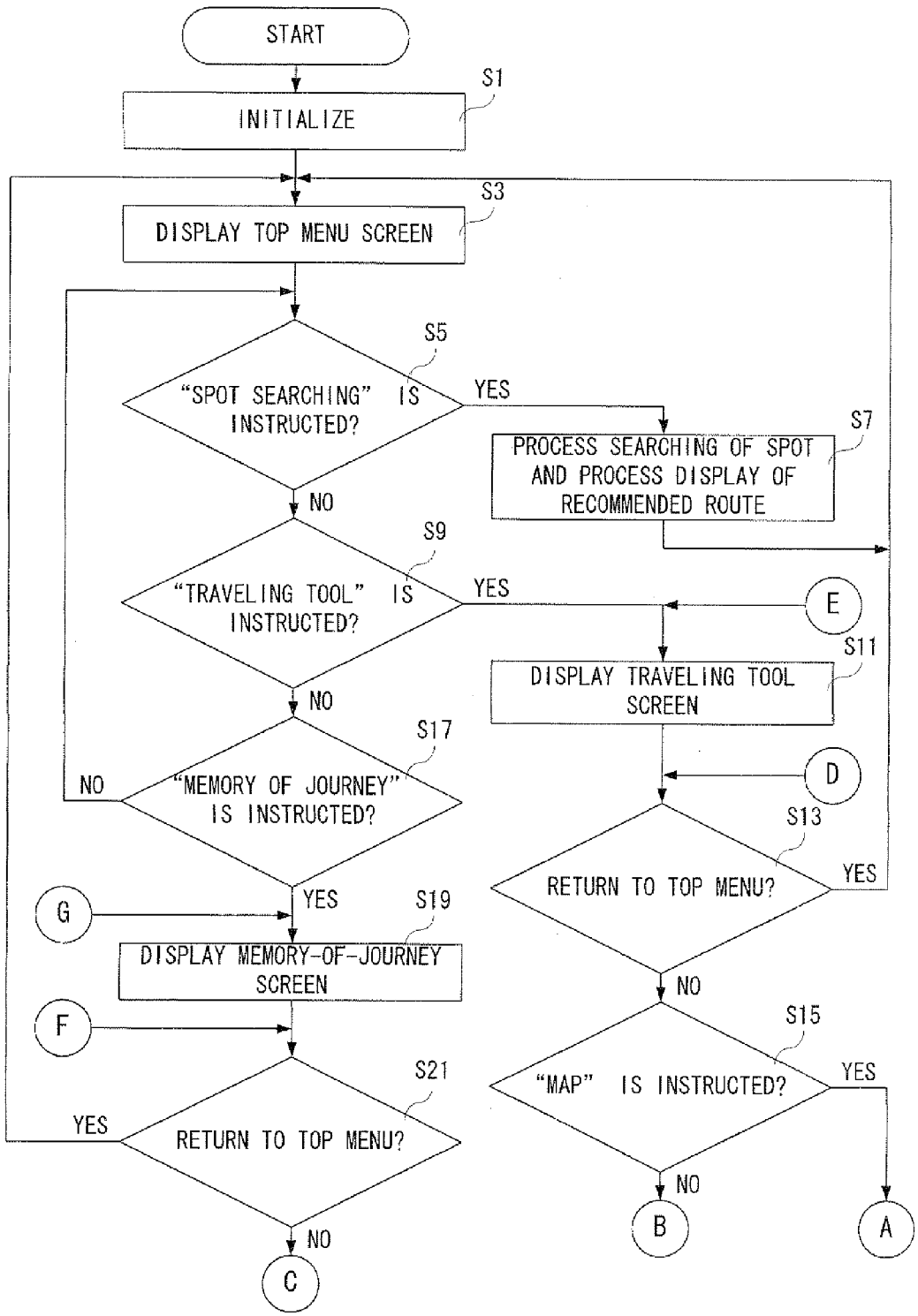
FIG. 20 is a flowchart showing a part of overall processing of a CPU shown in FIG. 3.

FIGS. 20 to 25 are flowcharts showing overall processing of a CPU 50 shown in FIG. 3. As shown in FIG. 20, the CPU 50 executes initialization processing in a step S1 when the overall processing starts. Here, the CPU 50 clears the operation data buffer 92a, loads the image data 92b, the map data 92c, the landmark data 92d, the title page data 92e and the journey note data 92f, erases the reproduction list data 92g, and so on.

In a next S3, the top menu screen 100 as shown in FIG. 5 is displayed on the first LCD 16 and the second LCD 18. Subsequently, in a step S5, whether or not the execution of "spot searching" has been instructed is determined. That is, it is determined whether or not the button image 122 is turned on in the state where the button image 110 is turned on on the top menu screen 100. If YES in the step S5, that is, if the execution of "spot searching" is instructed, then in a step S7, the searching processing of the spot is executed, and the display processing of the recommended route is executed and so on, whose detailed description is omitted, and the processing returns to the step S3.

On the other hand, if "NO" in the step S5, that is, if the execution of "spot searching" is not instructed, then in a step S9, whether or not the execution of "traveling tool" is instructed is determined. That is, it is determined whether or not the button image 122 is turned on in the state where the button image 112 is turned on on the top menu screen 100. If "YES" in the step S9, that is, if the execution of "traveling tool" is instructed, then in a step S11, the traveling tool screen 150 as shown in FIG. 6 is displayed on the first LCD 16 and the second LCD 18, and in a step S13, whether or not the processing returns to the top menu is determined. That is, in the step S13, it is determined whether or not the button image 170 is turned on on the traveling tool screen 150.

If "YES" in the step S13, that is, if the processing returns to the top menu, the processing returns to the step S3 as it is. Accordingly, as described above, the top menu screen 100 is displayed on the first LCD 16 and the second LCD 18. On the other hand, if "NO" in the step S13, that is, if the processing does not return to the top menu, then in a step S15, whether or not the execution of "map" is instructed is determined. That is, it is determined whether or not the button image 172 is turned on in the state where the button image 160 is turned on on the traveling tool screen 150. If "YES" in the step S15, that is, if the execution of "map" is instructed, then in a step S23 shown in FIG. 21, the region selection screen 200 as shown in FIG. 7 is displayed on the first LCD 16 and the second LCD 18.

In a next step S25, whether or not a region is selected is determined. That is, it is determined whether or not any one of the button images 220 is turned on to select a region. If "NO" in the step S25, that is, if no region is selected, then in a step S27, whether or not the processing returns to the traveling tool is determined. That is, the CPU 50 determines whether or not the button image 230 is turned on on the region selection screen 200.

If "YES in the step S27, that is, if the processing returns to the traveling tool, the processing returns to the step S11 shown in FIG. 20. Accordingly, as described above, the traveling toll screen 150 is displayed on the first LCD 16 and the second LCD 18. On the other hand, if "NO in the step S27, that is, if the processing does not return to the traveling tool, the processing returns to the step S25 as it is. While in FIG. 21, if none of the button images 220 and the button image 230 is turned on on the region selection screen 200, the processing returns to the step S25, actually, the processing of scrolling the map of the right screen 204, and with this, moving the frame 210 of the left screen 202 is executed by an touch (drag) operation of the user.

Moreover, if "YES" in the step S25, that is, if a region is selected, then in a step S29, the map of the selected region is read. That is, the CPU 50 reads the data of the whole map and the detailed map of the selected region from the map data 92c. Next, in a step S31, the position information of the journey notes of the selected region is read. Here, the CPU 50, referring to the journey note data 92f, reads the position information data (930d and the like) of the journey notes in which the region indicated by the region information data (930e and the like) thereof coincides with the selected region. In a step S33, the icons of the journey notes are arranged on the maps in accordance with the position information. Here, the CPU 50 arranges the icons (510, 560) of the journey notes on both the whole map and the detailed map of the selected region.

Subsequently, in a step S35, the position information of the landmarks of the selected region is read. Here, the CPU 50, referring to the landmark data 92d, reads the position information data (920b and the like) of the landmarks in which the region indicated by the region information data (920c and the like) thereof coincides with the selected region. Next, in a step S37, the icons of the landmarks are arranged on the maps in accordance with the position information. Here, the CPU 50 arranges the icons (270) of the landmarks on both the whole map and the detailed map of the selected region. In a step S39, the maps and the icons are displayed. The detailed region screen 250 as shown in FIG. 8 is displayed on the first LCD 16 and the second LCD 18.

Figure 21:
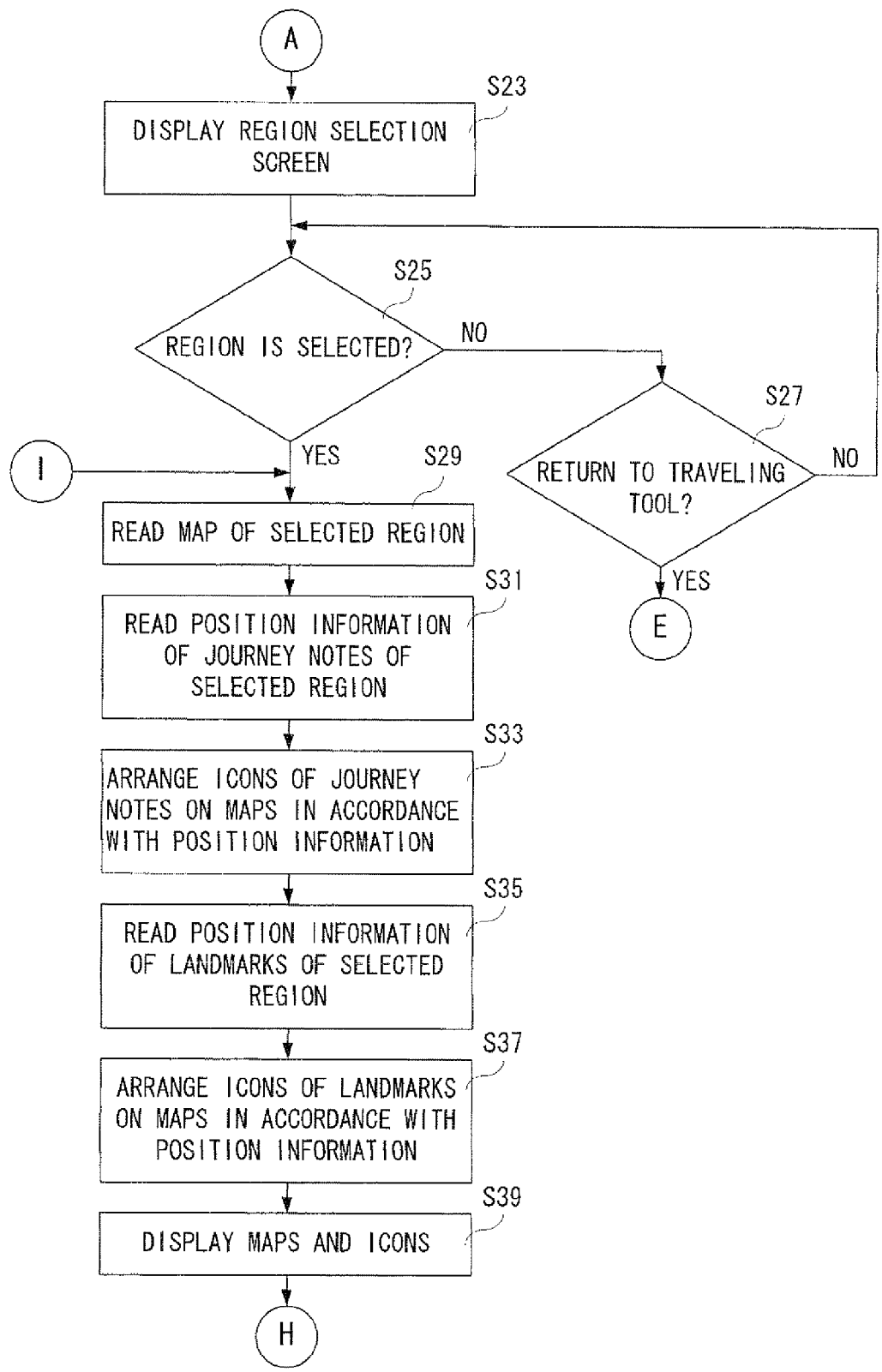
FIG. 21 is a flowchart of a second part of the overall processing of the CPU shown in FIG. 3, following FIG. 20.
Figure 22:
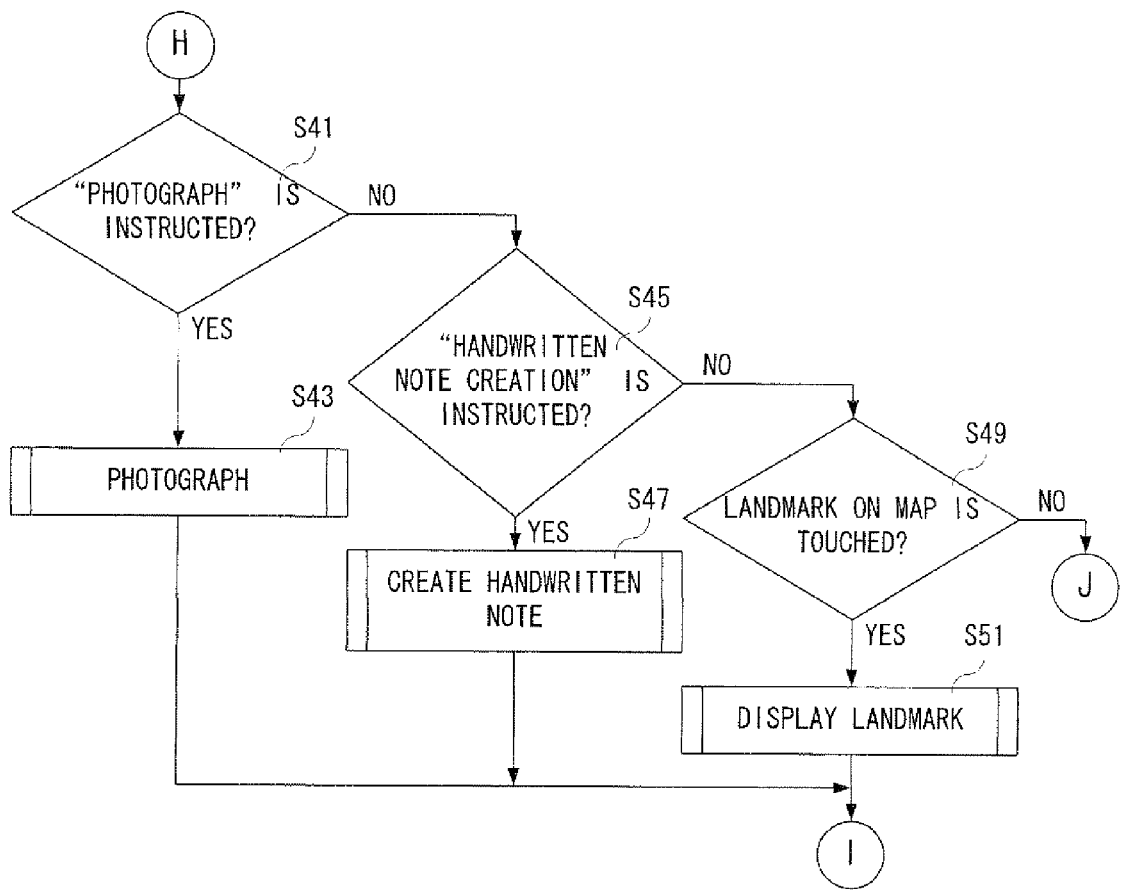
FIG. 22 is a flowchart of a third part of the overall processing of the CPU shown in FIG. 3, following FIG. 21.

As shown in FIG. 22, in a next step S41, whether or not there is an instruction of the execution of "photographing" is determined. That is, the CPU 50 determines whether or not the icon 274 is clicked on on the detailed map screen 250. If "YES" in the step S41, that is, if there is an instruction of the execution of "photographing", then in a step S43, photographing processing described later (see FIGS. 26 and 27) is executed, and the processing returns to the step S29 shown in FIG. 21. On the other hand, if "NO" in the step S41, that is, if there is no instruction of the execution of "photographing", then in a step S45, whether or not there is an instruction of the execution of "handwritten note creation" is determined. That is, the CPU 50 determines whether or not the icon 272 is clicked on on the detailed map screen 250.

If "YES" in the step S45, that is, if there is an instruction of the execution of "handwritten note creation", then in a step S47, handwritten-note creating processing described later (see FIGS. 28 and 29) is executed, and the processing returns to the step S29. On the other hand, if "NO" in the step S45, that is, if there is no instruction of the execution of "handwritten note creation", then in a step S49, whether or not any one of the icons (270) of the landmarks on the map is touched is determined.

If "YES" in the step S49, that is, if any one of the icons (270) of the landmarks is touched, then in a step S51, landmark display processing described later (see FIG. 30) is executed, and the processing returns to the step S29. In the step S51, the landmark display processing of the landmark corresponding to the touched icon (270) is executed. On the other hand, if "NO" in the step S49, that is, if none of the icons (270) of the landmarks on the map is touched, then in a step S53 shown in FIG. 23, whether or not any one of the icons (510, 560) of the journey notes on the map is touched is determined.

If "YES" in the step S53, that is, if any of the icons (510, 560) of the journey notes on the map is touched, then in a step S55, the journey note is displayed, and the processing returns to the step S29 shown in FIG. 21. That is, in the step S55, the CPU 50 displays the image (photographing image or handwriting image) of the journey note corresponding to the icon (510, 560) of the touched journey note on the first LCD 16, that is, on the left screen 252 of the detailed map screen 250. That is, the journey note browsing screen 500, 550 shown in FIG. 13 or 14 is displayed on the first LCD 16 and the second LCD 18. On the other hand, if "NO" in the step S53, that is, if none of the icons (510, 560) of the journey notes on the map is touched, then in a step S57, whether or not there is a reproduction instruction of the slide show is determined. That is, the CPU 50 determines whether or not the select button 20h is turned on.

If "YES" in the step S57, that is, if there is a reproduction instruction of the slide show, then in a step S59, reproduction processing of the slide show described later (see FIGS. 31 to 35) is executed, and the processing returns to the step S29. On the other hand, if "NO" in the step S57, that is, if there is no reproduction instruction of the slide show, then in a step S61, whether or not the processing returns to the region selection is determined. That is, the CPU 50 determines whether or not the button image 290 is turned on.

If "NO" in the step S61, that is, if the processing does not return to the region selection, it returns to the step S41 shown in FIG. 22 as it is. On the other hand, if "YES" in the step S61, that is, if the processing returns to the region selection, it returns to the step S23 as it is.

Although an illustration and a detailed description are omitted, since the detailed map screen 250 is also provided with the button 276 and the button 278, whether or not these buttons 276, 278 are turned on is determined, and if the buttons 276, 278 are turned on, the corresponding processing (display/undisplay of the icons of the landmarks, list display of the spots (landmarks)) is executed as described above.

Figure 24:
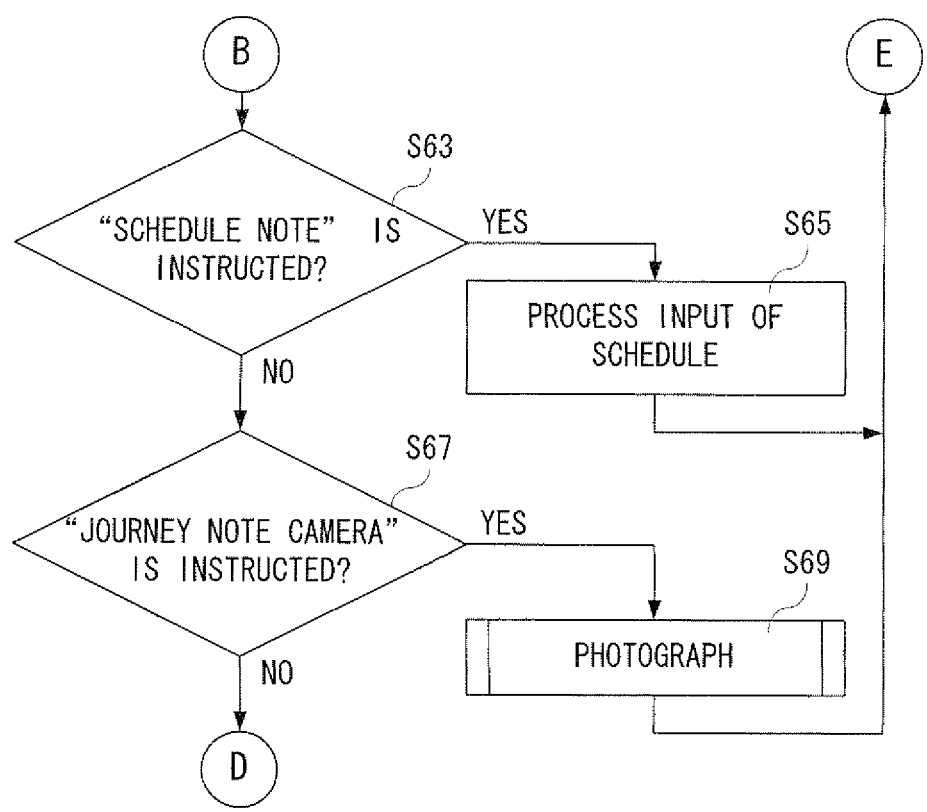
FIG. 24 is a flowchart of a fifth part of the overall processing of the CPU shown in FIG. 3, following FIG. 20.

Referring back to FIG. 20, if "NO" in the step S15, that is, if there is no instruction of the execution of "map", then in a step S63 shown in FIG. 24, whether or not there is an instruction of the execution of "schedule note" is determined. That is, it is determined whether or not the button image 172 is turned on in the state where the button image 162 is turned on on the traveling tool screen 150. If "YES" in the step S63, that is, if there is an instruction of the execution of the "schedule note", then in a step S65, input processing of the schedule is executed, whose detailed description is omitted, and the processing returns to the step S11 shown in FIG. 20. On the other hand, if "NO" in the step S63, that is, if there is no instruction of the execution of "schedule note", then in a step S67, whether or not there is an instruction of the execution of "journey note camera" is determined. That is, the CPU 50 determines whether or not the button image 172 is turned on in the state where the button image 164 of the traveling tool screen 150 is turned on.

If "YES" in the step S67, that is, if there is an instruction of the execution of "journey note camera", then in a step S69, the photographing processing described later is executed, and the processing returns to the step S11. On the other hand, if "NO" in the step S67, that is, if there is no instruction of the execution of "journey note camera", the processing returns to the step S13 shown in FIG. 20.

Referring back to FIG. 20, if "NO" in the step S9, that is, if there is no instruction of the execution of "traveling tool", then in a step S17, whether or not there is an instruction of the execution of "memory of journey" is determined. That is, the CPU 50 determines whether or not the button image 122 is turned on in the state where the button image 114 is turned on on the top menu screen 100. If "NO" in the step S17, that is, if there is no instruction of the execution of "memory of journey", the processing returns to the step S5 as it is.

Although an illustration and a detailed description are omitted, if the button 120 is turned on on the top menu screen 100, the screen returns to the menu screen of the game apparatus 10 itself as described above.

On the other hand, if "YES" in the step S17, that is, if there is an instruction of the execution of "memory of journey", then in a step S19, the memory-of-journey screen 600 as shown in FIG. 15 is displayed on the first LCD 16 and the second LCD 18.

In a next step S21, whether or not the processing returns to the top menu is determined. That is, the CPU 50 determines whether or not the button image 620 is turned on on the memory-of-journey screen 600. If "YES" in the step S21, that is, if the processing returns to the top menu, it returns to the step S3 as it is. On the other hand, if "NO" in the step S21, that is, if the processing does not return to the top menu, then in a step S71 shown in FIG. 25, whether or not the execution of "slide theater" is instructed is determined. That is, the CPU 50 determines whether or not the button image 622 is turned on in the state where the button image 610 is turned on on the memory-of-journey screen 600.

If "YES" in the step S71, that is, if there is an instruction of the execution of "slide theater", then in a step S73, the reproduction processing of the slide show described later is executed, and the processing returns to the step S19 shown in FIG. 20. On the other hand, if "NO" in the step S71, that is, if there is no instruction of the execution of "slide theater", then in a step S75, whether or not the execution of "journey column list" is instructed is determined. That is, the CPU 50 determines whether or not the button image 622 is turned on in the state where the button image 614 is turned on on the memory-of-journey screen 600.

If "YES" in the step S75, that is, if there is an instruction of the execution of "journey column list", then in a step S77, list display processing of the characters is executed, whose detailed description is omitted, and the processing returns to the step S19. On the other hand, if "NO" in the step S75, that is, if there is no instruction of the execution of "journey column list", then in a step S79, whether or not there is an instruction of the execution of "journey note album" is determined. That is, the CPU 50 determines whether or not the button image 622 is turned on in the state where the button image 612 is turned on on the memory-of-journey screen 600.

If "YES" in the step S79, that is, if there is an instruction of the execution of "journey note album", then in a step S81, list display processing of the journey notes is executed, whose detailed description is omitted, and the processing returns to the step S19. On the other hand, if "NO" in the step S79, that is, if there is no instruction of the execution of "journey note album", the processing returns to the step S21 shown in FIG. 20.

Figure 26:
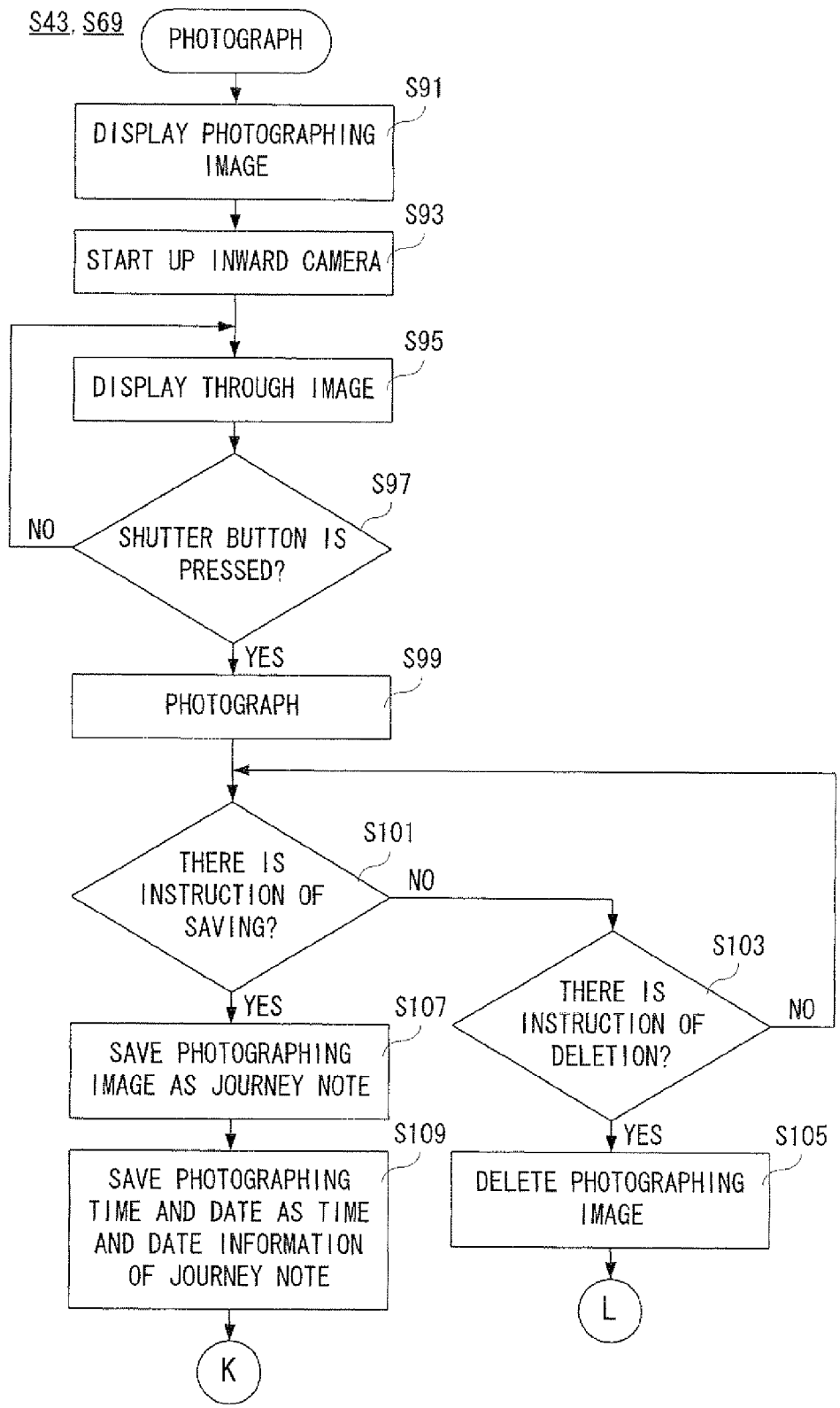
FIG. 26 is a flowchart showing a part of photographing processing of the CPU shown in FIG. 3.
Figure 27:
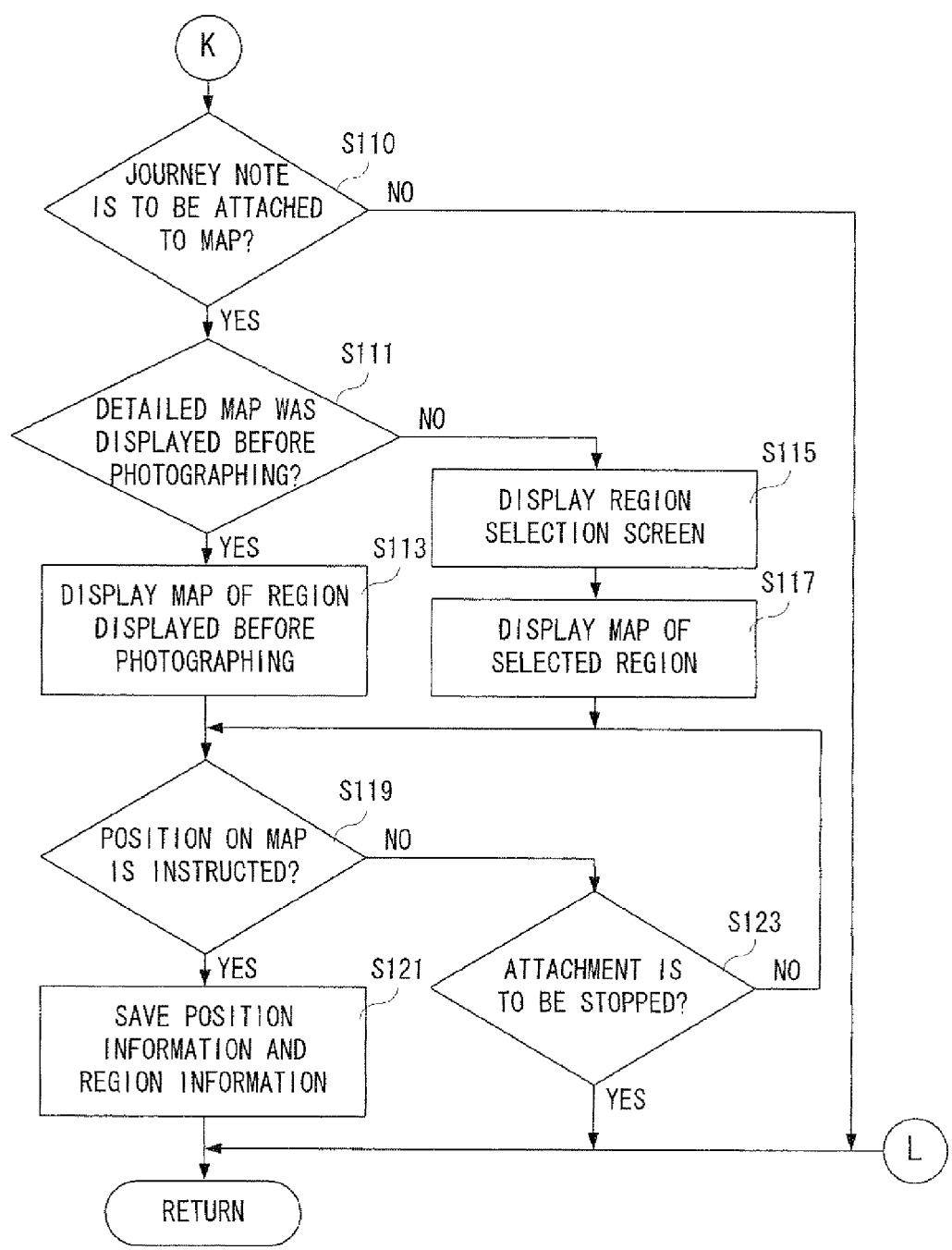
FIG. 27 is a flowchart showing another part of the photographing processing of the CPU shown in FIG. 3, following FIG. 26.

FIGS. 26 and 27 are flowcharts of the photographing processing shown in the step S43 of FIG. 22 and the step S69 of FIG. 24. As shown in FIG. 26, when the photographing processing starts, the CPU 50 displays the photographing screen 400 as shown in FIG. 11 on the first LCD 16 and the second LCD 18 in a step S91. In a next step S93, the incorporated camera (32, 34) is started up. Although a detailed description is omitted, in this embodiment, the inward camera 32 or the outward camera 34 selected by the user is started up as described above. The inward camera 32 or the outward camera 34 is switched by turning on the button image 422 or the button image 424 on the photographing screen 400.

Subsequently, in a step S95, a through image is displayed on the first LCD 16 (left screen 402). In a next step S 97, whether or not the shutter button is pressed is determined. That is, the CPU 50 determines whether or not the button image 420 is turned on on the photographing screen 400, or whether or not the L button 20i or the R button 20j is pressed.

If "NO" in the step S97, that is, if the shutter button is not pressed, the processing returns to the step S95 as it is. On the other hand, if "YES" in the step S97, that is, if the shutter button is pressed, then in a step S99, the photographing processing is executed, and in a step S101, whether or not there is an instruction of saving is determined. Although a detailed description is omitted, after the photographing, a selection screen as to whether or not the photographing image is to be saved is displayed, and on this selection screen, the instruction of whether or not to save the photographing image is inputted.

If "NO" in the step S101, that is, if there is no instruction of saving, then in a step S103, whether or not there is an instruction of deletion, that is, an instruction not to save is determined. If "NO" in the step S103, that is, there is no instruction of deletion, the processing returns to the step S101. On the other hand, if "YES" in the step S101, that is, if there is an instruction of deletion, then in a step S105, the image data of the photographing image is deleted, and as shown in FIG. 27, the processing returns to the overall processing.

On the other hand, if "YES" in the step S101, that is, if there is an instruction of saving, then in a step S107, the photographing image is saved as a journey note. That is, the journey note n data 93n including the image data of the photographing image is stored in the data memory area 92. Next, in a step S109, a photographing time and date is saved as the time and date information of the journey note. Although an illustration and the like are omitted, the CPU 50 acquires, from the RTC 68, the time and date information (photographing time and date) when the shutter button was pressed to add the corresponding time and date information to the before-described journey note n data 93n.

Subsequently, as shown in FIG. 27, in a step S110, whether or not the journey note is to be attached to the map is determined. If "NO" in the step S110, that is, if there is an instruction not to attach the journey note to the map, the processing returns to the overall processing as it is. On the other hand, if "YES" in the step S110, that is, if there is an instruction to attach the journey note to the map, then in a step S111, whether or not the detailed map was displayed before the photographing is determined. That is, it is determined whether or not in the traveling tool, "map" was executed and in this processing, the photographing processing was performed.

If "YES" in the step S111, that is, if the detailed map was displayed before the photographing, then in a step S113, the journey note attaching screen 450 on which the map of the region displayed before the photographing, that is, the relevant map is displayed is displayed on the first LCD 16 and the second LCD 18, and the processing goes to a step S119. On the other hand, if "NO" in the step S111, that is, if the detailed map was not displayed before the photographing, then in a step S115, the region selection screen 200 is displayed on the first LCD 16 and the second LCD 18, and in a step S117, the journey note attaching screen 450 on which the map of the region selected on the relevant region selection screen 200, that is, the relevant map is displayed is displayed on the first LCD 16 and the second LCD 18, and the processing goes to the step S119. That is, when "journey note camera" is executed in the traveling tool, the region to which the photographing image is to be attached is selected.

In the step S119, whether or not the position on the map is instructed is determined. That is, the CPU 50 determines whether or not on the journey note attachment screen 450, the instruction image 460 is aligned with a predetermined position by scrolling the map displayed on the second LCD 18 and so on, and then the button image 470 is turned on.

If "YES" in the step S119, that is, if the position on the map is instructed, then in a step S121, the position information and the region information are saved, and the processing returns to the overall process. That is, in the step S121, the CPU 50 adds the position information data of the position on the map instructed by the user and the region information data of the region corresponding to the relevant map to the before-described journey note n data 93n.

On the other hand, if "NO" in the step S119, that is, if the position on the map is not instructed, then in a step 123, whether or not to stop the attachment is determined. That is, the CPU 50 determines whether or not the button image 472 is turned on on the journey note attaching screen 450. If "NO" in the step S123, that is, if the attachment is not stopped, the processing returns to the step S119. In this case, for simplicity, the processing returns to the step S119 as it is, and in this processing, the map is scrolled in accordance with an instruction of the user. On the other hand, if "YES" in the step S123, that is, if the attachment is to be stopped, the processing returns to the overall processing as it is. Although a detailed description is omitted, if it is determined that the attachment is to be stopped in the step S123, NULL data is stored as the position information data and the region information data of the before-described journey note n data 93n.

Figure 28:
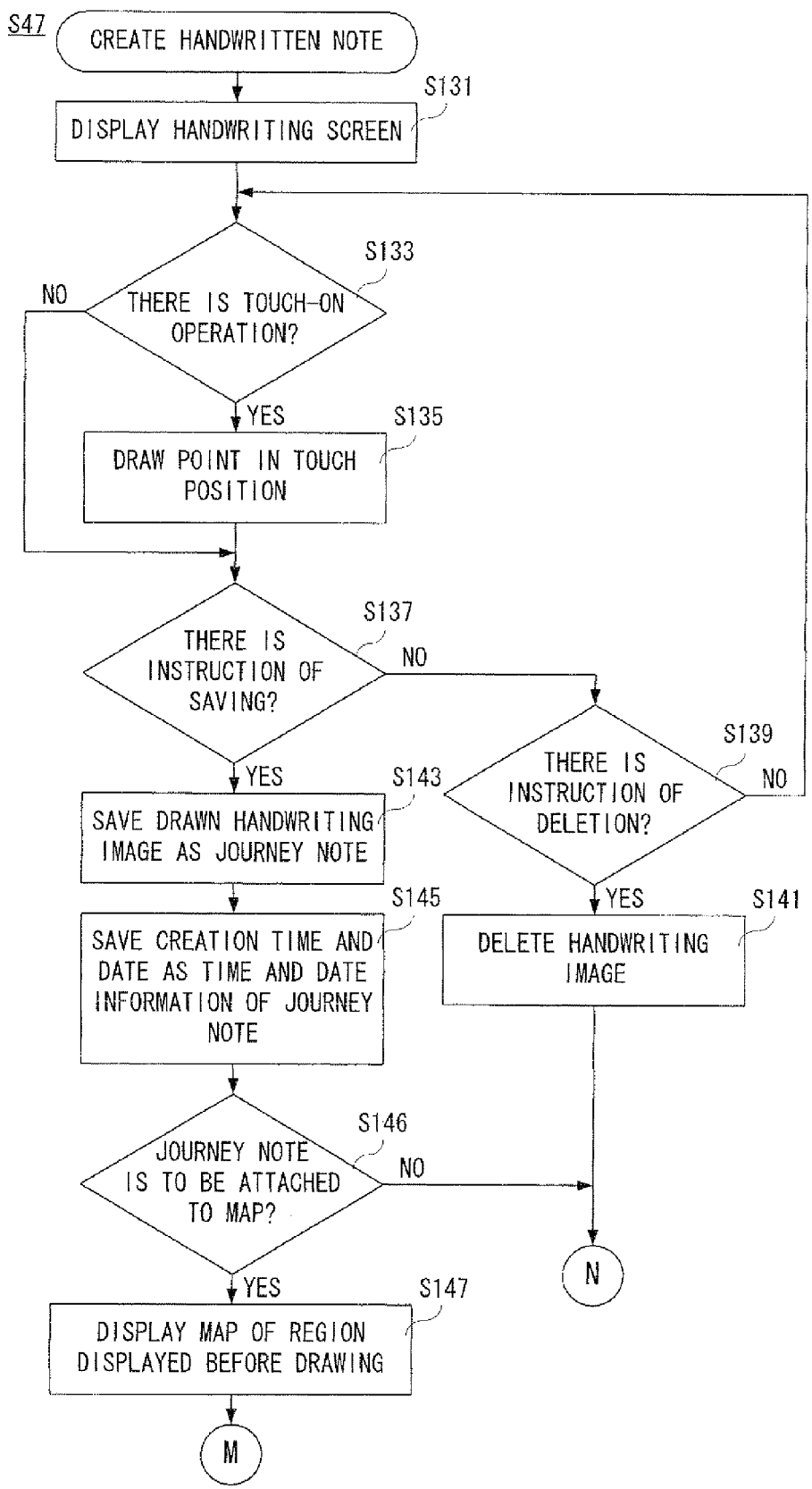
FIG. 28 is a flowchart showing a part of handwritten-note creating processing of the CPU shown in FIG. 3.
Figure 29:
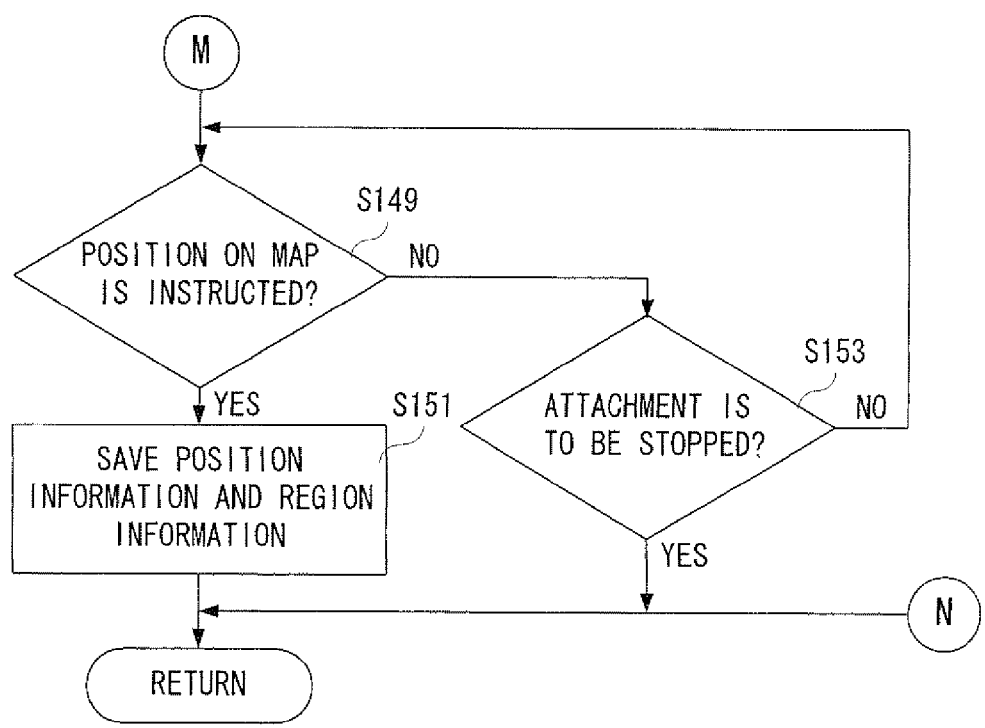
FIG. 29 is a flowchart showing another part of the handwritten-note creating processing of the CPU shown in FIG. 3, following FIG. 28.

FIGS. 28 and 29 are flowcharts of the handwritten-note creating processing in the step S47 shown in FIG. 22. Processing similar to the photographing processing shown in FIGS. 26 and 27 is described briefly. As shown in FIG. 28, when the handwritten-note creating processing starts, in a step S131, the CPU 50 displays the handwriting screen 350 as shown in FIG. 10 on the first LCD 16 and the second LCD 18. In a next step S133, whether or not there is a touch-on operation is determined. That is, the CPU 50 determines whether or not there is an input of the touch position data from the touch panel 22. If "NO" in the step S133, that is, if there is no touch-on operation, the processing goes to a step S137 as it is. On the other hand, if "YES" in the step S133, that is, if there is a touch-on operation, then in a step S135, a point is drawn in a touch position, and the processing goes to the step S137. That it, the CPU 50 draws the point in the position displayed on the second LCD 18, which is indicated by the touch position data from the touch panel 22.

In the step S137, whether or not there is an instruction of saving is determined. That is, the CPU 50 determines whether or not the button image 372 is turned on on the handwriting screen 350. If "NO" in the step S137, that is, if there is no instruction of the saving, then in a step S139, whether or not there is an instruction of deletion, that is, an instruction to stop the creation of the handwritten note is determined. Here, the CPU 50 determines whether or not the button image 370 is turned on on the handwriting screen 350.

If "NO" in the step S139, that is, if there is no instruction of deletion, the processing returns to the step S133. That is, the creation of the handwritten note is continued. On the other hand, if "YES" in the step 139, that is, if there is an instruction of deletion, then in a step S141, the handwriting image is deleted, and as shown in FIG. 29, the processing returns to the overall processing. That is, in the step S141, the CPU 50 deletes (clears) all the touch position data stored in the operation data buffer 92*a*.

Moreover, if "YES in the step S137, that is, if there is an instruction of saving, then in a step S143, the drawn handwriting image is saved as a journey note. That is, the journey note n data including the image data of the handwriting image is stored in the data memory area 92. In a next step S145, a creation time and date is saved as the time and date information of the journey note. Although an illustration and the like are omitted, the CPU 50 acquires from the RTC 68, the time and date information (creation time and date) when the button image 372 is turned on to add to the before-described journey note n data.

Next, in a step S146, whether or not to attach the journey note to the map is determined. If "NO" in the step S146, the processing returns to the overall processing as it is. On the other hand, if "YES" in the step S146, then in a step S147, the journey note attaching screen 450 on which the map of the region displayed before the drawing, that is, the relevant map is displayed is displayed on the first LCD 16 and the second LCD 18, and in a step S149 shown in FIG. 29, whether or not a position on the map is instructed is determined.

If "YES" in the step S149, that is, if the position on the map is instructed, then in a step S151, the position information and the region information are saved, and the processing returns to the overall processing. On the other hand, if "NO" in the step 149, that is, if the position on the map is not instructed, then in a step S153, whether or not to stop the attachment is determined. If "NO" in the step S153, that is, if the attachment is not to be stopped, the processing returns to the step S149 as it is. On the other hand, if "YES" in the step 153, that is, if the attachment is to be stopped, the processing returns to the overall processing as it is.

Figure 30:
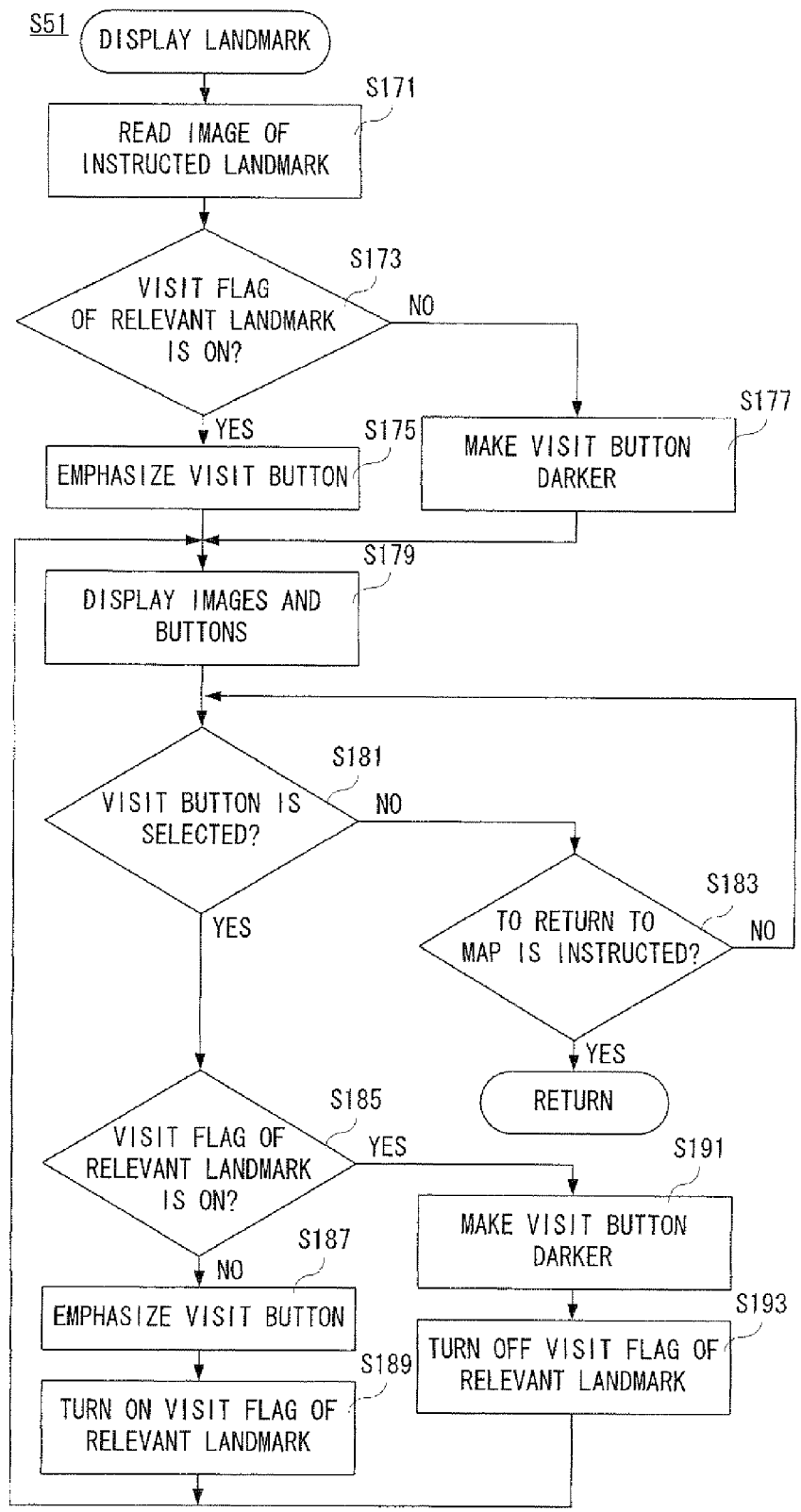
FIG. 30 is a flowchart showing landmark display processing of the CPU shown in FIG. 3.

FIG. 30 is a flowchart of the landmark display processing in the step S51 shown in FIG. 22. While in this landmark display processing, for simplicity, only processing of the visit flag (920*g*) and the visit button image (324), relating to the reproduction of the slide show is described, the processing when the other button images 310 to 318, the bookmark flag (920*f*) and the bookmark button image (322), and the icon 330 are pressed is actually executed as well.

As shown in FIG. 30, when the landmark display processing is started, the image of the instructed landmark (hereinafter, referred to as the "relevant landmark" here) is read in a step S171. That is, the image data included in the landmark m data 92*m* of the landmark corresponding to the icon 270 touched on the detailed map screen 250 is read.

In a next step S173, whether or not the visit flag of the relevant landmark is on is determined. That is, the CPU 50 determines whether or not the visit flag included in the landmark m data 92*m* of the relevant landmark is on. If "YES" in the step S173, that is, if the visit flag of the relevant landmark is on, then in a step S175, the visit button is emphasized and the processing goes to a step S179. For example, the CPU 50 increases the luminance of the button image 324 in the step S175. On the other hand, if "NO" in the step S173, that is, if the visit flag of the relevant landmark is off, then in a step S177, the visit button is made darker, and the processing goes to the step S179. For example, the CPU 50 decreases the luminance of the button image 324 in the step S177.

In the step S179, the images and the buttons are displayed. That is, the CPU 50 displays the landmark detail screen 300 as shown in FIG. 9 on the first LCD 16 and the second LCD 18, using the image data, the information data, the bookmark data and the visit flag included in the landmark m data 92*m* of the relevant landmark.

Subsequently, in a step S181, whether or not the visit button image is selected is determined. That is, the CPU 50 determines whether or not the button image 324 is turned on on the landmark detail screen 300. If "NO" in the step S181, that is, if the visit button image is not selected, then in a step S183, whether or not there is an instruction to return to the map is determined. That is, the CPU 50 determines whether or not the button image 320 is turned on on the landmark detail screen 300. If "NO" in the step S183, that is, if the processing does not return to the map, the processing returns to the step S181. On the other hand, if "YES" in the step S183, that is, if the processing returns to the map, it returns to the overall processing as it is.

Moreover, if "YES in the step S181, that is, if the visit button image is selected, then in a step S185, whether or not the visit flag of the relevant landmark is on is determined. That is, the CPU 50 determines whether or not the visit button image has already been turned on. If "NO" in the step S185, that is, if the visit flag of the relevant landmark is off, then in a step S187, the visit button image 324 of the landmark detail screen 300 is emphasized, and in a step S189, the visit flag of the relevant landmark is turned on, and then the processing returns to the step S179.

On the other hand, if "YES" in the step S185, that is, if the visit flag of the relevant landmark is on, then in a step S191, the visit button image 324 of the landmark detail screen 300 is made darker, and in a step S193, the visit flag of the relevant landmark is turned off to return the processing to step S179.

Figure 23:
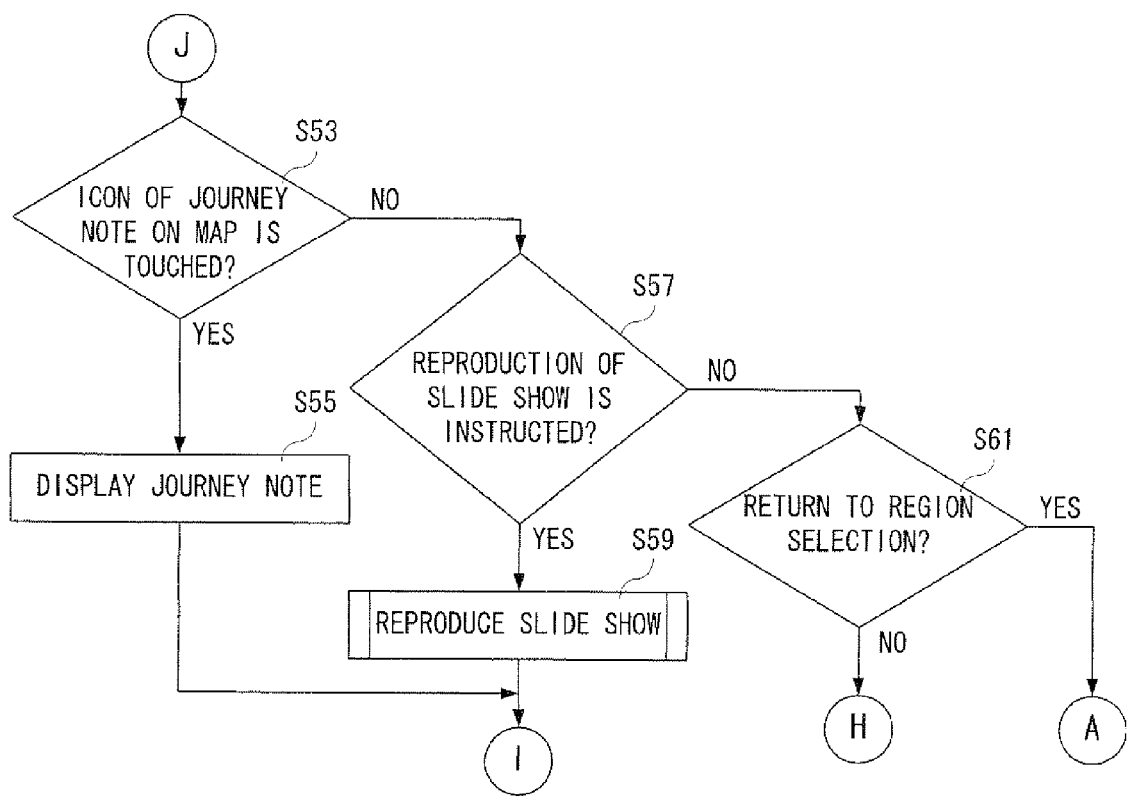
FIG. 23 is a flowchart of a fourth part of the overall processing of the CPU shown in FIG. 3, following FIG. 22.
Figure 25:
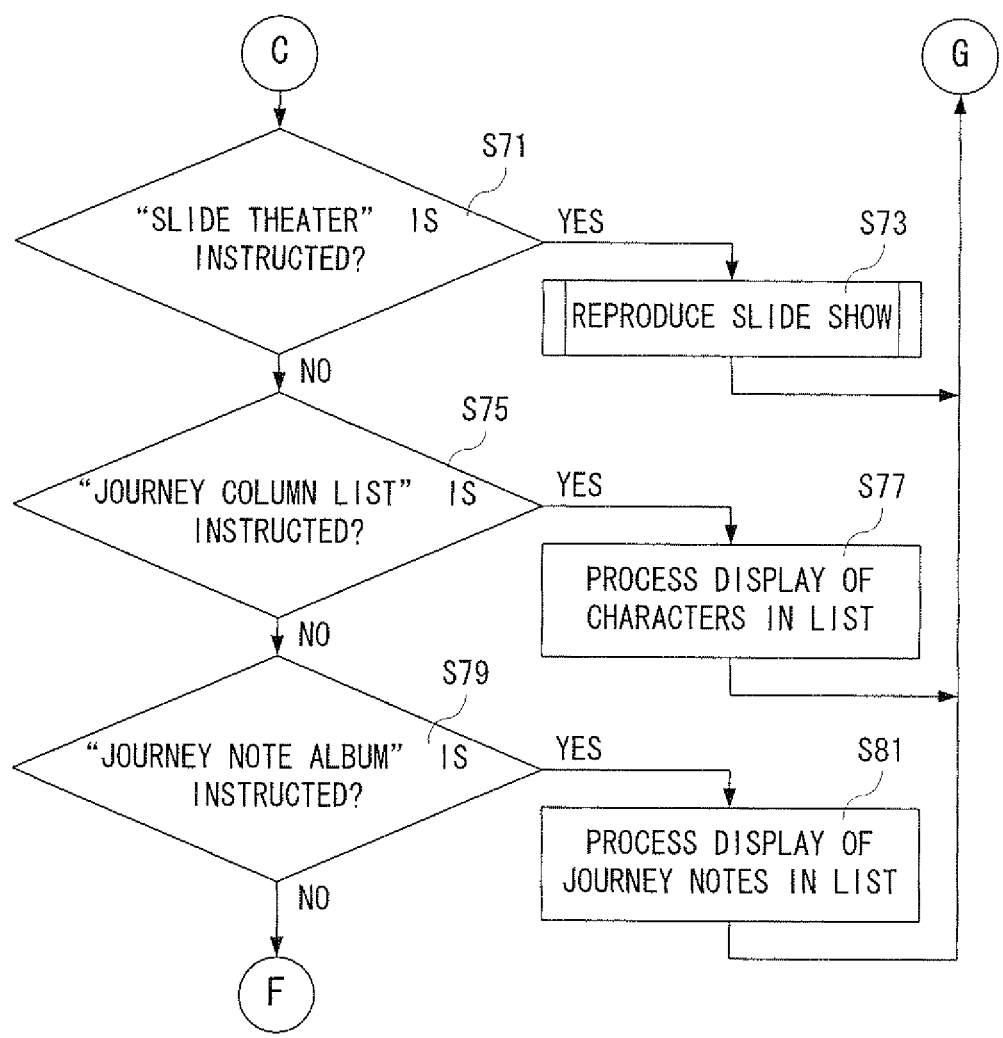
FIG. 25 is a flowchart of a sixth part of the overall processing of the CPU shown in FIG. 3, following FIG. 20.
Figure 31:
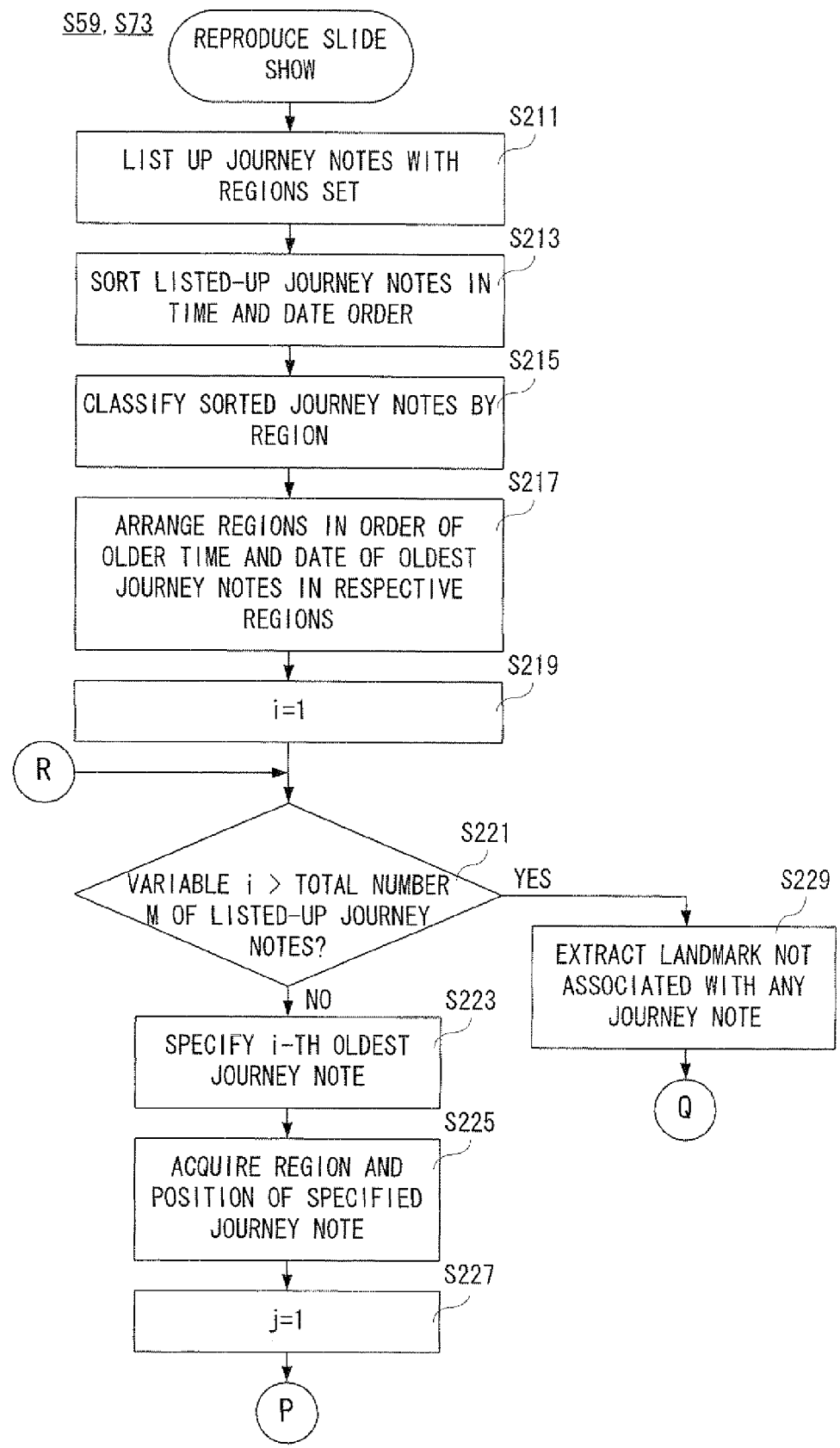
FIG. 31 is a flowchart showing a part of reproduction processing of a slide show of the CPU shown in FIG. 3.

FIGS. 31 to 35 are flowcharts of the reproduction processing of the slide show in the step S59 shown in FIG. 23 and the step S73 shown in FIG. 25. As shown in FIG. 31, when the reproduction processing of the slide show starts, the CPU 50 lists up the journey notes with the regions set in a step S211. That is, the CPU 50 extracts the journey note n data (930 to 93*n*) with no NULL data described as the region information data among the n pieces of journey note n data (930 to 93*n*) included in the journey note data 92*f*. However, the journey note IDs (journey note ID data 930*a* and the like) of the journey note n data (930 to 93*n*) are actually listed up.

In a next step S213, the journey notes listed-up in the step S211 are arranged in order of time and date. That is, the CPU 50 sorts the journey note IDs in order of earlier time and date with reference to the time and date information data of the listed-up journey note n data (930 to 93*n*). Subsequently, in a step S215, the rearranged journey notes are classified by region. For example, the CPU 50 groups the journey note n data (930 to 93*n*) of the same region with reference to the region information data of the journey notes. At this time, in each of the groups, the title page ID corresponding to the region is arranged, and then, the journey note IDs of the relevant region are arranged in order of earlier time and date, following the title page ID. In a step S217, the regions are arranged in time and date order of the oldest journey notes in the respective regions. That is, the CPU 50 extracts the journey note n data (930 to 93*n*) of the oldest time and date from the journey note n data (930 to 93*n*) belonging to the respective regions, and arranges the groups of the regions that the extracted journey note n data (930 to 93*n*) belongs to, in order of older time and date of the extracted journey note n data (930 to 93*n*).

In a next step S219, a variable i is initialized (i=1). This variable i is a variable for counting a number of the journey notes listed up in a step S211. Subsequently, in a step S221, whether or not the variable i exceeds a total number M of the listed-up journey notes is determined. Here, the CPU 50 determines whether or not processing of association of all the listed-up journey notes with the landmarks has been finished.

If "NO" in the step S221, that is, if the variable i is equal to or less than the total number M of the listed-up journey notes, then in a step 223, the i-th oldest journey note is specified. In a next step S225, the region and the position of the journey note specified in the step S223 are acquired. That is, the CPU 50 acquires the position indicated by the position information data and the region indicated by the region information data, which are included in the journey note n data 93*n* of the specified journey note.

Figure 32:
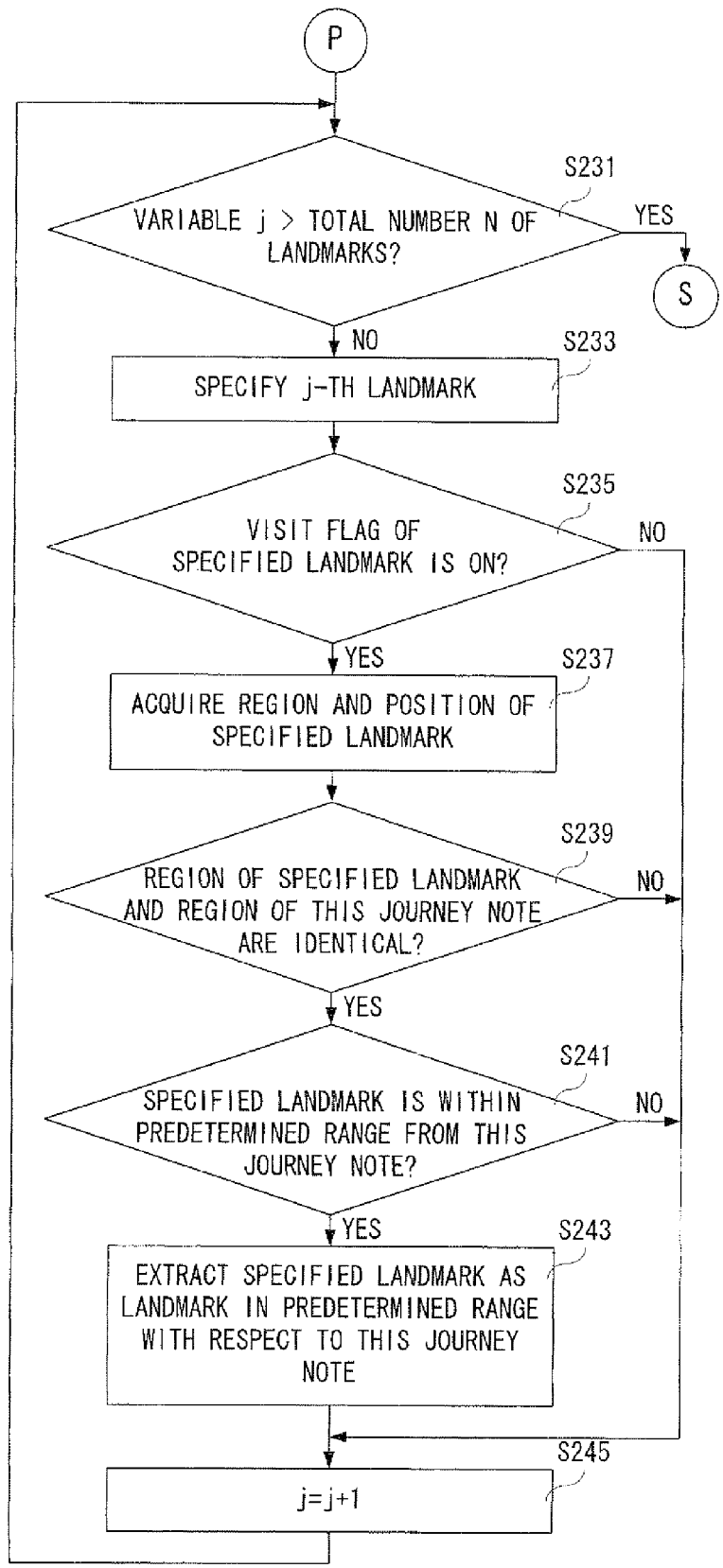
FIG. 32 is a flowchart of a second part of the reproduction processing of the slide show of the CPU shown in FIG. 3, following FIG. 31.

In a next step S227, a variable j is initialized (j=1) to determine whether or not the variable j exceeds a total number N of the landmarks in a step S231 shown in FIG. 32. This variable j is a variable for counting a number of the landmarks. That is, in the step S231, the CPU 50 determines whether or not the determination processing as to whether or not the i-th journey note is within a predetermined range with respect to all the landmarks has been executed.

If "NO" in the step 231, that is, if the variable j is equal to or less than the total number N of the landmarks, then in a step S233, a j-th landmark is specified. For example, the landmark is specified in accordance with an order registered as the landmark data 92*d* in the data memory area 92, or when the landmark IDs are described by numbers or alphabets, the landmark is specified in accordance with the order. In a next step S235, whether or not the visit flag of the specified landmark is on is determined. That is, the CPU 50 determines whether or not the visit flag included in the landmark m data 92*m* corresponding to the specified landmark is on.

If "NO" in the step S235, that is, if the visit flag of the specified landmark is off, the processing goes to a step S245. On the other hand, if "YES" in the step S235, that is, if the visit flag of the specified landmark is on, then in a step S237, the region and the position of the specified landmark are acquired. That is, the region indicated by the region information data and the position indicated by the position information data, which are included in the landmark m data 92*m* corresponding to the specified landmark, are acquired.

In a subsequent step S239, whether or not the region of the specified landmark (j-th landmark) and the region of this journey note (i-th journey note) are identical is determined. That is, the CPU 50 determines whether or not the region acquired in the step S225 and the region acquired in the step S237 are identical. If "NO" in the step S239, that is, if the region of the specified landmark and the region of this journey note are different, the processing goes to the step S245 as it is.

On the other hand, if "YES" in the step S239, that is, if the region of the specified landmark and the region of this journey note coincide with each other, then in a step S241, whether or not the specified landmark is in the predetermined range from this journey note is determined. That is, the CPU 50 determines whether or not a distance between the position acquired in the step S225 and the position acquired in the step S237 is shorter than a radius defining the predetermined range.

If "NO" in the step S241, that is, if the specified landmark is not within the predetermined range from this journey note, the processing goes to the step S245 as it is. On the other hand, if "YES" in the step S241, that is, if the specified landmark is within the predetermined range from this journey note, then in a step S243, the specified landmark is extracted as the landmark in the predetermined range with respect to this journey note, and the processing goes to the step S245. In the step S243, the specified landmark is extracted, and at the same time, the distance between the specified landmark and this journey note is also extracted. That is, the i-th journey note and the j-th landmark are associated with each other.

In the step S245, 1 is added to the variable j (j=j+1), and the processing returns to the step S231. That is, the landmark is sequentially specified to determine whether or not it is within the predetermined range with respect to the journey note.

Figure 33:
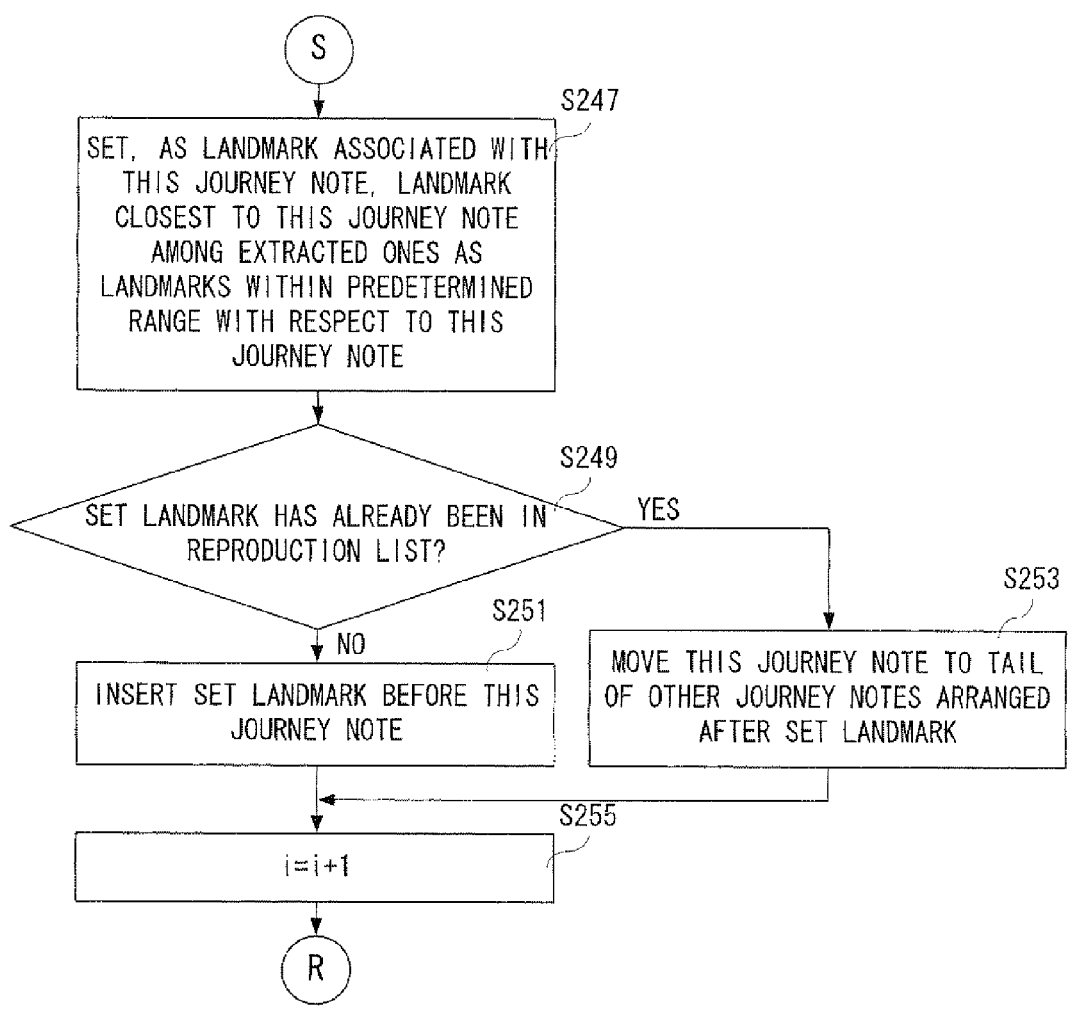
FIG. 33 is a flowchart of a third part of the reproduction processing of the slide show of the CPU shown in FIG. 3, following FIG. 32.

Moreover, If "YES" in the step S231, that is, if the variable j exceeds the total number N of the landmarks, then in a step S247 shown in FIG. 33, the landmark closest to this journey note of the landmarks extracted as the landmarks within the predetermined range with respect to this journey note is set as the landmark associated with this journey note. That is, the CPU 50 sets, as the landmark associated with this journey note, the landmark in which the distance extracted in the step S243 is a shortest distance. Thus, even if a plurality of landmarks exist within the predetermined range of one journey note, one landmark is associated with the relevant one journey note.

In a step S249, whether or not the set landmark has already been in the reproduction list is determined. Here, the CPU 50, with reference to the reproduction list data 92*g* stored in the data memory area 92, determines whether or not the landmark ID indicated the landmark ID data of the set landmark is described in the reproduction list.

If "NO" in the step S249, that is, if the set landmark is not in the reproduction list, then in a step S251, the set landmark is inserted before this journey note, and in a step S255, 1 is added to the variable i (i=i+1), and then, the processing returns to the step S221 shown in FIG. 31. That is, the processing of the association of the next journey note with the landmark is executed. On the other hand, if "YES" in the step S249, that is, if the set landmark has already been in the reproduction list, then in a step S253, this journey note is moved just behind the other journey notes arranged after the set landmark in the reproduction list, and the processing goes to the step S255. That is, by the processing in the step S253, reproducing the same landmark a plurality of times can be avoided.

Figure 34:
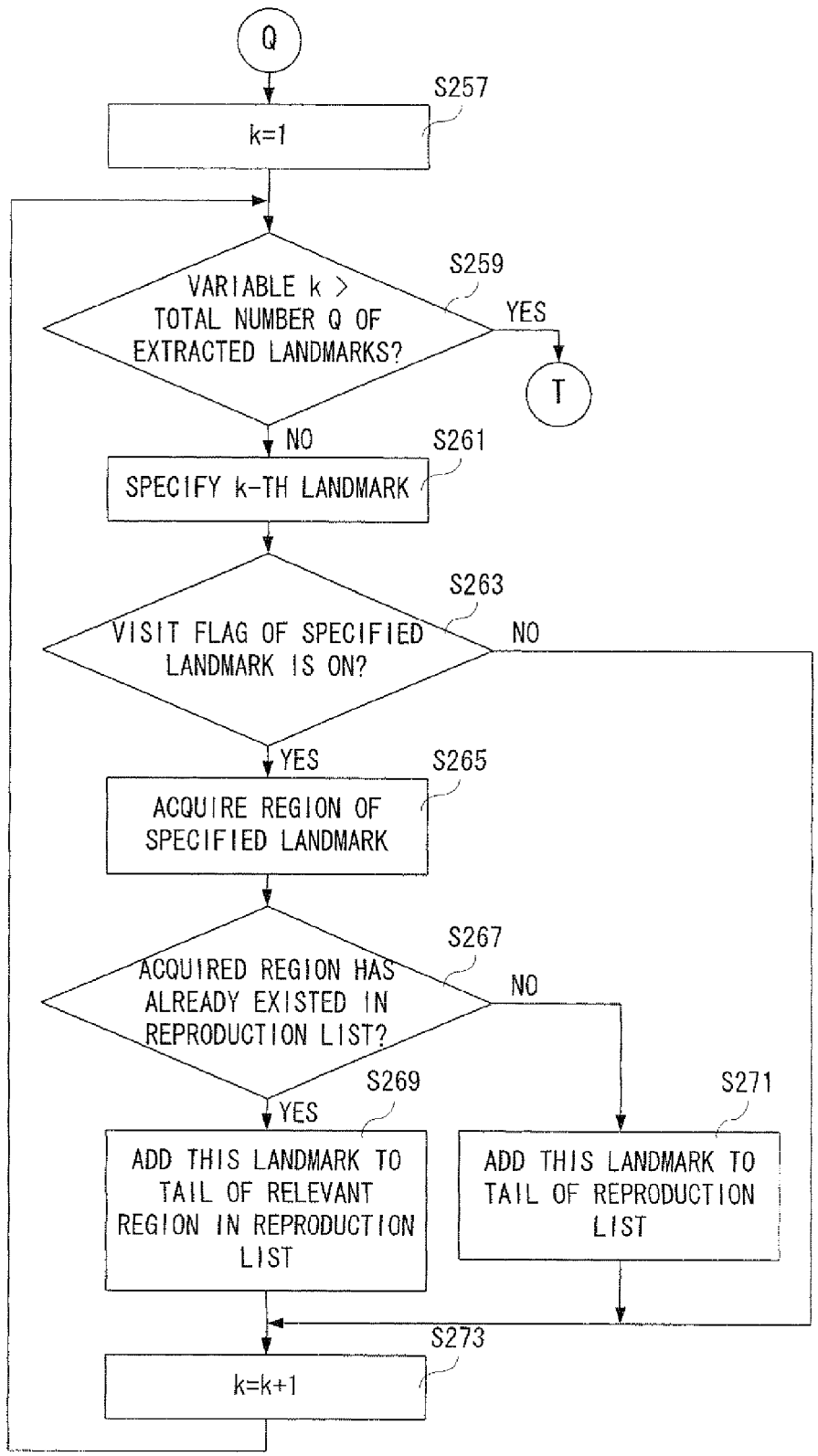
FIG. 34 is a flowchart of a fourth part of the reproduction processing of the slide show of the CPU shown in FIG. 3, following FIG. 31.

Referring back to FIG. 31, if "YES" in the step S221, that is, if the variable i exceeds the total number M of the listed-up journey notes, then in a step S229, the landmarks not associated with any of the journey notes are extracted, and the processing goes to a step S257 shown in FIG. 34. That is, in the step S229, the CPU 50 extracts the landmark from which no journey note exists within the predetermined range.

As shown in FIG. 34, in the step S257, an initial value is set for a variable k (k=1). This variable k is a variable for counting a number of the landmarks extracted in the step S229. In a next step S259, whether or not the variable k exceeds a total number Q of the extracted landmarks is determined. Here, the CPU 50 determines whether or not determination processing as to whether or not the user visited has been performed with respect to all the landmarks not associated with any of the journey notes.

If "NO" in the step S259, that is, if the variable k is equal to or less than the total number Q of the extracted landmarks, then in a step S261, the k-th landmark is specified. This processing in the step S261 is the same as the above-described processing in the step S233. In a next step S263, whether or not the visit flag of the specified landmark is on is determined.

If "NO" in the step S263, that is, if the visit flag of the specified landmark is off, the processing goes to a step S273 as it is. On the other hand, if "YES" in the step S263, that is, if the visit flag of the specified landmark is on, then in a step S265, the region of the specified landmark is acquired. That is, the region indicated by the region information data included in the landmark m data 92m corresponding to the specified landmark is acquired.

Subsequently, in a step S267, whether or not the acquired region has already existed in the reproduction list is determined. That is, the CPU 50 determines whether or not the title page ID of the acquired region is described in the reproduction list with reference to the reproduction list data 92g stored in the data memory area 92. If "YES" in the step S267, that is, if the acquired region has already existed in the reproduction list, then in a step S269, this landmark is added to the tail of the region in the reproduction list, and in the step S273, 1 is added to the variable k (k=k+1), and then the processing returns to the step S259. That is, in the step S269, the CPU 50 inserts the landmark ID of the k-th landmark into the tail of the landmark IDs and the journey note IDs following the title page ID of the region acquired in the step S265 in the reproduction list.

On the other hand, if "NO" in the step S267, that is, if the acquired region does not exist in the reproduction list, then in a step S271, this landmark is added to the tail of the reproduction list, and the processing goes to the step S273. That is, in the step S271, the CPU 50 inserts the landmark ID of the k-th landmark to the tail of the reproduction list.

Figure 35:
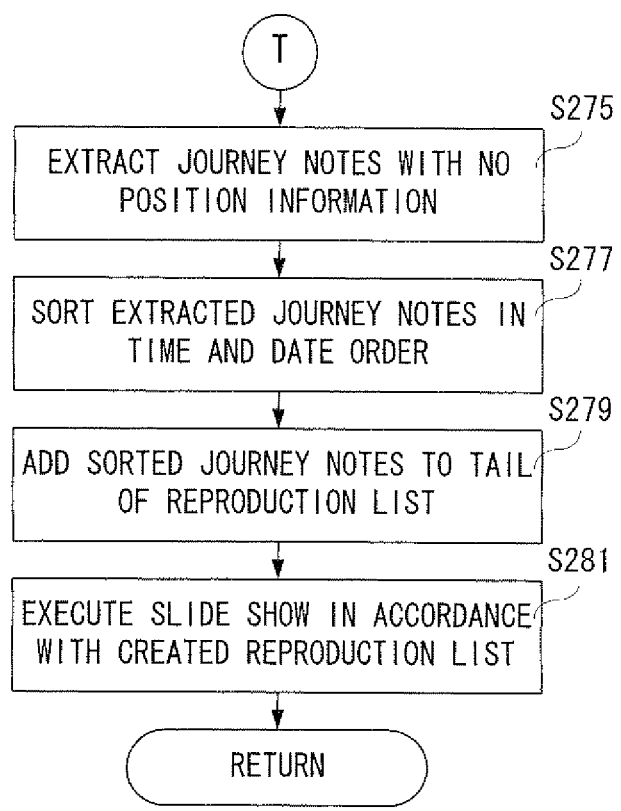
FIG. 35 is a flowchart of a fifth part of the reproduction processing of the slide show of the CPU shown in FIG. 3, following FIG. 34.

Moreover, if "YES" in the step S259, that is, if the variable k exceeds the total number Q of the extracted landmarks, then in a step S275 shown in FIG. 35, the journey notes with no position information are extracted. That is, the CPU 50 extracts the journey note IDs of the journey note n data 93n with NULL data described as the position information data. That is, the journey notes not attached to the map are extracted. Since for the journey notes not attached to the map, the region information thereof is not set, either, the journey notes with no region information may be extracted in the step S275.

In a subsequent step S277, the journey notes extracted in the step S275 are arranged in time and date order. In the embodiment, the journey note IDs are rearranged in order of earlier (older) time and date indicated by the time and date information data of the extracted journey notes. In a next step S279, all the journey note IDs rearranged in the step S277 are added to the tail of the reproduction list. In a step S281, the slide show is executed in accordance with the created reproduction list, and the processing returns to the overall processing.

Although a detailed description is omitted, in the step S281, the image data indicated by the identification information (title page IDs, landmark IDs, journey note IDs) is read out in order from the head of the reproduction list (in order of index number) to be displayed on the first LCD 16. For example, when the user does not perform any operation, the display of the image data is updated at time intervals of 3 seconds. However, when any one of the button images 710 to 716 is turned on on the slide reproduction screen 700 during the execution of the slide show, in response, the reproduction is paused, the reproduction is restarted, the slide is returned to the last image (slide), or advanced to the next slide, or the reproduction of the slides is started at the beginning. However, when the button image 718 is turned on, the reproduction of the slides is finished, and the memory-of-journey screen 600 is displayed on the first LCD 16 and the second LCD 18.

According to this embodiment, since when the slides are reproduced, after the image of the landmark existing within the predetermined range is displayed, the images of the journey notes are displayed on a basis of the region, where the journey notes are photographed or created can be easily recalled.

While in this embodiment, the photographing images and the handwriting images are recorded as the journey notes to be reproduced in the slide show, voice notes may be recorded as the journey notes. In such a case, at the time of the reproduction of the slide show, the reproduction list including the voice notes may be created by a method described in the embodiment, and the voice notes may be outputted from the speaker in place of the display of the images of the journey notes.

Moreover, in this embodiment, while in order to reproduce the slides on a basis of region, the image of the title page is displayed at the head of each of the regions, basically, the images of the journey notes are displayed after the image of the landmark, and thus, the image of the relevant title page may not be displayed.

Furthermore, while in this embodiment, the images of the journey notes are reproduced in order of earlier (older) time and date, the images may be reproduced in order of later (newer) time and date. Similarly, while in this embodiment, the images of the journey notes within the predetermined range are displayed next to the image of the landmark, the order may be reversed.

Furthermore, while in this embodiment, all the images of the landmarks associated with the journey notes and the landmarks that user visited are displayed, the images of the landmarks not associated with the journey notes may not be reproduced.

Moreover, while in this embodiment, the image of the landmark that the user did not visit is not reproduced, this landmark may be reproduced. That is, the images of all the landmarks may be reproduced. In such a case, for example, between the processing in the step S279 and the processing in the step S281, processing of adding all the landmark IDs not described (registered) in the reproduction list to the tail of the reproduction list may be executed.

Furthermore, while in this embodiment, the images of the landmarks are reproduced only once, when one landmark is associated with a plurality of journey notes, the journey notes may be reproduced in accordance with the time and date information, and the image of the relevant landmark may be reproduced before the images of the associated journey notes are reproduced. That is, the image of the one landmark may be reproduced a plurality of times.

Furthermore, while in this embodiment, the photographing images and the handwriting images of the journey notes are recorded and reproduced, the invention does not need to be limited to this. For example, an image obtained by drawing the handwriting image on the photographing image may be recorded and reproduced.

Moreover, while in this embodiment, the case where the portable game apparatus is used is described, another information processing apparatus such as a stationary game apparatus and a computer with a game function can be used. In such cases, images taken by a digital camera or the like may be loaded on the information processing apparatus such as the stationary game apparatus, handwriting images may be created using the information processing apparatus such as the stationary game apparatus, or handwriting images created by another computer or the like may be loaded on the information processing apparatus such as the stationary game apparatus from the relevant other computer or a network.

Furthermore, while in this embodiment, the position information set in the map is used, for the position information of the journey note, the user may input a latitude and a longitude. Moreover, when the game apparatus has a GPS function, a latitude and a longitude may be acquired from a GPS.

Moreover, while in this embodiment, a time when one slide (each of the images of the title pages, landmarks, and journey notes) is displayed is fixed regardless of the type (title page, landmark, journey note), the time of the display may be varied depending on the type.

Furthermore, while in this embodiment, the handwritten note is inputted by so-called freehand using the touch pen, the present invention does not need to be limited to this. For example, an image of a keyboard may be displayed so that letters may be inputted using this image of the keyboard, or so that prepared symbols and graphics other than letters may be inputted.

Still further, the configuration of the game apparatus does not need to be limited to the embodiment. For example, a single display apparatus (LCD) and a single camera may be employed. The touch panel may be omitted. Furthermore, the touch panels may be provided on the two LCDs.

Although certain example embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing an information processing program of an information processing apparatus that includes a display device, an input device, a processing system that includes at least one processor, and a storage system configured to store a plurality of pieces of landmark information, each one of the plurality of pieces of landmark information having associated landmark position information, said information processing program comprising instructions configured to:
receive first image data in accordance with an operation performed via the input device, the first image data among a plurality of image data;
set position information in accordance with the received first image data, where each one of the plurality of image data is associated with set position information;
select relevant landmark information out of the plurality of pieces of landmark information based on the set position information of said received first image data and the associated landmark position of the selected relevant landmark information;
determine a display order for the plurality of image data based on comparisons of landmark position information of the plurality of pieces of landmark information to the set position information associated with each one of the plurality of image data; and
sequentially display, to the display device, the plurality of image data and at least the selected landmark information in accordance with the determined display order.

2. The medium of claim 1, wherein the set position information of said received first image data is associated with a first position, and
wherein the selected relevant landmark information is selected when the first position is within a distance range of the associated landmark position of the selected relevant landmark information.

3. The medium of claim 2, wherein a distance difference between the first position and associated landmark position of the selected relevant landmark information is shorter than other distance differences.

4. The medium of claim 1, wherein an image corresponding to said image data is displayed after said selected landmark information.

5. The medium of claim 4, wherein the image is displayed after the selected landmark information is displayed when a first position indicated by the position information of another image data and a second position indicated by the associated landmark position of the landmark information are within a predetermined range.

6. The medium of claim 4, wherein the image corresponding to said image data is displayed after displaying an image corresponding to the relevant another image data when a first position indicated by the position information of another image data and a second position indicated by the associated landmark position of the landmark information are within a range.

7. The medium of claim 1, wherein:
the determined display order includes the display of the selected relevant landmark information before the first image data when a first position indicated by the position information of said first image data and a second position indicated by the associated landmark position information of said landmark information are within a range, and
the determined display order includes the display of the selected relevant landmark information after the first image data when the first position and the second position are out of the range.

8. The medium of claim 1, wherein the instructions are further configured to:
set whether or not each landmark was visited in accordance with an operation performed via the input device; and
the selected landmark information is further based on whether or not the landmark was visited.

9. The medium of claim 1, wherein the instructions are further configured to:
set time and date information for the first image data, wherein the determined display order is further based on following said time and date information; and
display an image corresponding to said first image data and said selected relevant landmark information in the determined display order.

10. The medium of claim 1, wherein the instructions are further configured to:
display a map; and
set a position on said map based on an input operation from the input device, where the position on the map is the set position information of said first image data.

11. Claim 1, wherein the information processing apparatus further includes an imager and the received first image data is received in accordance with an image taken by the imager.

12. The medium of claim 1, wherein the instructions are further configured to:
create a letter, graphic, and/or symbol in accordance with an operation of the input device; and
receive other image data in accordance with the operation.

13. An information processing apparatus comprising:
an input device configured to receive input from a user;
an imager configured to obtain first image data in accordance with an operation of an input device; and
a processing system including at least one processor, the processing system configured to:

associate positional information with the obtained first image data;

select at least one relevant landmark based on the positional information associated with the first image data and positional information of a plurality of potential landmarks;

determine a display order for a plurality of image data, which includes the first image data, based on a comparison of positional information of the plurality of potential landmarks to associated positional information of each one of the plurality of image data; and output, for display on a display device, the plurality of image data and the selected at least one relevant landmark based on the determined display order.

14. A computer-implemented information processing method for organizing images and landmark information performed using at least one processor, the method comprising:

obtaining a plurality of images that includes a first image, where each one of the plurality of images is associated with respective position information;

selecting, using the at least one processor, relevant landmark information for the first image based on landmark positional information of the relevant landmark information and the set position information for at least the first image, the relevant landmark information among a plurality of landmark information;

comparing, using the at least one processor, the respective position information of the plurality of images to the landmark positional information of the plurality of landmark information;

determining, using the at least one processor, a display order based on the compared respective position information of the plurality of images to the landmark positional information; and outputting at least said first image data and the selected relevant landmark information based on the determined display order.

15. A computing system for presenting images to a user, the system comprising:

an input device configured to receive user input from a user;

a non-transitory storage system configured to store:

a plurality of informational landmark content, where each one of the plurality is associated with a respective landmark;

landmark positional information associated with each one of the plurality of informational landmark content; and a plurality of images; and a processing system that includes at least one processor, the processing system configured to:

receive a first image in accordance with first user input received via the input device, the first image included among the plurality of images;

associate first positional information with the first image;

select relevant informational landmark content from the plurality of informational landmark content based on the landmark positional information of the relevant information landmark content and the associated first positional information of the first image;

perform a comparison between associated positional information of each one of the plurality of images to the landmark positional information associated with each one of the plurality informational landmark content;

determine a display order based on the comparison; and output a display presentation of the plurality of images and at least the selected relevant informational landmark content based on the determined display order.

16. The system of claim 15, wherein the relevant informational landmark content is selected based on a distance between a first portion that is in accordance with the landmark positional information of the relevant information landmark content and a second position that is in accordance with the associated first positional information.

17. The system of claim 16, wherein the distance is less than distances between the associated first positional information and the landmark positional information of the other information landmark content.

18. The system of claim 15, wherein the processing system is further configured to set a visited value for each one of the plurality of informational landmark content, wherein the selected relevant informational landmark content is further based on the visited value of the selected relevant informational landmark content.

19. The system of claim 15, further comprising:

at least one camera that is configured to acquire at least the first image in accordance with the first user input.

* * * * *